US007236952B1

(12) United States Patent
D'Zmura

(10) Patent No.: US 7,236,952 B1
(45) Date of Patent: Jun. 26, 2007

(54) INVENTION IN FINANCE

(76) Inventor: David Andrew D'Zmura, P.O. Box 621, Indio, CA (US) 92201-0621

(*) Notice: Subject to any disclaimer, the term of this patent is extended or adjusted under 35 U.S.C. 154(b) by 0 days.

(21) Appl. No.: 09/489,739

(22) Filed: Jan. 21, 2000

Related U.S. Application Data

(60) Provisional application No. 60/127,512, filed on Apr. 2, 1999, provisional application No. 60/117,261, filed on Jan. 26, 1999, provisional application No. 60/117,260, filed on Jan. 26, 1999, provisional application No. 60/030,085, filed on Nov. 5, 1996.

(51) Int. Cl.
*G06Q 40/00* (2006.01)
(52) U.S. Cl. .................... 705/36 R; 705/37
(58) Field of Classification Search .............. 705/1, 705/35–42; 707/10, 100–104
See application file for complete search history.

(56) References Cited

U.S. PATENT DOCUMENTS

| | | | | |
|---|---|---|---|---|
| 4,953,085 | A * | 8/1990 | Atkins | |
| 5,214,579 | A * | 5/1993 | Wolfberg et al. | |
| 5,592,379 | A * | 1/1997 | Finfrock et al. | |
| 5,799,287 | A * | 8/1998 | Dembo | 705/36 |
| 5,946,666 | A * | 8/1999 | Nevo et al. | 705/36 |
| 6,061,662 | A * | 5/2000 | Makivic | 705/36 |
| 6,370,516 | B1 * | 4/2002 | Reese | 705/36 |
| 6,405,179 | B1 * | 6/2002 | Rebane | 705/36 |
| 6,424,653 | B1 * | 7/2002 | Arsikere et al. | 370/401 |

OTHER PUBLICATIONS

Reinhart, Len, "Liability Management: A new tool for financial consultants", Financial Consultant, V1n3, pp. 7-11, Fall/Winter 1996, ISSN: 1091-644X, Dialog file 15, Accession No. 01395382.*
Chopra, "Information Asymmetry, price changes, trading volume and bid-ask spreads", Dialog file 35, Accession No. 01137117, year 1990.*

* cited by examiner

*Primary Examiner*—Frantzy Poinvil

(57) ABSTRACT

Methods and processes for valuing a financial security, including mathematical and computational programming functions. A method and functions for portfolio aggregation. Processes computing change in price of a security or portfolio respective change in yield and time. A security composed of similar securities, engineered in manufacture process to reflect target criterion. Business logic of analytic valuation, security generation, and arbitrage differentials and relative value spreads, including engines of computerized automation and computer-based systems. A mutual fund. Numerical data cleaning and preparation, with related process. A process establishing likelihood of default of depository banks by operating ratios. Method and process for small sample data environments. Theta modeling technology, including process and mathematical programming functions. A modified OAS/martingale valuation lattice. A business process, reducing risk from deposit default and catastrophic loss. Improvements to the art, and unique functional specifications, of computational calculators.

13 Claims, 66 Drawing Sheets

Figure 1

| | |
|---|---|
| 1.1 | $P = f\{C, Y, T\}$ where C, Y, and T are variables endogenous to the security |

P = Market Price
C = Cash Receipts, periodic coupon, dividend or premium payments
Y = Yield, a single term relating security's return, relative to P, C, T
T = Time, a terminal or continuous measure of the life of the security.

Figure 2

1.2  Yield M = $\dfrac{\sum (\text{Maturity} \times \text{Portfolio Coefficient} \times \text{YTM}), \text{ for all issues}}{\sum (\text{Maturity} \times \text{Portfolio Coefficient}), \text{ for all issues}}$ where  Yield M = Governing Yield = Y
Maturity = Time = Maturity in Years
Portfolio Coefficient = Present Value, per issue/Present Value, $\sum$ issues
Present Value = Accrued Interest + (best bid Price × Face Value)
YTM = Yield-To-Maturity, a means providing yield respective time.

Figure 3

1.2d  Yield Md = $\dfrac{\sum (\text{Duration} \times \text{Portfolio Coefficient} \times \text{YTM}), \text{ for all issues}}{\sum (\text{Duration} \times \text{Portfolio Coefficient}), \text{ for all issues}}$

Figure 4

(Duration, modified annualized)
1.3    $K = \dfrac{-C}{Y^2}(1 - (1+Y/2)^{-2T}) + \dfrac{C}{Y}(T+TY/2)^{-2T-1} - (T+TY/2)^{-2T-1}$ 1.3w   $K = \dfrac{-C}{Y^2} + \dfrac{C}{Y^2}(1+Y/2)^{-2T} - (1 - C/Y)(T+TY/2)^{-2T-1})$

Figure 5

(Convexity)
1.4  $V = \dfrac{2C}{Y^3} - \dfrac{2C/Y^3}{(1+Y/2)^{2T}} - \dfrac{CT/Y^2}{(1+Y/2)^{2T+1}} - \dfrac{C/Y^2}{(T+TY/2)^{2T+1}} + \dfrac{(1+C/Y)(T^2+T/2)}{(T+TY/2)^{2T+2}}$

Figure 6

| | | |
|---|---|---|
| 1.5 | Portfolio Coefficient, for each Issue = Present Value$^I$/Present Value$^P$; | |
| where 1.5a | Present Value$^I$ = (AI + (Bid Price × Face Value)), for each Issue; | |
| 1.5b | Present Value$^P$ = $\sum$ (AI + (Bid Price × Face Value)), for all Issues. | |

Figure 7

| | | |
|---|---|---|
| 1.6a | Present Value$^P$ = $\sum$ (AI + (Bid Price × Face Value), for all Issues; |
| 1.6b | Accrued Interest$^P$ = $\sum$ Accrued Interest, AI, for all Issues; |
| 1.6c | Face Value$^P$ = $\sum$ Face Value, for all Issues; |
| 1.6d | Implied Price$^P$ = (Present Value$^P$ − AI$^P$)/ $\sum$ Face Value, for all Issues. |

Figure 8

| | | |
|---|---|---|
| 1.7a | C$^P$ = Cash Flow$^P$ = $\sum$ C × Portfolio Coefficient, for all Issues; |
| 1.7b | T$^P$ = Time$^P$ = $\sum$ Maturity × Portfolio Coefficient, for all Issues; |
| 1.7c | Y$^P$ = Yield$^P$ = $\sum$ Yield × Portfolio Coefficient, for all Issues. |

Figure 9

| | | |
|---|---|---|
| 1.8a | C$^P$ = Coupon$^P$ = $\sum$ Coupon × Portfolio Coefficient, for all Issues; |
| 1.8b | T$^P$ = Maturity$^P$ = $\sum$ Maturity × Portfolio Coefficient, for all Issues; |
| 1.8c | Y$^P$ = Yield$^P$ = $\sum$ Yield × Portfolio Coefficient, for all Issues. |

Figure 10

| | | |
|---|---|---|
| 1.9a | Duration$^P$ = $\sum$ Duration × Portfolio Coefficient, for all Issues; |
| 1.9b | Convexity$^P$ = $\sum$ Convexity × Portfolio Coefficient, for all Issues. |

Figure 13

| Portfolio of | U.S. Treas.Notes | 3/22/96 -4/25/96 | three data points | 3/22, 4/3, 4/25 |
|---|---|---|---|---|
| Issue | 1) | 2) | 3) | 4) |
| Maturity | 11/96 | 5/97 | 10/97 | 8/98 |
| Coupon | 4.3875% | 6.125% | 5.75% | 5.875% |
| Matur, yrs fr. 3/22 | 0.647541 | 1.14481 | 1.56438 | 2.40274 |
| Matur, yrs fr. 4/3 | 0.614754 | 1.11475 | 1.53160 | 2.36995 |
| Matur, yrs fr. 4/25 | 0.505464 | 1.05464 | 1.46995 | 2.30601 |
| Ask Yield, 3/22 | 5.23% | 5.58% | 5.60% | 5.79% |
| Ask Yield, 4/3 | 5.34% | 5.53% | 5.63% | 5.85% |
| Ask Yield, 4/25 | 5.26% | 5.59% | 5.75% | 5.98% |
| Price 3/22 | 99:12 | 100:19 | 100:03 | 100:04 |
| Price 4/3 | 99:13 | 100:19 | 100:01 | 100:00 |
| Price 4/25 | 99:14 | 100:16 | 99:28 | 99:20 |
| Face Value | $70,000,000 | $100,000,000 | $40,000,000 | $120,000,000 |
| AI, 3/22 | $1,082,490 | - 0 - | $999,180 | $693,443 |
| AI, 4/3 | $1,193,186 | $217,555 | $1,074,590 | $924,590 |
| AI, 4/25 | $1,367,797 | $585,724 | $1,219,126 | $1,367,623 |
| Full Value 3/22 | $70,644,990 | $100,593,750 | $41,036,680 | $120,843,443 |
| Full Value 4/3 | $70,767,561 | $1000,811,305 | $41,012,090 | $120,924,590 |
| Full Value 4/25 | $70,974,047 | $101,085,724 | $41,169,126 | $120,917,623 |
|  | 5) | 6) | 7) |  |
| Maturity | 3/99 | 6/00 | 2/01 |  |
| Coupon | 5.875% | 5.875% | 5.625% |  |
| Matur, yrs fr. 3/22 | 2.98082 | 4.23288 | 4.90274 |  |
| Matur, yrs fr. 4/3 | 2.94804 | 4.20009 | 4.86995 |  |
| Matur, yrs fr. 4/25 | 2.88524 | 4.13661 | 4.80601 |  |
| Ask Yield, 3/22 | 5.87% | 6.04% | 6.03% |  |
| Ask Yield, 4/3 | 5.90% | 6.04% | 6.04% |  |
| Ask Yield, 4/25 | 6.07% | 6.25% | 6.28% |  |
| Price 3/22 | 99:30 | 99:10 | 98:07 |  |
| Price 4/3 | 99:28 | 99:11 | 98:07 |  |
| Price 4/25 | 99:11 | 98:16 | 97:05 |  |
| Face Value | $40,000,000 | $80,000,000 | $60,000,000 |  |
| AI, 3/22 | $44,945 | $1,258,470 | $331,967 |  |
| AI, 4/3 | $121,995 | $1,412,568 | $442,623 |  |
| AI, 4/25 | $269,672 | $1,707,923 | $654,713 |  |
| Full Value 3/22 | $40,019,945 | $80,708,470 | $59,263,217 |  |
| Full Value 4/3 | $40,071,995 | $80,887,568 | $59,373,873 |  |
| Full Value 4/25 | $40,007,172 | $80,507,923 | $58,948,463 |  |

Portfolio Coefficient, for each Issue = Present Value$^I$/Present Value$^P$;
    Present Value$^I$ = (AI + (Bid Price x FaceValue), for each Issue;
    Present Value$^P$ = Σ (AI+(Bid Price x Face Value), for all Issues Face Value$^P$ = Σ Face Value, for all Issues;
Present (Full) Value$^P$ = Σ (AI + (Bid Price x Face Value), for all Issues;
Accrued Interest$^P$ = Σ Accrued Interest, AI, for all Issues;
Implied Price$^P$ = (Present Value$^P$ – AI$^P$)/ Σ Face Value for all Issues C$^P$ = Cash Flow$^P$ = Σ C x Portfolio Coefficient, for all Issues;
    T$^P$ = Time$^P$ = Σ Maturity x Portfolio Coefficient, for all Issues;
    Y$^P$ = Yield$^P$ = Σ Yield x Portfolio Coefficient, for all Issues Duration$^P$ = Σ Duration x Portfolio Coefficient, for all Issues;
Convexity$^P$ = Σ Convexity x Portfolio Coefficient, for all Issues

| Aggregate Data Values for Portfolio | | | |
|---|---|---|---|
| Date | 3/22/96 | 4/3/96 | 4/25/96 |
| Face Value$^P$ | $510,000,000 | $510,000,000 | $510,000,000 |
| Accrued Interest$^P$ | $4,749,907 | $5,387,107 | $7,172,578 |
| Present Value$^P$ | $513,449,907 | $513,848,982 | $513,610,078 |
| Implied Price$^P$ | 0.99745098 | 0.99698407 | 0.99301471 |
| Portfolio Coefficient | | | |
| 11/96 | .1375888 | .1377205 | .138186 |
| 5/97 | .1959174 | .1961886 | .196814 |
| 10/97 | .0799234 | .0798135 | .196814 |
| 8/98 | .2353559 | .235331 | .235427 |
| 3/99 | .0779432 | .077984 | .077894 |
| 6/00 | .1572929 | .157415 | .156749 |
| 2/01 | .1159784 | .115547 | .114773 |
| Coupon$^P$ | 5.680331% | 5.680322% | 5.667059% |
| Maturity$^P$ | 2.470660 | 2.437096 | 2.359601 |
| YTM$^P$ | 5.730002% | 5.755183% | 5.859601% |
| Duration$^P$ | 2.222031 | 2.191867 | 2.130696 |
| Convexity$^P$ | 7.847886 | 7.695562 | 7.389558 |

Figure 16

| Date | | 3/22/96 | 4/3/96 | 4/25/96 |
|---|---|---|---|---|
| Maturity$^P$ (in Years) | | 2.470660 | 2.437096 | 2.359601 |
| Maturity$^P$ (Future Date) | | 9/10/98 | 9/10/98 | 9/5/98 |
| Zero Spot | 8/98 | 5.83% | 5.86% | 6.04% |
| | 11/98 | 5.86% | 5.90% | 6.09% |
| linear | 9/98 | 5.84% | 5.87% | 6.06% |
| fitted | 9/10/98 | 5.845% | 5.875% | 6.065% |
| Yield M$^P$ | | 5.87129004% | 5.89269332% | 6.0661141% |
| Yield Md$^P$ | | 5.8523% | 5.8737% | 6.047% |
| YTM$^P$ | | 5.73000157% | 5.75518286% | 5.8561971% |

Figure 17

| Time Period | 3/22/96 - 4/3/96 | 4/3/96 - 4/25/96 | 3/22/96 - 4/25/96 |
|---|---|---|---|
| Actual Δ Yield M$^P$ | 0.0002140328 | 0.0017342077 | 0.001948241 |
| Actual Δ Yield Md$^P$ | 0.000214 | 0.001733 | 0.001947 |
| Actual Δ YTM$^P$ | 0.0002516720 | 0.0010101424 | 0.001261814 |
| Duration$^P$ | 2.222031 | 2.191867 | 2.222031 |
| Convexity$^P$ | 7.847886 | 7.695562 | 7.847886 |
| Computing Duration, Convexity Factorization, S.5: | | | |
| Estimated Δ Price$^P$, Yield M$^P$ −0.0004754078 | −0.00378958 | −0.004314158 | |
| Estimated Δ Price$^P$, Yield Md$^P$ −0.0004753 | −0.00378695 | −0.004311419 | |
| Estimated Δ Price$^P$, YTM$^P$ −0.0005589743 | −0.00221017 | −0.002796069 | |
| Actual Δ Price$^P$ | −0.000466911 | −0.003969363 | −0.004436274 |
| % Accuracy Yield M$^P$ | 98.2% | 95.5% | 97.2% |
| % Accuracy Yield Md$^P$ | 98.2% | 95.4% | 97.2% |
| % Accuracy YTM$^P$ | 83.5% | 55.7% | 63.1% |

Figure 18

| Duration, K vs. Prior Art | | | |
|---|---|---|---|
| Date | 3/22/96 | 4/3/96 | 4/25/96 |
| $Coupon^P$ | 5.680330985% | 5.680322119% | 5.66705895% |
| $Maturity^P$ | 2.4706604 | 2.437096 | 2.359601 |
| $YTM^P$ | 5.73000157% | 5.75518286% | 5.8561971% |
| $Price^P$ | 99.745098 | 99.698407 | 99.301471 |
| Duration, determined using above single aggregate $C^P$, $Y^P$, $T^P$ values: | | | |
| K (1.3) | -2.25389446 | -2.21483844 | -2.10426651 |
| Prior Art (S.3) | 2.09611877 | 2.07102626 | 2.01633865 |

Figure 19

| Period | 3/22/96 - 4/3/96 | 4/3/96 - 4/25/96 | 3/22/96 - 4/25/96 |
|---|---|---|---|
| K | -2.25389446 | -2.21483844 | -2.10426651 |
| $Convexity^P$ | 7.847886 | 7.695562 | 7.847886 |
| $\delta Y$ | 0.0002071580 | 0.0017921768 | 0.001968276 |
| processing estimated $\Delta$ Price = (K x $\delta Y$) + (0.5 x $Convexity^P$ x $(\delta Y)^2$): | | | |
| Estimated $\Delta$ Price | -0.000466744 | -0.003957023 | -0.004421085 |
| Actual $\Delta$ Price | -0.000466911 | -0.003969363 | -0.004436274 |
| Accuracy % | 99.96% | 99.69% | 99.66% |
| Error % | 0.04% | 0.31% | 0.34% |

Figure 20

| Convexity, V vs. Prior Art | | | |
|---|---|---|---|
| Date | 3/22/96 | 4/3/96 | 4/25/96 |
| Yield $M^P$ | 5.87129004% | 5.89269332% | 6.0661141% |
| $YTM^P$ | 5.73000157% | 5.75518286% | 5.8561971% |
| Yield $M^P$ − $YTM^P$(bp spread) | 0.14128852 | 0.13751046 | 0.2099176 |
| $Coupon^P$ | 5.680330985% | 5.680322119% | 5.66705895% |
| $Maturity^P$ | 2.4706604 | 2.437096 | 2.359601 |
| $Price^P$ (N/A for V) | 99.745098 | 99.698407 | 99.301471 |
| process determining Convexity, using above single aggregate $C^P$, $Y^P$, $T^P$ values: | | | |
| V (1.4c, Yield $M^P$) | 6.41019700 | 6.25535943 | 5.88053355 |
| V (1.4c, $YTM^P$) | 6.44053175 | 6.28389014 | 5.92058762 |
| V (1.4cv, Yield $M^P$ − $YTM^P$) | 6.84893917 | 7.14436415 | 2.89621154 |
| V (1.4cv, Yield $M^P$) | 0.00404544 | 0.00396111 | 0.00360859 |
| Prior Art (S.4, $YTM^P$) | 6.05221587 | 5.91149933 | 5.60084222 |
| Market Spot Yield | 5.845% | 5.875% | 6.065% |
| Yield M − Zero Spot | 0.026% | 0.018% | 0.001% |

Figure 21

| Period | 3/22/96 - 4/3/96 | 4/3/96 - 4/25/96 | 3/22/96 - 4/25/96 |
|---|---|---|---|
| δY | 0.0002071580 | 0.0017921768 | 0.001968276 |
| K | −2.25389446 | −2.21483844 | −2.25389446 |
| V (1.4cv, b.p. spread) | 6.84893917 | 7.14436415 | 6.84893917 |
| V (1.4c, Yield M) | 6.41019700 | 6.25535943 | 6.41019700 |
| V (1.4cv, Yield M) | 0.00404544 | 0.00396111 | 0.00404544 |
| processing 1.10, estimated Δ Price = (K x δY) + (0.5 x V x (δY)²): | | | |
| Actual Δ Price | −0.000466911 | −0.003969363 | −0.004436274 |
| Est. Δ P (V=1.4cv, spread) | −0.000466766 | −0.003957909 | −0.004423097 |
| Accuracy % | 99.97% | 99.71% | 99.70% |
| Error % | 0.03% | 0.29% | 0.30% |
| Est. Δ P (V=1.4c Yield$M^P$) | −0.000466775 | −0.003959336 | −0.004423869 |
| Accuracy % | 99.97% | 99.75% | 99.72% |
| Error % | 0.03% | 0.25% | 0.28% |

Figure 22

| 1.10 | Estimated $\Delta$ Price $= (K \times \delta Y) + ( \frac{1}{2} \times V \times (\delta Y)^2 )$ <br><br> where $\delta Y = \Delta Y = \Delta$Yield M; approximated $\Delta$ zero spot, or $\Delta$ Price/K; <br> K = Duration, e.g. Formula 1.3 and V = Convexity, e.g. Formula 1.4. |
|---|---|

| 1.10k | $\Delta$ Price, due to Duration (K) = K $\times \Delta$ Y |
|---|---|

| 1.10v | $\Delta$ Price, due to Convexity (V) = $\frac{1}{2} \times$ V $\times (\Delta Y)^2$. |
|---|---|

Figure 23

| 1.11 | $\Delta$ Price $= (- |\text{Duration}| \times \delta Y) + ( \frac{1}{2} \times \text{Convexity} \times (\delta Y)^2 )$ <br><br> where $\delta Y \cong \Delta Y = \Delta$Yield M; instantaneous, or across points in time <br> Duration = Formula 1.3 or S.3 and Convexity = Formula 1.4 or S.4. |
|---|---|

Figure 24

--- utilizing data values for each issue's endogenous variables of C, Y, T, per Formula 1.1;
utilizing data values for each issue's exogenous variable of Price, incl. Accrued Interest:

$$P = f\{C, Y, T\}$$

generating the portfolio coefficient for each issue in portfolio, per Formula 1.5, 1.5a, 1.5b:

determining Yield M, means processing Formulae 1.2 or 1.2d, on single portfolio Basis:

Yield M = $\dfrac{\text{(Maturity x Portfolio Coefficient x YTM), for all issues}}{\text{(Maturity x Portfolio Coefficient), for all issues}}$ Yield Md = $\dfrac{\text{(Duration x Portfolio Coefficient x YTM), for all issues}}{\text{(Duration x Portfolio Coefficient), for all issues}}$ determining duration and convexity variable data values on singular Basis

| prior art values per Formulae S.3, S.4 | K and V values, Formulae 1.3, 1.4 | estimating $\Delta$ Price = $(-|\text{Duration}| \times \delta Y) + (\tfrac{1}{2} \times \text{Convexity} \times (\delta Y)^2)$

| by factorization, Formulae S.5 | by factorization, Formulae 1.10 | if over two distinct points in time, $\Delta$ Price twixt endpoints, determine $\delta Y = \Delta Y$ $\Delta Y = \Delta$ Yield M, of end Yield M − start YieldM,
using value of Duration and Convexity at start point rendering manufactured financial data, to display, database or further processing

Figure 25A

| S.2c | semi-annual | $P = PR = ((C/Y)*(1-(1+(Y/2))^{\wedge}(-2*T))+(1+(Y/2))^{\wedge}(-2*T)$ |
|---|---|---|
| | | where C, Y and P are decimal values, T=Maturity in years |
| S.2cn | generalized | $P = PRBOND = ((C/Y)*(1-(1+(Y/N))^{\wedge}(-N*T))+(1+(Y/N))^{\wedge}(-N*T)$ |
| | | where N=n= periodic C per annum, e.g. semi-annual=2, T=Maturity in years |

Figure 25B

| S.3c | semi-annual | Durmodan=DURMOD=$((((C/2)/((Y/2)^{\wedge}2))*(1-(1/((1+(Y/2))^{\wedge}(2*T))))$ |
|---|---|---|
| | | $+((2*T*(100-((C/2)/(Y/2))))/((1+(Y/2))^{\wedge}((2*T)+1))))/(2*P)$ |
| | | where T = Maturity in years; P = Price (of 100) |
| S.3cn | generalized | Durmodan=DURMD= $((((C/N)/((Y/N)^{\wedge}2))*(1-(1/((1+(Y/N))^{\wedge}(N*T))))$ |
| | | $+(((N*T)*(100-((C/N)/(Y/N))))/((1+(Y/N))^{\wedge}((N*T)+1))))/(2*P)$ |
| | | where N=n= cash receipts per annum, e.g. semi-annual=2; T=Maturity in years |

Figure 25C

| S.4c | semi-annual | Convex = CON = $(((C/((Y/2)^{\wedge}3))*(1-(1/((1+(Y/2))^{\wedge}(2*T))))$ |
|---|---|---|
| | | $-((C*(2*T))/(((Y/2)^{\wedge}2)*((1+(Y/2))^{\wedge}((2*T)+1))))$ |
| | | $+(((2*T)*((2*T)+1)*(100-(C/Y)))/((1+(Y/2))^{\wedge}((2*T)+2))))/(4*P)$ |
| | | where T = Maturity in years; P = Price (of 100) |
| S.4cn | generalized | Convex = CONDP = $(((C/((Y/N)^{\wedge}3))*(1-(1/((1+(Y/N))^{\wedge}(N*T))))$ |
| | | $-((C*(N*T))/(((Y/N)^{\wedge}2)*((1+(Y/N))^{\wedge}((N*T)+1))))$ |
| | | $+(((N*T)*((N*T)+1)*(100-(C/Y)))/((1+(Y/N))^{\wedge}((N*T)+2))))/(4*P)$ |
| | | where N=n= # cash receipts per annum, e.g. semi-annual=2; T=Maturity in years |

Figure 25D

| S.5c | generalized | DeltaP = DP = $-$ (Durmodan)*(CHY) + (0.5*Convex*(CHY$^{\wedge}$2)) |
|---|---|---|
| | | where CHY(discrete)=$\Delta Y = (Y_1 - Y_0)$, $Y_0$=Y at start, $Y_1$=Y at second point in time |
| | | where CHY(continuous)=$\delta Y = (Y_1 - Y_0)$, $Y_0$=Y at start, $Y_1$=Y at second ($Y_1 \neq Y_0$) level |
| | | and where DeltaP = $-$abs(Duration S.3cn)*(CHY)+(0.5*(ConvexityS.4cn)*(CHY$^{\wedge}$2)) |

Figure 26A

| 1.2 | Yield M = YM = (sum{(Maturity*Portfolio Coefficient*YTM)$_1$, (M*PC*YTM)$_2$,...})/ (sum{(Maturity*Portfolio Coefficient)$_1$, (M*PC)$_2$,...}) |
|---|---|
| 1.2d | Yield Md = YMD = (sum{(Duration*PC*YTM)$_1$, (D*PC*YTM)$_2$,...})/ (sum{(Duration*Portfolio Coefficient)$_1$, (D*PC)$_2$,...}) |

Figure 26B 1.3cw K = DPDY = $((-C/(Y^2))*(1-((1+(.5*Y))^{(-2*T)})))$
semi-annual $+((C/Y)*((T+(.5*Y*T))^{((-2*T)}-1)))$
$-((T+(.5*Y*T))^{((-2*T)}-1))$
where C and Y are decimal values, T=Maturity in years 1.3cn K = BONK = $((-C/(Y^2))*(1-((1+(Y/N))^{(-N*T)})))$
generalized $+(((C/Y)-1)*T*((1+(Y/N))^{((-N*T)}-1)))$
where N=n= # cash receipts per annum, e.g. semi-annual=2; T=Maturity in years
and where BONK and DPDY not returning exact identical values for N=n=2

Figure 26C 1.4cn V = BONV = $(((2*C)/(Y^3))*(1-(Y/N))^{(-N*T)}))$
generalized $-((C/Y^2)*(2*T)*((1+(Y/N))^{((-N*T)}-1)))$
$-(((C/Y)-1)*(((N*T)+1)*(T/N))*((1+(Y/N))^{((-N*T)}-2)))$
where N=n= # cash receipts per annum, e.g. semi-annual=2; T=Maturity in years 1.4cv V = VEXA = $(((2*C)/(Y^3))-(((2*C)/(Y^3))*((1+(Y/2))^{(-2*T)}))$
spread-based, semi-annual $-((C*T)/(Y^2))*((1+(Y/2))^{((-2*T)}-1))$
$-((C/(Y^2))*((T+(T*(Y/2)))^{((-2*T)}-1)))$
$+((1+(C/Y))*((T^2)+(T/2))*((T+(T*(Y/2)))^{((-2*T)}-2))))/10000$
where e.g. Y=YieldM−YTM, Y expressed in decimal, i.e. if Y=0.14%=0.14

1.4cvn V = VEX = $(((2*C)/(Y^3))-(((2*C)/(Y^3))*((1+(Y/N))^{(-N*T)}))$
spread-based, generalized $-((C*T)/(Y^2))*((1+(Y/N))^{((-N*T)}-1))$
$-((C/(Y^2))*((T+(T*(Y/N)))^{((-N*T)}-1)))$
$+((1+(C/Y))*((T^2)+(T/N))*((T+(T*(Y/N)))^{((-N*T)}-2))))/10000$
where e.g. Y = Yield M, Y expressed in decimal, i.e. if Y = 6.06% = 0.606

Figure 26D 1.10c generalized $\Delta P$ = DELTAP = $K*(CHY) + (0.5*V*(CHY^2))$ and where $\Delta P$ = DELTAP = $-abs(Duration1.3n)*(CHY)+(0.5*(Convexity1.4cvn)*(CHY^2))$

Figure 26E 1.11 universal $\Delta P$ = DP = $-abs(Duration)*(CHY)+(0.5*(Convexity)*(CHY^2))$

Figure 27

1.111 $\quad \Delta P = A + B + C + D$ where,
$\Delta P$ = change in bid price, for given changes in yield and time
$A = -\text{abs}(\text{Duration}) \times \text{Price(dirty)} \times \Delta Y$
$B = \frac{1}{2} \times \text{Convexity} \times \text{Price(dirty)} \times (\Delta Y)^2$
$C = \text{Theta} \times \text{Price(dirty)} \times \Delta t$
$D = -(\Delta \text{ Accrued Interest, for given } \Delta t)$, wherein,
Y (YTM), computed on applicable day-count basis, by Formula S.1 or Formula S.2
Duration and Convexity, standard modified annualized, Formulae S.3 or 1.3, and S.4 or 1.4
Theta ($\theta$) recalculated at cash flow dates, such a theta: $\theta = 2 \ln(1+r/2)$, r = ytm
Price (dirty) equals bid price plus accumulated interest
$\Delta t$ is the elapsed time between two points in time on which the estimations are made
$\Delta P$ rounded to nearest pricing gradient per market price convention, $\Delta P$ occurring $\Delta t$.

Figure 28

1.112 $\quad \Delta Pp = Ap + Bp + Cp + Dp$ wherein,
p is on a portfolio basis, each security having a portfolio coefficient based on its portion of the present value, with Aggregate Value Calculations for Portfolio implemented, such a (P), establishing the Aggregate Values for Portfolio, comprising the identified process variables.

Figure 29

| Security T.-Note | Maturity | Yrs.toMat. | Coupon | N | YTM S.1 | Dura.S.3 | Conv.S.4 | Bid Price | FaceValue | Portfolio 1 Date 3/22/96 Acc.Intrst. | 3/22/96 Full Value | Portf.Coeff. |
|---|---|---|---|---|---|---|---|---|---|---|---|---|
| 1) | 11/15/96 | 0.652055 | 0.043875 | 2 | 0.054215 | 0.637565 | 0.692376 | 0.993438 | 100 | 1.52661 | 100.8704 | 0.142458 |
| 2) | 5/31/97 | 1.191781 | 0.06125 | 2 | 0.055941 | 1.147306 | 1.776839 | 1.005938 | 100 | 1.887842 | 102.4816 | 0.144733 |
| 3) | 10/31/97 | 1.610959 | 0.0575 | 2 | 0.05828 | 1.524786 | 2.93216 | 0.99875 | 100 | 2.236986 | 102.112 | 0.144211 |
| 4) | 8/15/98 | 2.4 | 0.05875 | 2 | 0.058155 | 2.26254 | 5.724236 | 1.00125 | 100 | 0.5875 | 100.7125 | 0.142235 |
| 5) | 3/31/99 | 3.024658 | 0.05875 | 2 | 0.058971 | 2.738688 | 8.449579 | 0.999375 | 100 | 2.792637 | 102.7301 | 0.145084 |
| 6) | 6/30/00 | 4.276712 | 0.05875 | 2 | 0.06057 | 3.791793 | 15.0302 | 0.993125 | 100 | 1.311815 | 100.6243 | 0.14211 |
| 7) | 2/28/01 | 4.942466 | 0.05625 | 2 | 0.060464 | 4.361264 | 19.24553 | 0.982188 | 100 | 0.32363 | 98.54238 | 0.13917 |
| Portfolio |  | 2.573496 | 0.056465 | 2 | 0.058074 | 2.341729 | 7.633073 | 0.996295 | 700 | 10.66702 | 708.0733 | 1 |
| Yield M= | 0.059202 |  |  |  |  |  |  |  |  |  |  |  |
| Yield Md= | 0.059150 |  |  |  |  |  |  |  |  |  |  |  |

| Security T.-Note | Maturity | Yrs.toMat. | Coupon | N | YTM S.1 | Dura.S.3 | Conv.S.4 | Bid Price | FaceValue | Portfolio 1 Date 4/3/96 Acc.Intrst. | Full Value | Portf.Coeff. |
|---|---|---|---|---|---|---|---|---|---|---|---|---|
| 1) | 11/15/96 | 0.619178 | 0.043875 | 2 | 0.054251 | 0.604598 | 0.639586 | 0.99375 | 100 | 1.670856 | 101.0459 | 0.143068 |
| 2) | 5/31/97 | 1.158904 | 0.06125 | 2 | 0.055804 | 1.114524 | 1.697799 | 1.005938 | 100 | 2.089212 | 102.683 | 0.145386 |
| 3) | 10/31/97 | 1.578082 | 0.0575 | 2 | 0.058518 | 1.491798 | 2.83211 | 0.998438 | 100 | 2.426027 | 102.2698 | 0.144801 |
| 4) | 8/15/98 | 2.367123 | 0.05875 | 2 | 0.058712 | 2.229469 | 5.589092 | 1 | 100 | 0.780651 | 100.7807 | 0.142692 |
| 5) | 3/31/99 | 2.991781 | 0.05875 | 2 | 0.05921 | 2.785597 | 8.293085 | 0.99875 | 100 | 0.048288 | 99.92329 | 0.141479 |
| 6) | 6/30/00 | 4.243836 | 0.05875 | 2 | 0.060498 | 3.758908 | 14.84181 | 0.993438 | 100 | 1.504966 | 100.8487 | 0.142789 |
| 7) | 2/28/01 | 4.909589 | 0.05625 | 2 | 0.060484 | 4.328625 | 19.03698 | 0.982188 | 100 | 0.508562 | 98.72731 | 0.139785 |
| Portfolio |  | 2.538885 | 0.056455 | 2 | 0.058196 | 2.318587 | 7.499582 | 0.996071 | 700 | 9.028562 | 706.2786 | 1 |
| Yield M= | 0.059334 |  |  |  |  |  |  |  |  |  |  |  |
| Yield Md= | 0.059285 |  |  |  |  |  |  |  |  |  |  |  |

| Security T-Note | from Dura.S.3 | 3/22/96 Conv.S.4 | Theta | to ΔYTM | 4/3/96 A+ dDuration | B+ dConvex | Portfolio 1 dP (of 100 par) C+ dTheta | D= dAccInt | dP (P of 100) dBid Price | RoundP | Actual ΔP | Change in Price Arb.Differ. |
|---|---|---|---|---|---|---|---|---|---|---|---|---|
| 1) | 0.637565 | 0.692376 | 0.053493 | 3.66E-05 | -0.00235 | 4.68E-08 | 0.177398 | -0.14425 | 0.030797 | 0.03125 | 0.03125 | -0.00045 |
| 2) | 1.147306 | 1.776839 | 0.055173 | -0.00014 | 0.01612 | 1.71E-06 | 0.185891 | -0.20137 | 0.000643 | 0 | 0 | 0.000643 |
| 3) | 1.524786 | 2.93216 | 0.057447 | 0.000238 | -0.03706 | 8.48E-06 | 0.192856 | -0.18904 | -0.03324 | -0.03125 | -0.03125 | -0.00199 |
| 4) | 2.26254 | 5.724236 | 0.057325 | 0.000558 | -0.12708 | 8.96E-05 | 0.189809 | -0.19315 | -0.13033 | -0.125 | -0.125 | -0.00533 |
| 5) | 2.738688 | 8.449579 | 0.058119 | 0.000238 | -0.06702 | 2.46E-05 | 0.196292 | -0.17705 | -0.04775 | -0.0625 | -0.0625 | 0.014746 |
| 6) | 3.791793 | 15.0302 | 0.059871 | -7.3E-05 | 0.027757 | 4E-06 | 0.197404 | -0.19315 | 0.032015 | 0.03125 | 0.03125 | 0.000765 |
| 7) | 4.361264 | 19.24553 | 0.059568 | 1.98E-05 | -0.00849 | 3.7E-07 | 0.192986 | -0.18493 | -0.00044 | 0 | 0 | -0.00044 |
| Portfolio | 2.341729 | 7.633073 | 0.057246 | 0.000126 | -0.02838 | 1.84E-05 | 0.190375 | -0.1833 | -0.02129 |  | -0.02246 | 0.001171 |
| ΔYield M= | 0.000132 |  |  |  | -0.034 | 7.29E-06 | 0.207585 | -0.1833 | -0.00971 |  | -0.02246 | 0.012754 |
| ΔYield Md= | 0.000135 |  |  |  | -0.03486 | 7.67E-06 | 0.207585 | -0.1833 | -0.01057 |  | -0.02246 | 0.011891 |

Sort by Arbitrage Differential                Portfolio 1

| Security | dBid Price | RoundP | Actual ΔP | Arb.Differ. |
|---|---|---|---|---|
| 5) | -0.04775 | -0.0625 | -0.0625 | 0.014746 |
| 6) | 0.032015 | 0.03125 | 0.03125 | 0.000765 |
| 2) | 0.000643 | 0 | 0 | 0.000643 |
| 7) | -0.00044 | 0 | 0 | -0.00044 |
| 1) | 0.030797 | 0.03125 | 0.03125 | -0.00045 |
| 3) | -0.03324 | 0 | -0.03125 | -0.00199 |
| 4) | -0.13033 | -0.125 | -0.125 | -0.00533 |

Portfolio YTM, Yield M and Md

| T-Note | dBid Price | Actual ΔP | Arb.Differ. |
|---|---|---|---|
| Portfolio | -0.02129 | -0.02246 | 0.001171 |
| Yield M | -0.00971 | -0.02246 | 0.012754 |
| Yield Md | -0.01057 | -0.02246 | 0.011891 |

Figure 30

| Security T.-Note | Maturity | Yrs.toMat. | Coupon | N | YTM S.2 | Dura.1.3 | Conv.1.4 | Bid Price | FaceValue | Acc.Intrst. | Full Value | Portf.Coeff. |
|---|---|---|---|---|---|---|---|---|---|---|---|---|
| | | | | | | Portfolio 1 | | | | Date 3/22/96 | | |
| 1) | 11/15/96 | 0.652055 | 0.043875 | 2 | 0.054254 | -0.62859 | 0.70427 | 0.993438 | 100 | 1.52661 | 100.8704 | 0.142458 |
| 2) | 5/31/97 | 1.191781 | 0.06125 | 2 | 0.05603 | -1.14238 | 1.866949 | 1.005938 | 100 | 1.887842 | 102.4816 | 0.144733 |
| 3) | 10/31/97 | 1.610959 | 0.0575 | 2 | 0.058324 | -1.51533 | 3.075528 | 0.99875 | 100 | 2.236986 | 102.112 | 0.144211 |
| 4) | 8/15/98 | 2.4 | 0.05875 | 2 | 0.058184 | -2.21188 | 6.118934 | 1.00125 | 100 | 0.5875 | 100.7125 | 0.142235 |
| 5) | 3/31/99 | 3.024658 | 0.05875 | 2 | 0.058979 | -2.73254 | 9.127492 | 0.999375 | 100 | 2.792637 | 102.7301 | 0.145084 |
| 6) | 6/30/00 | 4.276712 | 0.05875 | 2 | 0.060599 | -3.70301 | 16.54068 | 0.993125 | 100 | 1.311815 | 100.6243 | 0.14211 |
| 7) | 2/28/01 | 4.942466 | 0.05625 | 2 | 0.060473 | -4.17283 | 21.13105 | 0.982188 | 100 | 0.32363 | 98.54238 | 0.13917 |
| Portfolio | | 2.573496 | 0.056465 | 2 | 0.05811 | -2.29144 | 8.30004 | 0.996295 | 700 | 10.66702 | 708.0733 | 1 |
| Yield M= | 0.059228 | | | | | | | | | | | |
| Yield Md= | 0.059161 | | | | | | | | | | | |

| Security T.-Note | Maturity | Yrs.toMat. | Coupon | N | YTM S.2 | Dura.1.3 | Conv.1.4 | Bid Price | FaceValue | Acc.Intrst. | Full Value | Portf.Coeff. |
|---|---|---|---|---|---|---|---|---|---|---|---|---|
| | | | | | | Portfolio 1 | | | | Date 4/3/96 | | |
| 1) | 11/15/96 | 0.619178 | 0.043875 | 2 | 0.054276 | -0.59751 | 0.650485 | 0.99375 | 100 | 1.670856 | 101.0459 | 0.143068 |
| 2) | 5/31/97 | 1.158904 | 0.06125 | 2 | 0.055887 | -1.11203 | 1.782746 | 1.005938 | 100 | 2.089212 | 102.683 | 0.145386 |
| 3) | 10/31/97 | 1.578082 | 0.0575 | 2 | 0.058551 | -1.48514 | 2.967897 | 0.998438 | 100 | 2.426027 | 102.2698 | 0.144801 |
| 4) | 8/15/98 | 2.367123 | 0.05875 | 2 | 0.05875 | -2.1802 | 5.963126 | 1 | 100 | 0.780651 | 100.7807 | 0.142692 |
| 5) | 3/31/99 | 2.991781 | 0.05875 | 2 | 0.059212 | -2.70327 | 8.947306 | 0.99875 | 100 | 0.048288 | 99.92329 | 0.141479 |
| 6) | 6/30/00 | 4.243836 | 0.05875 | 2 | 0.060527 | -3.67928 | 16.32761 | 0.993438 | 100 | 1.504966 | 100.8487 | 0.142789 |
| 7) | 2/28/01 | 4.909589 | 0.05625 | 2 | 0.060498 | -4.14867 | 20.88824 | 0.982188 | 100 | 0.508562 | 98.72731 | 0.139785 |
| Portfolio | | 2.538885 | 0.056455 | 2 | 0.058228 | -2.26104 | 8.150018 | 0.996071 | 700 | 9.028562 | 706.2786 | 1 |
| Yield M= | 0.059359 | | | | | | | | | | | |
| Yield Md= | 0.059296 | | | | | | | | | | | |

| | | | | | Portfolio 1 | | | | Change in Price | | | |
|---|---|---|---|---|---|---|---|---|---|---|---|---|
| | from | 3/22/96 | to | 4/3/96 | dP (of 100 par) | | | | dP (P of 100) | | | |
| Security | | | | | A | B | C | D | | | | |
| T-Note | Dura.1.3 | Conv.1.4 | Theta | ΔYTM | dDuration | dConvex | dTheta | dAccInt | dBid Price | RounddP | Actual Δ P | Arb.Differ. |
| 1) | -0.62859 | 0.70427 | 0.053531 | 2.16E-05 | -0.00137 | 1.66E-08 | 0.177526 | -0.14425 | 0.031907 | 0.03125 | 0.03125 | 0.000657 |
| 2) | -1.14187 | 1.865863 | 0.05526 | -0.00014 | 0.016745 | 1.96E-06 | 0.186185 | -0.20137 | 0.001561 | 0 | 0 | 0.001561 |
| 3) | -1.51851 | 3.083538 | 0.05749 | 0.000226 | -0.03511 | 8.07E-06 | 0.193 | -0.18904 | -0.03114 | 0 | -0.03125 | 0.000106 |
| 4) | -2.21015 | 6.113276 | 0.057354 | 0.000566 | -0.12589 | 9.85E-05 | 0.189905 | -0.19315 | -0.12904 | -0.125 | -0.125 | -0.00404 |
| 5) | -2.7315 | 9.123469 | 0.058126 | 0.000233 | -0.0655 | 2.55E-05 | 0.196316 | -0.17705 | -0.04621 | -0.0625 | -0.0625 | 0.016289 |
| 6) | -3.70022 | 16.52665 | 0.059699 | -7.2E-05 | 0.026929 | 4.35E-06 | 0.197496 | -0.19315 | 0.031279 | 0.03125 | 0.03125 | 2.9E-05 |
| 7) | -4.16808 | 21.10424 | 0.059577 | 2.47E-05 | -0.01015 | 6.35E-07 | 0.193014 | -0.18493 | -0.00206 | 0 | 0 | -0.00206 |
| Portfolio | -2.29036 | 8.293923 | 0.057281 | 0.000122 | -0.02783 | 1.99E-05 | 0.190491 | -0.1833 | -0.02062 | | -0.02246 | 0.001841 |
| ΔYield M= | 0.000131 | | | | -0.03317 | 7.89E-06 | 0.20771 | -0.1833 | -0.00876 | | -0.02246 | 0.013704 |
| ΔYield Md= | 0.000136 | | | | -0.03429 | 8.43E-06 | 0.20771 | -0.1833 | -0.00988 | | -0.02246 | 0.012586 |

Sort by Arbitrage Differential   Portfolio 1

| Security | dBid Price | RounddP | Actual Δ P | Arb.Differ. |
|---|---|---|---|---|
| 5) | -0.04621 | -0.0625 | -0.0625 | 0.016289 |
| 2) | 0.001561 | 0 | 0 | 0.001561 |
| 1) | 0.031907 | 0.03125 | 0.03125 | 0.000657 |
| 3) | -0.03114 | 0 | -0.03125 | 0.000106 |
| 6) | 0.031279 | 0.03125 | 0.03125 | 2.9E-05 |
| 7) | -0.00206 | 0 | 0 | -0.00206 |
| 4) | -0.12904 | -0.125 | -0.125 | -0.00404 |

Portfolio YTM, Yield M and Md

| T-Note | dBid Price | Actual Δ P | Arb.Differ. |
|---|---|---|---|
| Portfolio | -0.02062 | -0.02246 | 0.001841 |
| Yield M | -0.00876 | -0.02246 | 0.013704 |
| Yield Md | -0.00988 | -0.02246 | 0.012586 |

Figure 36

| Replicant A: Replicated Equivalent Primary Security (using intermediate T-Notes) | | | |
|---|---|---|---|
| | 1) | 2) | 3) |
| Maturity: | 5/96 | 11/96 | 5/97 |
| Matur. yrs. fr. 4/3/96 | .114754 | .614754 | 1.114754 |
| Coupon: | 7.375% | 7.25% | 8.50% |
| Cheapest Ask Yield: | 4.46% | 5.28% | 5.48% |
| Bid Prices: | 100:07; same | 101:03; same | 103:04; same |
| Ask Prices: | 100:09; :10 | 101:05; :06 | 103:06; :07 |
| Repl. Coefficient: | -0.8895348 | -0.9222442 | -0.95576775 |
| Face Value: | ($444,767) | ($461,121) | ($477,887) |
| Best Price: | ($445,740) | ($446,165) | ($492,821) |
| Accrued Interest: | ($12,636) | ($12,968) | ($15,649) |
| Total Cost (P+AI): | ($458,376) | ($479,133) | ($508,470) |
| Duration (mod. ann.): | (0.113957) | (0.597015) | (1.059356) |
| Convexity (mod. ann.) | (0.068846) | (0.647529) | (1.651005) |
| | 4) | 5) | 6) |
| Maturity: | 11/97 | 5/98 | 11/98 |
| Matur. yrs. fr. 4/3/96 | 1.614754 | 2.114754 | 2.614754 |
| Coupon: | 8.875% | 9.00% | 8.875% |
| Cheapest Ask Yield: | 5.71% | 5.78% | 5.85% |
| Bid Prices: | 104:23; same | 106:07; same | 107:03; :02 |
| Ask Prices: | 104:25; :27 | 106:09; :11 | 107:03; :06 |
| Repl. Coefficient: | -0.9963879 | -1.0406026 | -1.0874297 |
| Face Value: | ($498,193) | ($520,302) | ($543,715) |
| Best Price: | ($521,702) | ($552,658) | ($582,285) |
| Accrued Interest: | ($17,034) | ($18,040) | ($18,590) |
| Total Cost (P+AI): | ($538,736) | ($570,698) | ($600,875) |
| Duration (mod. ann.): | (1.500120) | (1.923568) | (2.334071) |
| Convexity (mod. ann.) | (3.035738) | (4.776208) | (6.855101) |
| | 7) | | |
| Maturity: | 5/99 | | |
| Matur. yrs. fr. 4/3/96 | 3.114754 | | |
| Coupon: | 9.125% | | |
| Cheapest Ask Yield: | 5.94% | | |
| Bid Prices: | 108:27; :26 | | |
| Ask Prices: | 108:29; :30 | | |
| Repl. Coefficient: | 98.864316 | | |
| Face Value: | $49,460,543 | | |
| Best Price: | $53,834,709 | | |
| Accrued Interest: | $1,737,723 | | |
| Total Cost (P+AI): | $55,572,432 | | |
| Duration (mod. ann.): | 2.718305 | | |
| Convexity (mod. ann.) | 9.188165 | | |
| Values for Replicant A: | | | |
| Total Cost: | $52,416,144 | | |
| Duration: | 2.610444 | | |

Figure 37

| Replicant B: Replicated Equivalent Primary Security (using zero-coupon STRIPS) | | | |
|---|---|---|---|
| | 1) | 2) | 3) |
| Maturity: | 5/96 | 11/96 | 5/97 |
| Matur, yrs. fr. 4/3/96 | .114754 | .614754 | 1.114754 |
| Coupon: | None | None | None |
| Yield: | 5.20% | 5.31% | 5.55% |
| Bid Prices: | 99:15; same | 96:27; :28 | 94:04; same |
| Ask Prices: | 99:15; same | 96:28; :29 | 94:04; :05 |
| Face Value: | $1,687,500 | $1,687,500 | $1,687,500 |
| Total Cost: | $1,678,535 | $1,634,766 | $1,588,359 |
| | 4) | 5) | 6) |
| Maturity: | 11/97 | 5/98 | 11/98 |
| Matur, yrs. fr. 4/3/96 | 1.614754 | 2.114754 | 2.614754 |
| Coupon: | None | None | None |
| Yield: | 5.73% | 5.82% | 5.90% |
| Bid Prices: | 91:10; same | 88:19; same | 85:28; :30 |
| Ask Prices: | 91:11; same | 88:20; same | 85:30; 86:00 |
| Face Value: | $1,687,500 | $1,687,500 | $1,687,500 |
| Total Cost: | $1,541,426 | $1,495,547 | $1,450,196 |
| | 7) | | |
| Maturity: | 5/99 | | |
| Matur, yrs. fr. 4/3/96 | 3.114754 | | |
| Coupon: | None | | |
| Cheapest Ask Yield: | 5.95% | | |
| Bid Prices: | 83:08; :10 | | |
| Ask Prices: | 83:10; :12 | | |
| Face Value: | $51,687,500 | | |
| Total Cost: | $43,062,148 | | |
| Values for Replicant B: | | | |
| Total Cost: | $52,450,977 | | |
| Duration: | 2.828008 | | |

Figure 38

| Replicant C: Replicated Equivalent Primary Security (using intermediate T-Notes) | | | |
|---|---|---|---|
| | 1) | 2) | 3) |
| Maturity: | 5/96 | 11/96 | 5/97 |
| Matur, yrs. fr. 4/3/96 | .114754 | .614754 | 1.114754 |
| Coupon: | 7.375% | 7.25% | 8.50% |
| Cheapest Ask Yield: | 4.46% | 5.28% | 5.48% |
| Bid Prices: | 100:07; same | 101:03; same | 103:04; same |
| Ask Prices: | 100:09; :10 | 101:05; :06 | 103:06; :07 |
| Repl. Coefficient: | -0.91302988 | -0.9466032 | -0.98101223 |
| Face Value: | ($456,515) | ($473,301) | ($490,506) |
| Best Price: | ($457,514) | ($478,478) | ($505,834) |
| Accrued Interest: | ($12,970) | ($13,219) | ($16,062) |
| Total Cost (P+AI): | ($470,484) | ($491,697) | ($521,896) |
| Duration (mod. ann.): | (0.113953) | (0.597015) | (1.059356) |
| Convexity (mod. ann.) | (0.068843) | (0.647529) | (1.651005) |
| | 4) | 5) | 6) |
| Maturity: | 11/97 | 5/98 | 11/98 |
| Matur, yrs. fr. 4/3/96 | 1.614754 | 2.114754 | 2.614754 |
| Coupon: | 8.875% | 9.00% | 3.50% |
| Cheapest Ask Yield: | 5.71% | 5.78% | 3.08% |
| Bid Prices: | 104:23; same | 106:07; same | 100:01; 99:18 |
| Ask Prices: | 104:25; :27 | 106:09; :11 | 100:01; 100:18 |
| Repl. Coefficient: | -1.0227052 | -1.06808799 | -1.1161517 |
| Face Value: | ($511,353) | ($534,043) | ($558,076) |
| Best Price: | ($535,482) | ($567,254) | ($558,250) |
| Accrued Interest: | ($17,483) | ($18,516) | ($7,525) |
| Total Cost (P+AI): | ($552,965) | ($585,770) | ($565,775) |
| Duration (mod. ann.): | (1.500120) | (1.923568) | (2.507384) |
| Convexity (mod. ann.) | (3.035754) | (4.776208) | (7.597885) |
| | 7) | | |
| Maturity: | 5/99 | | |
| Matur, yrs. fr. 4/3/96 | 3.114754 | | |
| Coupon: | 9.125% | | |
| Cheapest Ask Yield: | 5.94% | | |
| Bid Prices: | 108:27; :26 | | |
| Ask Prices: | 108:29; :30 | | |
| Repl. Coefficient: | 98.864316 | | |
| Face Value: | $49,460,543 | | |
| Best Price: | $53,834,709 | | |
| Accrued Interest: | $1,737,723 | | |
| Total Cost (P+AI): | $55,572,432 | | |
| Duration (mod. ann.): | 2.716745 | | |
| Convexity (mod. ann.) | 9.182892 | | |
| Values for Replicant C: | | | |
| Total Cost: | $52,383,845 | | |
| Duration: | 2.603796 | | |

Figure 39

| Target Security, a U.S. Treasury Note, held to mature 5/15/99, as on April 3, 1996: | |
|---|---|
| Maturity: | May 1999 |
| Coupon: | 6.75% per annum, semi-annual payments |
| Prices: Bid/Ask | 102:07; 102:07 / 102:09; 102:11 |
| Face Value: | $50 million |
| Best Price: | $51,140,625 |
| Accrued Interest: | $1,300,205 |
| Total Cost (P+AI): | $52,440,830 |
| Duration (mod. ann.): | 2.782972 |

Figure 40

|        | of Duration |                              |                           |
|--------|-------------|------------------------------|---------------------------|
| Target | 2.7829      | can be sold for $52,409,580  | and bought for $52,440,830 |
| REPS A | 2.6104      | can be sold for $52,383,749  | and bought for $52,416,144 |
| REPS B | 2.8280      | can be sold for $52,450,920  | and bought for $52,450,977 |
| REPS C | 2.6038      | can be sold for $52,351,321  | and bought for $52,383,845 |

Figure 41

Arbitrage Opportunities

| Buying | Selling | $ Arb. Differ. | Spread bp |
|---|---|---|---|
| Target | A | -31250 | -0.0006 |
| Target | B | -57081 | -0.00109 |
| Target | C | -89509 | -0.00171 |
| A | Target | -6564 | -0.00013 |
| A | B | 34776 | 0.000663 |
| A | C | -64823 | -0.00124 |
| B | Target | -41397 | -0.00079 |
| B | A | -67228 | -0.00128 |
| B | C | -99656 | -0.0019 |
| C | Target | 25735 | 0.000491 |
| C | A | -96 | -1.8E-06 |
| C | B | 67075 | 0.00128 |

Sorted Arbitrage Opportunities

| Buying | Selling | $ Arb. Diff. | Spread bp |
|---|---|---|---|
| C | B | 67075 | 0.00128 |
| A | B | 34776 | 0.000663 |
| C | Target | 25735 | 0.000491 |
| C | A | -96 | -1.8E-06 |
| A | Target | -6564 | -0.00013 |
| Target | A | -31250 | -0.0006 |
| B | Target | -41397 | -0.00079 |
| Target | B | -57081 | -0.00109 |
| A | C | -64823 | -0.00124 |
| B | A | -67228 | -0.00128 |
| Target | C | -89509 | -0.00171 |
| B | C | -99656 | -0.0019 |

Figure 47

| Scalar | | Nominal $ Values | | | | | Adj $ 1972 Values | | | |
|---|---|---|---|---|---|---|---|---|---|---|
| Value $ Basis1972 CPI | Annual Year End Year End | Actual $B DepositsCl FDIC | Actual $B Catastroph Loss,PCS | Actual $B Net Deposi Loss | Actual $B Statutory L P/C Unden | Annual Year End Year End | Adj$ 1972 DepCl | Adj1972 $E CatLoss | Adj$1972 DepLoss | Adj $B Stat Loss Underwr |
| 0.26699 | 12/31/96 | | 7.35 | | | 12/31/96 | | 1.962379 | | |
| 0.275 | 12/31/95 | 0.632 | 8.335 | 0.332 | 14.2 | 12/31/95 | 0.1738 | 2.292125 | 0.0913 | 3.905 |
| 0.2875 | 12/31/94 | 1.236 | 17.045 | 0.636 | 19 | 12/31/94 | 0.35535 | 4.900438 | 0.18285 | 5.4625 |
| 0.2875 | 12/31/93 | 3.132 | 5.585 | 2.132 | 15.1 | 12/31/93 | 0.90045 | 1.605688 | 0.61295 | 4.34125 |
| 0.3 | 12/31/92 | 40.94 | 22.974 | 32.34 | 33.3 | 12/31/92 | 12.282 | 6.8922 | 9.702 | 9.99 |
| 0.3125 | 12/31/91 | 53.832 | 4.711 | 39.732 | 16.7 | 12/31/91 | 16.8225 | 1.472188 | 12.41625 | 5.21875 |
| 0.325 | 12/31/90 | 14.489 | 2.807 | 6.889 | 18.2 | 12/31/90 | 4.708925 | 0.912275 | 2.238925 | 5.915 |
| 0.3375 | 12/31/89 | 22.28 | 7.642 | 17.58 | 16.5 | 12/31/89 | 7.5195 | 2.579175 | 5.93325 | 5.56875 |
| 0.35 | 12/31/88 | 36.432 | 1.409 | 32.132 | 8.4 | 12/31/88 | 12.7512 | 0.49315 | 11.2462 | 2.94 |
| 0.3625 | 12/31/87 | 8.4 | 0.946 | 5.4 | 7.1 | 12/31/87 | 3.045 | 0.342925 | 1.9575 | 2.57375 |
| 0.375 | 12/31/86 | 7.057 | 0.871 | 4.057 | 13.7 | 12/31/86 | 2.646375 | 0.326625 | 1.521375 | 5.1375 |
| 0.3875 | 12/31/85 | 8.059 | 2.816 | 6.359 | 22.6 | 12/31/85 | 3.122863 | 1.0912 | 2.464113 | 8.7575 |
| 0.4 | 12/31/84 | 20.334 | 1.548 | 14.834 | 19.4 | 12/31/84 | 8.1336 | 0.6192 | 5.9336 | 7.76 |
| 0.425 | 12/31/83 | 5.442 | 2.255 | 3.242 | 11.1 | 12/31/83 | 2.31285 | 0.958375 | 1.37785 | 4.7175 |
| 0.4375 | 12/31/82 | 9.904 | 1.523 | 9.104 | 8.3 | 12/31/82 | 4.333 | 0.666313 | 3.983 | 3.63125 |
| 0.4625 | 12/31/81 | 3.826 | 0.714 | 3.756 | 4.5 | 12/31/81 | 1.769525 | 0.330225 | 1.73715 | 2.08125 |
| 0.5125 | 12/31/80 | 5.516 | 1.178 | 5.416 | 1.7 | 12/31/80 | 2.82695 | 0.603725 | 2.7757 | 0.87125 |
| 0.575 | 12/31/79 | 0.111 | 1.705 | | -0.02 | 12/31/79 | 0.063825 | 0.980375 | | -0.0115 |
| 0.6375 | 12/31/78 | 0.854 | 0.645 | | -2.5 | 12/31/78 | 0.544425 | 0.411188 | | -1.59375 |
| 0.6875 | 12/31/77 | 0.205 | 0.423 | | -1.9 | 12/31/77 | 0.140938 | 0.290813 | | -1.30625 |
| 0.7375 | 12/31/76 | 1.235 | 0.271 | | 1.6 | 12/31/76 | 0.910813 | 0.199863 | | 1.18 |
| 0.775 | 12/31/75 | 0.34 | 0.513 | | 3.6 | 12/31/75 | 0.2635 | 0.397575 | | 2.79 |
| 0.85 | 12/31/74 | 1.576 | 0.696 | | 1.9 | 12/31/74 | 1.3396 | 0.5916 | | 1.615 |
| 0.9375 | 12/31/73 | 0.971 | 0.375 | | -0.8 | 12/31/73 | 0.910313 | 0.351563 | | -0.75 |
| 1 | 12/31/72 | 0.02 | 0.214 | | -1.8 | 12/31/72 | 0.02 | 0.214 | | -1.8 |
| | 12/31/71 | 0.141 | 0.173 | | -1.4 | 12/31/71 | 0.141 | 0.173 | | -1.4 |
| | 12/31/70 | 0.052 | 0.45 | | | 12/31/70 | 0.052 | 0.45 | | |
| | 12/31/69 | 0.04 | 0.256 | | | 12/31/69 | 0.04 | 0.256 | | |
| | 12/31/68 | 0.023 | 0.134 | | | 12/31/68 | 0.023 | 0.134 | | |
| | 12/31/67 | 0.011 | 0.327 | | | 12/31/67 | 0.011 | 0.327 | | |
| | 12/31/66 | 0.104 | 0.111 | | | 12/31/66 | 0.104 | 0.111 | | |
| | 12/31/65 | 0.044 | 0.694 | | | 12/31/65 | 0.044 | 0.694 | | |
| | 12/31/64 | 0.023 | 0.196 | | | 12/31/64 | 0.023 | 0.196 | | |
| | 12/31/63 | 0.023 | 0.034 | | | 12/31/63 | 0.023 | 0.034 | | |
| | 12/31/62 | 0.003 | 0.197 | | | 12/31/62 | 0.003 | 0.197 | | |
| | 12/31/61 | 0.009 | 0.184 | | | 12/31/61 | 0.009 | 0.184 | | |
| | 12/31/60 | 0.007 | 0.129 | | | 12/31/60 | 0.007 | 0.129 | | |
| | 12/31/59 | 0.003 | 0.048 | | | 12/31/59 | 0.003 | 0.048 | | |
| | 12/31/58 | | 0.025 | | | 12/31/58 | | 0.025 | | |
| | 12/31/57 | 0.011 | 0.073 | | | 12/31/57 | 0.011 | 0.073 | | |
| | 12/31/56 | 0.011 | 0.072 | | | 12/31/56 | 0.011 | 0.072 | | |
| | 12/31/55 | 0.012 | 0.095 | | | 12/31/55 | 0.012 | 0.095 | | |
| | 12/31/54 | 0.001 | 0.299 | | | 12/31/54 | 0.001 | 0.299 | | |
| | 12/31/53 | 0.044 | 0.089 | | | 12/31/53 | 0.044 | 0.089 | | |
| | 12/31/52 | 0.003 | 0.024 | | | 12/31/52 | 0.003 | 0.024 | | |
| | 12/31/51 | 0.003 | 0.017 | | | 12/31/51 | 0.003 | 0.017 | | |
| | 12/31/50 | 0.006 | 0.231 | | | 12/31/50 | 0.006 | 0.231 | | |
| | 12/31/49 | 0.006 | 0.022 | | | 12/31/49 | 0.006 | 0.022 | | |
| | 12/31/48 | 0.01 | | | | 12/31/48 | 0.01 | | | |
| | 12/31/47 | 0.007 | | | | 12/31/47 | 0.007 | | | |
| | 12/31/46 | 0.001 | | | | 12/31/46 | 0.001 | | | |
| | 12/31/45 | 0.006 | | | | 12/31/45 | 0.006 | | | |
| | 12/31/44 | 0.002 | | | | 12/31/44 | 0.002 | | | |
| | 12/31/43 | 0.012 | | | | 12/31/43 | 0.012 | | | |
| | 12/31/42 | 0.017 | | | | 12/31/42 | 0.017 | | | |
| | 12/31/41 | 0.03 | | | | 12/31/41 | 0.03 | | | |
| | 12/31/40 | 0.144 | | | | 12/31/40 | 0.144 | | | |
| | 12/31/39 | 0.161 | | | | 12/31/39 | 0.161 | | | |
| | 12/31/38 | 0.062 | | | | 12/31/38 | 0.062 | | | |
| | 12/31/37 | 0.033 | | | | 12/31/37 | 0.033 | | | |
| | 12/31/36 | 0.028 | | | | 12/31/36 | 0.028 | | | |
| | 12/31/35 | 0.013 | | | | 12/31/35 | 0.013 | | | |
| | 12/31/34 | 0.002 | | | | 12/31/34 | 0.002 | | | |

Figure 48

| LN Adj$ 1972 Values | | | | LN Adj$ 1972 delta Values | | | | |
|---|---|---|---|---|---|---|---|---|
| Annual Year End | LN DepCl Adj$ 1972 LN DepCl | Adj1972 $B CatLoss LN | LN Adj$ DepLoss | LN Adj $B Stat Loss Underwr | Annual Year End | Adj$ 1972 DepCl LN Delta | LN Delta CatLoss | LN delta DepLoss | LN delta Adj$BStat Loss Unwr |
| 12/31/96 | | | | | 12/31/96 | | | | |
| 12/31/95 | -1.74985 | 0.829479 | -2.3936 | 1.362258 | 12/31/95 | -0.7152 | -0.75985 | -0.69452 | -0.2912 |
| 12/31/94 | -1.03465 | 1.589324 | -1.69909 | 1.697907 | 12/31/94 | -0.92979 | 1.115772 | -1.20962 | 0.229744 |
| 12/31/93 | -0.10486 | 0.473552 | -0.48947 | 1.468162 | 12/31/93 | -2.613 | -1.45684 | -2.7618 | -0.79086 |
| 12/31/92 | 2.508135 | 1.93039 | 2.272332 | 2.301585 | 12/31/92 | -0.31458 | 1.543641 | -0.24667 | 0.690149 |
| 12/31/91 | 2.822717 | 0.386749 | 2.519006 | 1.652258 | 12/31/91 | 1.273258 | 0.478563 | 1.71301 | -0.08601 |
| 12/31/90 | 1.54946 | -0.09181 | 0.805996 | 1.777491 | 12/31/90 | -0.46804 | -1.03928 | -0.97458 | 0.098061 |
| 12/31/89 | 2.0175 | 0.94747 | 1.780572 | 1.717171 | 12/31/89 | -0.52813 | 1.654411 | -0.63946 | 0.675129 |
| 12/31/88 | 2.545625 | -0.70694 | 2.42003 | 1.07841 | 12/31/88 | 1.432124 | 0.363302 | 1.748362 | 0.168137 |
| 12/31/87 | 1.113501 | -1.07024 | 0.671668 | 0.945364 | 12/31/87 | 0.14031 | 0.048699 | 0.252054 | -0.6573 |
| 12/31/86 | 0.973191 | -1.11894 | 0.419615 | 1.636567 | 12/31/86 | -0.16556 | -1.20622 | -0.48222 | -0.50055 |
| 12/31/85 | 1.13875 | 0.087278 | 0.901832 | 2.16991 | 12/31/85 | -0.95725 | 0.566605 | -0.8788 | 0.152677 |
| 12/31/84 | 2.096004 | -0.47933 | 1.780631 | 2.048982 | 12/31/84 | 1.257523 | -0.43681 | 1.460107 | 0.558328 |
| 12/31/83 | 0.838481 | -0.04252 | 0.320524 | 1.551279 | 12/31/83 | -0.62778 | 0.36348 | -1.06151 | 0.29069 |
| 12/31/82 | 1.46626 | -0.406 | 1.382035 | 1.289577 | 12/31/82 | 0.895549 | 0.701985 | 0.829789 | 0.612178 |
| 12/31/81 | 0.570711 | -1.10798 | 0.552246 | 0.732969 | 12/31/81 | -0.46849 | -0.60334 | -0.46866 | 0.973449 |
| 12/31/80 | 1.039198 | -0.50464 | 1.020903 | -0.13783 | 12/31/80 | 3.790809 | -0.48482 | | |
| 12/31/79 | -2.75161 | -0.01982 | | -0.2 | 12/31/79 | -2.14359 | 0.868886 | | 0 |
| 12/31/78 | -0.60803 | -0.88871 | | -0.3 | 12/31/78 | 1.351414 | 0.346371 | | 0 |
| 12/31/77 | -1.95944 | -1.23508 | | -0.2 | 12/31/77 | -1.86602 | 0.375049 | | 0 |
| 12/31/76 | -0.09342 | -1.61013 | | 0.165514 | 12/31/76 | 1.240284 | -0.68775 | | -0.81093 |
| 12/31/75 | -1.3337 | -0.92237 | | 1.026042 | 12/31/75 | -1.62607 | -0.39745 | | 0.63908 |
| 12/31/74 | 0.292371 | -0.52492 | | 0.479335 | 12/31/74 | 0.386338 | 0.520443 | | 0 |
| 12/31/73 | -0.09397 | -1.04537 | | -0.2 | 12/31/73 | 3.818056 | 0.496411 | | 0 |
| 12/31/72 | -3.91202 | -1.54178 | | -0.3 | 12/31/72 | -1.95303 | 0.212684 | | |
| 12/31/71 | -1.959 | -1.75446 | | -0.2 | 12/31/71 | 0.997516 | -0.95596 | | |
| 12/31/70 | -2.95651 | -0.79851 | | | 12/31/70 | 0.262364 | 0.56407 | | |
| 12/31/69 | -3.21888 | -1.36258 | | | 12/31/69 | 0.553385 | 0.647338 | | |
| 12/31/68 | -3.77226 | -2.00992 | | | 12/31/68 | 0.737599 | -0.89212 | | |
| 12/31/67 | -4.50986 | -1.1178 | | | 12/31/67 | -2.2465 | 1.08043 | | |
| 12/31/66 | -2.26336 | -2.19823 | | | 12/31/66 | 0.860201 | -1.83294 | | |
| 12/31/65 | -3.12357 | -0.36528 | | | 12/31/65 | 0.648695 | 1.264357 | | |
| 12/31/64 | -3.77226 | -1.62964 | | | 12/31/64 | 0 | 1.751754 | | |
| 12/31/63 | -3.77226 | -3.38139 | | | 12/31/63 | 2.036882 | -1.75684 | | |
| 12/31/62 | -5.80914 | -1.62455 | | | 12/31/62 | -1.09861 | 0.068268 | | |
| 12/31/61 | -4.71053 | -1.69282 | | | 12/31/61 | 0.251314 | 0.355123 | | |
| 12/31/60 | -4.96185 | -2.04794 | | | 12/31/60 | 0.847298 | 0.988611 | | |
| 12/31/59 | -5.80914 | -3.03655 | | | 12/31/59 | | 0.652325 | | |
| 12/31/58 | | -3.68888 | | | 12/31/58 | | -1.07158 | | |
| 12/31/57 | -4.50986 | -2.6173 | | | 12/31/57 | 0 | 0.013793 | | |
| 12/31/56 | -4.50986 | -2.63109 | | | 12/31/56 | -0.08701 | -0.27721 | | |
| 12/31/55 | -4.42285 | -2.35388 | | | 12/31/55 | 2.484907 | -1.14657 | | |
| 12/31/54 | -6.90776 | -1.20731 | | | 12/31/54 | -3.78419 | 1.211807 | | |
| 12/31/53 | -3.12357 | -2.41912 | | | 12/31/53 | 2.685577 | 1.310583 | | |
| 12/31/52 | -5.80914 | -3.7297 | | | 12/31/52 | 0 | 0.34484 | | |
| 12/31/51 | -5.80914 | -4.07454 | | | 12/31/51 | -0.69315 | -2.6092 | | |
| 12/31/50 | -5.116 | -1.46534 | | | 12/31/50 | 0 | 2.351375 | | |
| 12/31/49 | -5.116 | -3.81671 | | | 12/31/49 | -0.51083 | | | |
| 12/31/48 | -4.60517 | | | | 12/31/48 | 0.356675 | | | |
| 12/31/47 | -4.96185 | | | | 12/31/47 | 1.94591 | | | |
| 12/31/46 | -6.90776 | | | | 12/31/46 | -1.79176 | | | |
| 12/31/45 | -5.116 | | | | 12/31/45 | 1.098612 | | | |
| 12/31/44 | -6.21461 | | | | 12/31/44 | -1.79176 | | | |
| 12/31/43 | -4.42285 | | | | 12/31/43 | -0.34831 | | | |
| 12/31/42 | -4.07454 | | | | 12/31/42 | -0.56798 | | | |
| 12/31/41 | -3.50656 | | | | 12/31/41 | -1.56862 | | | |
| 12/31/40 | -1.93794 | | | | 12/31/40 | -0.11159 | | | |
| 12/31/39 | -1.82635 | | | | 12/31/39 | 0.95427 | | | |
| 12/31/38 | -2.78062 | | | | 12/31/38 | 0.630627 | | | |
| 12/31/37 | -3.41125 | | | | 12/31/37 | 0.164303 | | | |
| 12/31/36 | -3.57555 | | | | 12/31/36 | 0.767255 | | | |
| 12/31/35 | -4.34281 | | | | 12/31/35 | 1.871802 | | | |
| 12/31/34 | -6.21461 | | | | 12/31/34 | | | | |

Figure 62

| Deposits Closed 1973-1995 | | | | | | | | | |
|---|---|---|---|---|---|---|---|---|---|
| Act$BDepCl | | Adj$BDepCl | | LN Adj$BDepCl | | LN deltaAdj$BDepCl | | A( | |
| Mean | 10.73057 | Mean | 3.820752 | Mean | 0.488799 | Mean | 0.094008 | | |
| Standard E | 3.063359 | Standard E | 0.965447 | Standard E | 0.31951 | Standard E | 0.342661 | | |
| Median | 5.442 | Median | 2.31285 | Median | 0.838481 | Median | -0.31458 | | |
| Mode | #N/A | Mode | #N/A | Mode | #N/A | Mode | #N/A | | |
| Standard C | 14.69135 | Standard C | 4.630121 | Standard C | 1.532316 | Standard C | 1.643344 | | |
| Sample Va | 215.8359 | Sample Va | 21.43802 | Sample Va | 2.347993 | Sample Va | 2.70058 | | |
| Kurtosis | 2.753699 | Kurtosis | 1.983528 | Kurtosis | -0.54742 | Kurtosis | 0.609058 | | |
| Skewness | 1.838003 | Skewness | 1.639766 | Skewness | -0.43029 | Skewness | 0.721656 | | |
| Range | 53.721 | Range | 16.75868 | Range | 5.574328 | Range | 6.431051 | | |
| Minimum | 0.111 | Minimum | 0.063825 | Minimum | -2.75161 | Minimum | -2.613 | | |
| Maximum | 53.832 | Maximum | 16.8225 | Maximum | 2.822717 | Maximum | 3.818056 | | |
| Sum | 246.803 | Sum | 87.8773 | Sum | 11.24238 | Sum | 2.162173 | | |
| Count | 23 | Count | 23 | Count | 23 | Count | 23 | | |
| Confidence | 6.353025 | Confidence | 2.002217 | Confidence | 0.662624 | Confidence | 0.710636 | | |

Figure 63

| Catastrophe Loss, 1973-1995 | | | | | | | | |
|---|---|---|---|---|---|---|---|---|
| Act$BCatLoss | | Adj$BCatLoss | | LNAdj$BCatLoss | | LNdeltaAdj$BCatLoss | | |
| Mean | 3.782043 | Mean | 1.274296 | Mean | -0.24046 | Mean | 0.103098 | |
| Standard E | 1.181391 | Standard E | 0.336855 | Standard E | 0.19276 | Standard E | 0.175688 | |
| Median | 1.523 | Median | 0.6192 | Median | -0.47933 | Median | 0.363302 | |
| Mode | #N/A | Mode | #N/A | Mode | #N/A | Mode | #N/A | |
| Standard C | 5.665751 | Standard C | 1.615499 | Standard C | 0.924446 | Standard C | 0.842568 | |
| Sample Va | 32.10073 | Sample Va | 2.609836 | Sample Va | 0.854601 | Sample Va | 0.709921 | |
| Kurtosis | 6.303979 | Kurtosis | 6.897762 | Kurtosis | 0.155053 | Kurtosis | -0.63766 | |
| Skewness | 2.518331 | Skewness | 2.595322 | Skewness | 0.831655 | Skewness | -0.06046 | |
| Range | 22.703 | Range | 6.692338 | Range | 3.540516 | Range | 3.11125 | |
| Minimum | 0.271 | Minimum | 0.199863 | Minimum | -1.61013 | Minimum | -1.45684 | |
| Maximum | 22.974 | Maximum | 6.8922 | Maximum | 1.93039 | Maximum | 1.654411 | |
| Sum | 86.987 | Sum | 29.3088 | Sum | -5.53055 | Sum | 2.371259 | |
| Count | 23 | Count | 23 | Count | 23 | Count | 23 | |
| Confidence | 2.450057 | Confidence | 0.698595 | Confidence | 0.399761 | Confidence | 0.364354 | |

Figure 64

| LN Deposit Closings, 1979-95 | | LN Cat Losses, 1979-9 | |
|---|---|---|---|
| *Column1* | | *Column1* | |
| Mean | 1.881462 | Mean | 1.037784 |
| Standard E | 0.384475 | Standard E | 0.252061 |
| Median | 2.086789 | Median | 0.81315 |
| Mode | #N/A | Mode | #N/A |
| Standard D | 1.585229 | Standard D | 1.039273 |
| Sample Va | 2.512951 | Sample Va | 1.080089 |
| Kurtosis | 1.519364 | Kurtosis | -0.49638 |
| Skewness | -1.09525 | Skewness | 0.669703 |
| Range | 6.184093 | Range | 3.471235 |
| Minimum | -2.19823 | Minimum | -0.33687 |
| Maximum | 3.985868 | Maximum | 3.134363 |
| Sum | 31.98486 | Sum | 17.64232 |
| Count | 17 | Count | 17 |
| Confidence | 0.815049 | Confidence | 0.534345 |

Figure 65

| LN delta Adj1972 $ DepClose and CatLoss 1934-1995           1949-1996 | | | |
|---|---|---|---|
| *DepClosed* | | *CatLoss* | |
| Mean | 0.097696 | Mean | 0.09555 |
| Standard E | 0.191481 | Standard E | 0.151993 |
| Median | 0 | Median | 0.346371 |
| Mode | 0 | Mode | #N/A |
| Standard D | 1.470796 | Standard D | 1.042011 |
| Sample Va | 2.163242 | Sample Va | 1.085787 |
| Kurtosis | 0.609433 | Kurtosis | -0.05102 |
| Skewness | 0.095751 | Skewness | -0.32992 |
| Range | 7.602245 | Range | 4.96058 |
| Minimum | -3.78419 | Minimum | -2.6092 |
| Maximum | 3.818056 | Maximum | 2.351375 |
| Sum | 5.764041 | Sum | 4.49087 |
| Count | 59 | Count | 47 |
| Confidence | 0.383291 | Confidence | 0.305946 |

Figure 69

| Annual Year End | Year End %Insured | "Total Dep %1934Ins Scalar | %1934Ins Act$B DepClose | %1934Ins Adj$1972 DepClose | %1934Ins LN Adj$ DepClose | %1934Ins LNdeltaAdj DepClose |
|---|---|---|---|---|---|---|
| 12/31/96 | | | | | | |
| 12/31/95 | 75.8 | 1.68071 | 0.376032 | 0.100397 | -2.29862 | -0.6846 |
| 12/31/94 | 77 | 1.707317 | 0.723943 | 0.199084 | -1.61403 | -0.98076 |
| 12/31/93 | 76.5 | 1.696231 | 1.846447 | 0.530854 | -0.63327 | -2.55874 |
| 12/31/92 | 77.4 | 1.716186 | 23.85522 | 6.858376 | 1.925471 | -0.31245 |
| 12/31/91 | 77.7 | 1.722838 | 31.24612 | 9.373835 | 2.237922 | 1.248218 |
| 12/31/90 | 75.9 | 1.682927 | 8.609406 | 2.690439 | 0.989704 | -0.4682 |
| 12/31/89 | 76 | 1.685144 | 13.22142 | 4.296962 | 1.457908 | -0.54141 |
| 12/31/88 | 75.1 | 1.665188 | 21.8786 | 7.384029 | 1.999319 | 1.433508 |
| 12/31/87 | 75.3 | 1.669623 | 5.031076 | 1.760876 | 0.565812 | 0.140447 |
| 12/31/86 | 75.4 | 1.67184 | 4.221097 | 1.530148 | 0.425364 | -0.15743 |
| 12/31/85 | 76.1 | 1.687361 | 4.776096 | 1.791036 | 0.582794 | -0.94784 |
| 12/31/84 | 76.9 | 1.7051 | 11.9254 | 4.621093 | 1.530631 | 1.261381 |
| 12/31/83 | 75 | 1.662971 | 3.272456 | 1.308982 | 0.26925 | -0.68098 |
| 12/31/82 | 73.4 | 1.627494 | 6.085428 | 2.586307 | 0.950231 | 0.958256 |
| 12/31/81 | 76.1 | 1.687361 | 2.267445 | 0.992007 | -0.00802 | -0.41095 |
| 12/31/80 | 76.9 | 1.7051 | 3.235001 | 1.496188 | 0.402921 | 3.778206 |
| 12/31/79 | 75 | 1.662971 | 0.066748 | 0.034208 | -3.37529 | -2.17703 |
| 12/31/78 | 73.4 | 1.627494 | 0.524733 | 0.301721 | -1.19825 | 1.279161 |
| 12/31/77 | 70.2 | 1.556541 | 0.131702 | 0.08396 | -2.47741 | -1.85158 |
| 12/31/76 | 71.6 | 1.587583 | 0.777912 | 0.534815 | -0.62564 | 1.13672 |
| 12/31/75 | 65.9 | 1.461197 | 0.232686 | 0.171606 | -1.76256 | -1.57574 |
| 12/31/74 | 66.4 | 1.472284 | 1.070446 | 0.829595 | -0.18682 | 0.384387 |
| 12/31/73 | 65.9 | 1.461197 | 0.664524 | 0.564845 | -0.5712 | 3.79668 |
| 12/31/72 | 66.7 | 1.478936 | 0.013523 | 0.012678 | -4.36788 | -2.04338 |
| 12/31/71 | 65 | 1.441242 | 0.097832 | 0.097832 | -2.3245 | 0.958295 |
| 12/31/70 | 62.5 | 1.385809 | 0.037523 | 0.037523 | -3.2828 | 0.233141 |
| 12/31/69 | 60.7 | 1.345898 | 0.02972 | 0.02972 | -3.51594 | 0.545114 |
| 12/31/68 | 60.2 | 1.334812 | 0.017231 | 0.017231 | -4.06105 | 0.703812 |
| 12/31/67 | 58.2 | 1.290466 | 0.008524 | 0.008524 | -4.76486 | -2.24307 |
| 12/31/66 | 58.4 | 1.2949 | 0.080315 | 0.080315 | -2.5218 | 0.811069 |
| 12/31/65 | 55.6 | 1.232816 | 0.035691 | 0.035691 | -3.33287 | 0.637845 |
| 12/31/64 | 55 | 1.219512 | 0.01886 | 0.01886 | -3.97071 | 0.028676 |
| 12/31/63 | 56.6 | 1.254989 | 0.018327 | 0.018327 | -3.99939 | 2.047427 |
| 12/31/62 | 57.2 | 1.268293 | 0.002365 | 0.002365 | -6.04681 | -1.10211 |
| 12/31/61 | 57 | 1.263858 | 0.007121 | 0.007121 | -4.9447 | 0.260048 |
| 12/31/60 | 57.5 | 1.274945 | 0.00549 | 0.00549 | -5.20475 | 0.845557 |
| 12/31/59 | 57.4 | 1.272727 | 0.002357 | 0.002357 | -6.05031 | |
| 12/31/58 | 56.8 | 1.259424 | 0 | 0 | | |
| 12/31/57 | 56.3 | 1.248337 | 0.008812 | 0.008812 | -4.73167 | -0.01973 |
| 12/31/56 | 55.2 | 1.223947 | 0.008987 | 0.008987 | -4.71194 | -0.09428 |
| 12/31/55 | 54.8 | 1.215078 | 0.009876 | 0.009876 | -4.61766 | 2.48125 |
| 12/31/54 | 54.6 | 1.210643 | 0.000826 | 0.000826 | -7.09891 | -3.78419 |
| 12/31/53 | 54.6 | 1.210643 | 0.036344 | 0.036344 | -3.31472 | 2.676378 |
| 12/31/52 | 54.1 | 1.199557 | 0.002501 | 0.002501 | -5.99109 | 0.001847 |
| 12/31/51 | 54.2 | 1.201774 | 0.002498 | 0.002496 | -5.99294 | -0.68946 |
| 12/31/50 | 54.4 | 1.206208 | 0.004974 | 0.004974 | -5.30348 | -0.10863 |
| 12/31/49 | 48.8 | 1.08204 | 0.005545 | 0.005545 | -5.19484 | -0.5047 |
| 12/31/48 | 49.1 | 1.088692 | 0.009185 | 0.009185 | -4.69015 | 0.364789 |
| 12/31/47 | 49.5 | 1.097561 | 0.006378 | 0.006378 | -5.05494 | 1.949942 |
| 12/31/46 | 49.7 | 1.101996 | 0.000907 | 0.000907 | -7.00488 | -1.95062 |
| 12/31/45 | 42.4 | 0.940133 | 0.006382 | 0.006382 | -5.05426 | 1.08675 |
| 12/31/44 | 41.9 | 0.929047 | 0.002153 | 0.002153 | -6.14101 | -1.75659 |
| 12/31/43 | 43.4 | 0.962306 | 0.01247 | 0.01247 | -4.38443 | -0.52145 |
| 12/31/42 | 36.5 | 0.809313 | 0.021005 | 0.021005 | -3.86297 | -0.48395 |
| 12/31/41 | 39.7 | 0.880266 | 0.034081 | 0.034081 | -3.37903 | -1.54129 |
| 12/31/40 | 40.8 | 0.904656 | 0.159176 | 0.159176 | -1.83774 | -0.0614 |
| 12/31/39 | 42.9 | 0.95122 | 0.169256 | 0.169256 | -1.77634 | 1.01311 |
| 12/31/38 | 45.5 | 1.008869 | 0.061455 | 0.061455 | -2.78945 | 0.658798 |
| 12/31/37 | 46.8 | 1.037694 | 0.031801 | 0.031801 | -3.44825 | 0.111659 |
| 12/31/36 | 44.4 | 0.984479 | 0.028441 | 0.028441 | -3.55991 | 0.773989 |
| 12/31/35 | 44.7 | 0.991131 | 0.013116 | 0.001982 | -6.22352 | 0.001432 |
| 12/31/34 | 45.1 | 1 | 0.002 | 0.002 | -6.21461 | |

Figure 70

| % 1934 Insured Total Deposit Scalar Adjusted, 1934-1995 | | | | | | | |
|---|---|---|---|---|---|---|---|
| AdjAct$B | | Adj1972Adj$B | | AdjLNAdj$B | | AdjLNdelta | |
| Mean | 2.450631 | Mean | 0.850641 | Mean | -2.70751 | Mean | 0.057826 |
| Standard E | 0.786694 | Standard E | 0.246549 | Standard E | 0.332375 | Standard E | 0.192171 |
| Median | 0.036017 | Median | 0.034949 | Median | -3.33287 | Median | 0.015261 |
| Mode | #N/A | Mode | #N/A | Mode | #N/A | Mode | #N/A |
| Standard D | 6.093708 | Standard D | 1.909761 | Standard D | 2.553018 | Standard D | 1.463533 |
| Sample Va | 37.13328 | Sample Va | 3.647185 | Sample Va | 6.517903 | Sample Va | 2.141927 |
| Kurtosis | 11.32783 | Kurtosis | 9.235564 | Kurtosis | -0.97877 | Kurtosis | 0.700621 |
| Skewness | 3.319198 | Skewness | 3.020923 | Skewness | 0.32756 | Skewness | 0.130788 |
| Range | 31.24612 | Range | 9.373835 | Range | 9.336829 | Range | 7.58087 |
| Minimum | 0 | Minimum | 0 | Minimum | -7.09891 | Minimum | -3.78419 |
| Maximum | 31.24612 | Maximum | 9.373835 | Maximum | 2.237922 | Maximum | 3.79668 |
| Sum | 147.0379 | Sum | 51.03845 | Sum | -159.743 | Sum | 3.353905 |
| Count | 60 | Count | 60 | Count | 59 | Count | 58 |
| Confidence | 1.574173 | Confidence | 0.493344 | Confidence | 0.66532 | Confidence | 0.384816 |

Figure 71

| Annual Year End | Actual $B CatLoss | Adj1972 $B CatLoss | Growth Scalar | %Growth Adj Cat Loss | Ln%GroAd CatLoss | delLN%Gro CatLoss |
|---|---|---|---|---|---|---|
| Year End | | | | | | |
| 12/31/96 | 7.35 | 1.962379 | 1.91 | 1.027423 | 0.027054 | -0.21464 |
| 12/31/95 | 8.335 | 2.292125 | 1.8 | 1.273403 | 0.241693 | -0.82884 |
| 12/31/94 | 17.045 | 4.900438 | 1.68 | 2.916927 | 1.070531 | 1.048054 |
| 12/31/93 | 5.585 | 1.605688 | 1.57 | 1.022731 | 0.022476 | -1.53635 |
| 12/31/92 | 22.974 | 6.8922 | 1.45 | 4.753241 | 1.558827 | 1.464747 |
| 12/31/91 | 4.711 | 1.472188 | 1.34 | 1.098647 | 0.09408 | 0.392908 |
| 12/31/90 | 2.807 | 0.912275 | 1.23 | 0.741687 | -0.29883 | -1.14194 |
| 12/31/89 | 7.642 | 2.579175 | 1.11 | 2.323581 | 0.84311 | 1.550051 |
| 12/31/88 | 1.409 | 0.49315 | 1 | 0.49315 | -0.70694 | |

Figure 72

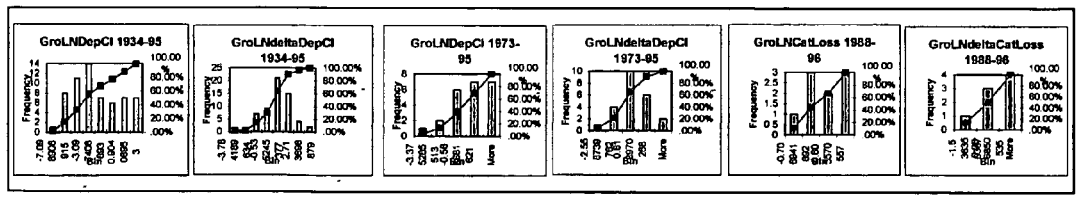

Figure 73

| Annual Year End | Actual $B Deposits Closed | FDIC Total Deposits | Actual $B Assets Closed | FDIC Total Assets |
|---|---|---|---|---|
| 12/31/94 | 1.236 | 2874.4 | 1.392 | 4010.8 |
| 12/31/93 | 3.132 | 2754.3 | 3.539 | 3706.2 |
| 12/31/92 | 40.94 | 2698.7 | 44.232 | 3505.7 |
| 12/31/91 | 53.832 | 2667.6 | 63.338 | 3430.6 |
| 12/31/90 | 14.489 | 2650.1 | 15.365 | 3389.5 |
| 12/31/89 | 22.28 | 2548.5 | 29.431 | 3299.4 |
| 12/31/88 | 36.432 | 2431.7 | 52.62 | 3130.8 |
| 12/31/87 | 8.4 | 2335.4 | 9.216 | 2999.9 |
| 12/31/86 | 7.057 | 2283.5 | 6.813 | 2940.7 |
| 12/31/85 | 8.059 | 2118.1 | 8.735 | 2730.7 |
| 12/31/84 | 20.334 | 1962.9 | 36.909 | 2508.9 |
| 12/31/83 | 5.442 | 1842.5 | 7.026 | 2342.1 |
| 12/31/82 | 9.904 | 1705.7 | 11.632 | 2193.3 |
| 12/31/81 | 3.826 | 1588.7 | 4.99 | 2028.9 |
| 12/31/80 | 5.516 | 1481.1 | 8.189 | 1855.7 |
| 12/31/79 | 0.111 | 1362.8 | 0.133 | 1691.8 |
| 12/31/78 | 0.854 | 1233.4 | 0.994 | 1507.9 |
| 12/31/77 | 0.205 | 929.2 | 0.233 | 1339.4 |
| 12/31/76 | 1.235 | 830.9 | 1.039 | 1182.4 |
| 12/31/75 | 0.34 | 780.7 | 0.42 | 1086.7 |
| 12/31/74 | 1.576 | 746.4 | 3.823 | 1037.2 |
| 12/31/73 | 0.971 | 681.7 | 1.31 | 820.4 |
| 12/31/72 | 0.02 | 616.9 | 1.322 | 730.9 |
| 12/31/71 | 0.141 | 539.2 | 0.197 | 633.6 |
| 12/31/70 | 0.052 | 482.5 | 0.062 | 570.2 |
| 12/31/69 | 0.04 | 436.9 | 0.044 | 524.6 |
| 12/31/68 | 0.023 | 434.6 | 0.025 | 500.2 |
| 12/31/67 | 0.011 | 395.8 | 0.012 | 450.6 |
| 12/31/66 | 0.104 | 352.8 | 0.121 | 402.9 |
| 12/31/65 | 0.044 | 331.5 | 0.059 | 375.4 |
| 12/31/64 | 0.023 | 306.2 | 0.026 | 345.1 |
| 12/31/63 | 0.023 | 274.6 | 0.026 | 311.8 |
| 12/31/62 | 0.003 | 261.4 | 0 | 295.9 |
| 12/31/61 | 0.009 | 247.9 | 0.01 | 277.3 |
| 12/31/60 | 0.007 | 228.9 | 0.008 | 256.3 |
| 12/31/59 | 0.003 | 219 | 0.003 | 243.4 |
| 12/31/58 |  | 215.2 |  | 237.5 |
| 12/31/57 | 0.011 | 200.5 | 0.011 | 221.5 |
| 12/31/56 | 0.011 | 196.5 | 0.013 | 216.1 |
| 12/31/55 | 0.012 | 190.9 | 0.012 | 209.1 |
| 12/31/54 | 0.001 | 183.3 | 0.001 | 200.6 |
| 12/31/53 | 0.044 | 175.1 | 0 | 191.1 |
| 12/31/52 | 0.003 | 171.4 | 0.002 | 186.7 |
| 12/31/51 | 0.003 | 163.2 | 0.003 | 177.5 |
| 12/31/50 | 0.006 | 153.5 | 0.004 | 166.7 |
| 12/31/49 | 0.006 | 143.2 | 0.005 | 155.3 |
| 12/31/48 | 0.01 | 140.7 | 0.01 | 152.1 |
| 12/31/47 | 0.007 | 141.9 | 0.007 | 152.7 |
| 12/31/46 | 0.001 | 137 | 0.001 | 147.3 |
| 12/31/45 | 0.006 | 147.8 | 0.006 | 157.5 |
| 12/31/44 | 0.002 | 125.7 | 0.002 | 134.6 |
| 12/31/43 | 0.012 | 104.1 | 0.014 | 112.2 |
| 12/31/42 | 0.017 | 87.8 | 0 | 95.5 |
| 12/31/41 | 0.03 | 69.4 | 0 | 76.8 |
| 12/31/40 | 0.144 | 63.5 | 0 | 70.7 |
| 12/31/39 | 0.161 | 56.1 | 0 | 63.1 |
| 12/31/38 | 0.062 | 49.8 | 0.014 | 56.8 |
| 12/31/37 | 0.033 | 47.2 | 0.019 | 54.2 |
| 12/31/36 | 0.028 | 49.3 | 0.012 | 56.2 |
| 12/31/35 | 0.013 | 44.1 | 0.012 | 50.9 |
| 12/31/34 | 0.002 | 39 | 0.003 | 46.4 |

Figure 74

| Annual Year End | Closed Deposits/ Total Deposits #/# | e^(#/#) | Closed Assets/ Total Assets #/# | e^(#/#) |
|---|---|---|---|---|
| 12/31/94 | 0.00043 | 1.00043 | 0.00035 | 1.000347 |
| 12/31/93 | 0.00114 | 1.001138 | 0.00095 | 1.000955 |
| 12/31/92 | 0.01517 | 1.015286 | 0.01262 | 1.012697 |
| 12/31/91 | 0.02018 | 1.020385 | 0.01846 | 1.018634 |
| 12/31/90 | 0.00547 | 1.005482 | 0.00453 | 1.004543 |
| 12/31/89 | 0.00874 | 1.008781 | 0.00892 | 1.00896 |
| 12/31/88 | 0.01498 | 1.015095 | 0.01681 | 1.016949 |
| 12/31/87 | 0.00360 | 1.003603 | 0.00307 | 1.003077 |
| 12/31/86 | 0.00309 | 1.003095 | 0.00232 | 1.002319 |
| 12/31/85 | 0.00380 | 1.003812 | 0.00320 | 1.003204 |
| 12/31/84 | 0.01036 | 1.010413 | 0.01471 | 1.01482 |
| 12/31/83 | 0.00295 | 1.002958 | 0.00300 | 1.003004 |
| 12/31/82 | 0.00581 | 1.005823 | 0.00530 | 1.005318 |
| 12/31/81 | 0.00241 | 1.002411 | 0.00246 | 1.002462 |
| 12/31/80 | 0.00372 | 1.003731 | 0.00441 | 1.004423 |
| 12/31/79 | 0.00008 | 1.000081 | 0.00008 | 1.000079 |
| 12/31/78 | 0.00069 | 1.000693 | 0.00066 | 1.000659 |
| 12/31/77 | 0.00022 | 1.000221 | 0.00017 | 1.000174 |
| 12/31/76 | 0.00149 | 1.001487 | 0.00088 | 1.000879 |
| 12/31/75 | 0.00044 | 1.000436 | 0.00039 | 1.000387 |
| 12/31/74 | 0.00211 | 1.002114 | 0.00369 | 1.003693 |
| 12/31/73 | 0.00142 | 1.001425 | 0.00160 | 1.001598 |
| 12/31/72 | 0.00003 | 1.000032 | 0.00181 | 1.00181 |
| 12/31/71 | 0.00026 | 1.000262 | 0.00031 | 1.000311 |
| 12/31/70 | 0.00011 | 1.000108 | 0.00011 | 1.000109 |
| 12/31/69 | 0.00009 | 1.000092 | 0.00008 | 1.000084 |
| 12/31/68 | 0.00005 | 1.000053 | 0.00005 | 1.00005 |
| 12/31/67 | 0.00003 | 1.000028 | 0.00003 | 1.000027 |
| 12/31/66 | 0.00029 | 1.000295 | 0.00030 | 1.0003 |
| 12/31/65 | 0.00013 | 1.000133 | 0.00016 | 1.000157 |
| 12/31/64 | 0.00008 | 1.000075 | 0.00008 | 1.000075 |
| 12/31/63 | 0.00008 | 1.000084 | 0.00008 | 1.000083 |
| 12/31/62 | 0.00001 | 1.000011 | 0.00000 | 1 |
| 12/31/61 | 0.00004 | 1.000036 | 0.00004 | 1.000036 |
| 12/31/60 | 0.00003 | 1.000031 | 0.00003 | 1.000031 |
| 12/31/59 | 0.00001 | 1.000014 | 0.00001 | 1.000012 |
| 12/31/58 | 0.00000 | 1 | 0.00000 | 1 |
| 12/31/57 | 0.00005 | 1.000055 | 0.00005 | 1.00005 |
| 12/31/56 | 0.00006 | 1.000056 | 0.00006 | 1.00006 |
| 12/31/55 | 0.00006 | 1.000063 | 0.00006 | 1.000057 |
| 12/31/54 | 0.00001 | 1.000005 | 0.00000 | 1.000005 |
| 12/31/53 | 0.00025 | 1.000251 | 0.00000 | 1 |
| 12/31/52 | 0.00002 | 1.000018 | 0.00001 | 1.000011 |
| 12/31/51 | 0.00002 | 1.000018 | 0.00002 | 1.000017 |
| 12/31/50 | 0.00004 | 1.000039 | 0.00002 | 1.000024 |
| 12/31/49 | 0.00004 | 1.000042 | 0.00003 | 1.000032 |
| 12/31/48 | 0.00007 | 1.000071 | 0.00007 | 1.000066 |
| 12/31/47 | 0.00005 | 1.000049 | 0.00005 | 1.000046 |
| 12/31/46 | 0.00001 | 1.000007 | 0.00001 | 1.000007 |
| 12/31/45 | 0.00004 | 1.000041 | 0.00004 | 1.000038 |
| 12/31/44 | 0.00002 | 1.000016 | 0.00001 | 1.000015 |
| 12/31/43 | 0.00012 | 1.000115 | 0.00012 | 1.000125 |
| 12/31/42 | 0.00019 | 1.000194 | 0.00000 | 1 |
| 12/31/41 | 0.00043 | 1.000432 | 0.00000 | 1 |
| 12/31/40 | 0.00227 | 1.00227 | 0.00000 | 1 |
| 12/31/39 | 0.00287 | 1.002874 | 0.00000 | 1 |
| 12/31/38 | 0.00124 | 1.001246 | 0.00025 | 1.000247 |
| 12/31/37 | 0.00070 | 1.000699 | 0.00035 | 1.000351 |
| 12/31/36 | 0.00057 | 1.000568 | 0.00021 | 1.000214 |
| 12/31/35 | 0.00029 | 1.000295 | 0.00024 | 1.000236 |
| 12/31/34 | 0.00005 | 1.000051 | 0.00006 | 1.000065 |

Figure 77

| Annual Year End | FDIC Total Deposits | Interest-Bearing (IB) Deposits | FDIC Total Assets | Interest-Bearing (IB) Assets | Interest-Bearing (IB) Liabilities |
|---|---|---|---|---|---|
| 12/31/94 | 2874.4 | 2302 | 4010.8 | 3566.6 | 3023.8 |
| 12/31/93 | 2754.3 | 2182 | 3706.2 | 3290.8 | 2717.5 |
| 12/31/92 | 2698.7 | 2157 | 3505.7 | 3087.9 | 2598.3 |
| 12/31/91 | 2667.6 | 2207 | 3430.6 | 3011.1 | 2611.9 |
| 12/31/90 | 2650.1 | 2161 | 3389.5 | 2956.3 | 2570.7 |
| 12/31/89 | 2548.5 | 2065 | 3299.4 | 2887.9 | 2503.9 |
| 12/31/88 | 2431.7 | 1952 | 3130.8 | 2734.5 | 2350.5 |
| 12/31/87 | 2335.4 | 1857 | 2999.9 | 2627 | 2237.2 |
| 12/31/86 | 2283.5 | 1751 | 2940.7 | 2548.6 | 2127 |
| 12/31/85 | 2118.1 | 1646 | 2730.7 | 2362.7 | 1981.9 |
| 12/31/84 | 1962.9 | 1531 | 2508.9 | 2157 | 1803 |
| 12/31/83 | 1842.5 | 1451 | 2342.1 | 2005.7 | 1696.4 |
| 12/31/82 | 1705.7 | 1335 | 2193.3 | 1880.2 | 1580.4 |
| 12/31/81 | 1588.7 | 1205 | 2028.9 | 1725.5 | 1422.9 |
| 12/31/80 | 1481.1 | 1049 | 1855.7 | 1551.9 | 1233.9 |
| 12/31/79 | 1362.8 | 932 | 1691.8 | 1405.9 | 1092.6 |
| 12/31/78 | 1233.4 | 834 | 1507.9 | 1257.3 | 966.8 |
| 12/31/77 | 929.2 | 550 | 1339.4 | 1131.2 | 841.2 |
| 12/31/76 | 830.9 | 497 | 1182.4 | 1013.9 | 743.9 |
| 12/31/75 | 780.7 | 459 | 1086.7 | 920.7 | 660.2 |
| 12/31/74 | 746.4 | 432 | 1037.2 | 869 | 621.3 |
| 12/31/73 | 681.7 | 373 | 820.4 | 673.6 | 434.9 |
| 12/31/72 | 616.9 | 320 | 730.9 | 595 | 363.4 |
| 12/31/71 | 539.2 | 277 | 633.6 | 513.7 | 306.2 |
| 12/31/70 | 482.5 | 236 | 570.2 | 456.9 | 257.3 |
| 12/31/69 | 436.9 | 197 | 524.6 | 416.3 | 217.5 |
| 12/31/68 | 434.6 | 206 | 500.2 | 401.7 | 216.7 |
| 12/31/67 | 395.8 | 185 | 450.6 | 360.7 | 192.9 |
| 12/31/66 | 352.8 | 161 | 402.9 | 323.2 | 167.6 |
| 12/31/65 | 331.5 | 148 | 375.4 | 305.5 | 153.7 |
| 12/31/64 | 306.2 | 127 | 345.1 | 276.9 | 130.9 |
| 12/31/63 | 274.6 | 111.7 | 311.8 | 254.1 | 115.4 |
| 12/31/62 | 261.4 | 98.2 | 295.9 | 235.4 | 101.8 |
| 12/31/61 | 247.9 | 82.8 | 277.3 | 214.8 | 83.3 |
| 12/31/60 | 228.9 | 73.3 | 256.3 | 198.7 | 73.5 |
| 12/31/59 | 219 | 67.5 | 243.4 | 189.4 | 68.1 |
| 12/31/58 | 215.2 | 65.7 | 237.5 | 184.4 | 65.8 |
| 12/31/57 | 200.5 | 57.6 | 221.5 | 169.2 | 57.8 |
| 12/31/56 | 196.5 | 52.1 | 216.1 | 164.2 | 52.2 |
| 12/31/55 | 190.9 | 49.9 | 209.1 | 159.7 | 50.1 |
| 12/31/54 | 183.3 | 48.5 | 200.6 | 154.6 | 48.6 |
| 12/31/53 | 175.1 | 44.8 | 191.1 | 144.2 | 44.9 |
| 12/31/52 | 171.4 | 41.4 | 186.7 | 140.2 | 41.6 |
| 12/31/51 | 163.2 | 38.3 | 177.5 | 131.1 | 38.3 |
| 12/31/50 | 153.5 | 36.5 | 166.7 | 125.2 | 36.6 |
| 12/31/49 | 143.2 | 36 | 155.3 | 118.4 | 36 |
| 12/31/48 | 140.7 | 35.5 | 152.1 | 112.4 | 35.6 |
| 12/31/47 | 141.9 | 34.9 | 152.7 | 114.4 | 35 |
| 12/31/46 | 137 | 33.6 | 147.3 | 112.3 | 33.7 |
| 12/31/45 | 147.8 | 29.9 | 157.5 | 121.9 | 30.2 |
| 12/31/44 | 125.7 | 23.9 | 134.6 | 103.5 | 24.1 |
| 12/31/43 | 104.1 | 19.2 | 112.2 | 83.6 | 19.2 |
| 12/31/42 | 87.8 | 16.3 | 95.5 | 66.4 | 16.3 |
| 12/31/41 | 69.4 | 15.9 | 76.8 | 49.5 | 15.9 |
| 12/31/40 | 63.5 | 15.7 | 70.7 | 42.7 | 15.8 |
| 12/31/39 | 56.1 | 15.2 | 63.1 | 39.5 | 15.3 |
| 12/31/38 | 49.8 | 14.8 | 56.8 | 37.7 | 14.9 |
| 12/31/37 | 47.2 | 14.8 | 54.2 | 37.4 | 14.9 |
| 12/31/36 | 49.3 | 14.1 | 56.2 | 38.5 | 14.2 |
| 12/31/35 | 44.1 | 13.4 | 50.9 | 35.1 | 13.4 |
| 12/31/34 | 39 | 12.7 | 46.4 | 33.1 | 12.8 |

Figure 78

| Annual Year End | Ratios of Deposits versus Assets and Liabilities | | | | | |
|---|---|---|---|---|---|---|
| | TD/TA | IBD/IBA | IBD.IBL | TD/IBA | TD/IBL | IBA/IBL |
| 12/31/94 | 0.717 | 0.645 | 0.761 | 0.806 | 0.951 | 1.180 |
| 12/31/93 | 0.743 | 0.663 | 0.803 | 0.837 | 1.014 | 1.211 |
| 12/31/92 | 0.770 | 0.699 | 0.830 | 0.874 | 1.039 | 1.188 |
| 12/31/91 | 0.778 | 0.733 | 0.845 | 0.886 | 1.021 | 1.153 |
| 12/31/90 | 0.782 | 0.731 | 0.841 | 0.896 | 1.031 | 1.150 |
| 12/31/89 | 0.772 | 0.715 | 0.825 | 0.882 | 1.018 | 1.153 |
| 12/31/88 | 0.777 | 0.714 | 0.830 | 0.889 | 1.035 | 1.163 |
| 12/31/87 | 0.778 | 0.707 | 0.830 | 0.889 | 1.044 | 1.174 |
| 12/31/86 | 0.777 | 0.687 | 0.823 | 0.896 | 1.074 | 1.198 |
| 12/31/85 | 0.776 | 0.697 | 0.831 | 0.896 | 1.069 | 1.192 |
| 12/31/84 | 0.782 | 0.710 | 0.849 | 0.910 | 1.089 | 1.196 |
| 12/31/83 | 0.787 | 0.723 | 0.855 | 0.919 | 1.086 | 1.182 |
| 12/31/82 | 0.778 | 0.710 | 0.845 | 0.907 | 1.079 | 1.190 |
| 12/31/81 | 0.783 | 0.698 | 0.847 | 0.921 | 1.117 | 1.213 |
| 12/31/80 | 0.798 | 0.676 | 0.850 | 0.954 | 1.200 | 1.258 |
| 12/31/79 | 0.806 | 0.663 | 0.853 | 0.969 | 1.247 | 1.287 |
| 12/31/78 | 0.818 | 0.663 | 0.863 | 0.981 | 1.276 | 1.300 |
| 12/31/77 | 0.694 | 0.486 | 0.654 | 0.821 | 1.105 | 1.345 |
| 12/31/76 | 0.703 | 0.490 | 0.668 | 0.820 | 1.117 | 1.363 |
| 12/31/75 | 0.718 | 0.499 | 0.695 | 0.848 | 1.183 | 1.395 |
| 12/31/74 | 0.720 | 0.497 | 0.695 | 0.859 | 1.201 | 1.399 |
| 12/31/73 | 0.831 | 0.554 | 0.858 | 1.012 | 1.567 | 1.549 |
| 12/31/72 | 0.844 | 0.538 | 0.881 | 1.037 | 1.698 | 1.637 |
| 12/31/71 | 0.851 | 0.539 | 0.905 | 1.050 | 1.761 | 1.678 |
| 12/31/70 | 0.846 | 0.517 | 0.917 | 1.056 | 1.875 | 1.776 |
| 12/31/69 | 0.833 | 0.473 | 0.906 | 1.049 | 2.009 | 1.914 |
| 12/31/68 | 0.869 | 0.513 | 0.951 | 1.082 | 2.006 | 1.854 |
| 12/31/67 | 0.878 | 0.513 | 0.959 | 1.097 | 2.052 | 1.870 |
| 12/31/66 | 0.876 | 0.498 | 0.961 | 1.092 | 2.105 | 1.928 |
| 12/31/65 | 0.883 | 0.484 | 0.963 | 1.085 | 2.157 | 1.988 |
| 12/31/64 | 0.887 | 0.459 | 0.970 | 1.106 | 2.339 | 2.115 |
| 12/31/63 | 0.881 | 0.440 | 0.968 | 1.081 | 2.380 | 2.202 |
| 12/31/62 | 0.883 | 0.417 | 0.965 | 1.110 | 2.568 | 2.312 |
| 12/31/61 | 0.894 | 0.385 | 0.994 | 1.154 | 2.976 | 2.579 |
| 12/31/60 | 0.893 | 0.369 | 0.997 | 1.152 | 3.114 | 2.703 |
| 12/31/59 | 0.900 | 0.356 | 0.991 | 1.156 | 3.216 | 2.781 |
| 12/31/58 | 0.906 | 0.356 | 0.998 | 1.167 | 3.271 | 2.802 |
| 12/31/57 | 0.905 | 0.340 | 0.997 | 1.185 | 3.469 | 2.927 |
| 12/31/56 | 0.909 | 0.317 | 0.998 | 1.197 | 3.764 | 3.146 |
| 12/31/55 | 0.913 | 0.312 | 0.996 | 1.195 | 3.810 | 3.188 |
| 12/31/54 | 0.914 | 0.314 | 0.998 | 1.186 | 3.772 | 3.181 |
| 12/31/53 | 0.916 | 0.311 | 0.998 | 1.214 | 3.900 | 3.212 |
| 12/31/52 | 0.918 | 0.295 | 0.995 | 1.223 | 4.120 | 3.370 |
| 12/31/51 | 0.919 | 0.292 | 1.000 | 1.245 | 4.261 | 3.423 |
| 12/31/50 | 0.921 | 0.292 | 0.997 | 1.226 | 4.194 | 3.421 |
| 12/31/49 | 0.922 | 0.304 | 1.000 | 1.209 | 3.978 | 3.289 |
| 12/31/48 | 0.925 | 0.316 | 0.997 | 1.252 | 3.952 | 3.157 |
| 12/31/47 | 0.929 | 0.305 | 0.997 | 1.240 | 4.054 | 3.269 |
| 12/31/46 | 0.930 | 0.299 | 0.997 | 1.220 | 4.065 | 3.332 |
| 12/31/45 | 0.938 | 0.245 | 0.990 | 1.212 | 4.894 | 4.036 |
| 12/31/44 | 0.934 | 0.231 | 0.992 | 1.214 | 5.216 | 4.295 |
| 12/31/43 | 0.928 | 0.230 | 1.000 | 1.245 | 5.422 | 4.354 |
| 12/31/42 | 0.919 | 0.245 | 1.000 | 1.322 | 5.387 | 4.074 |
| 12/31/41 | 0.904 | 0.321 | 1.000 | 1.402 | 4.365 | 3.113 |
| 12/31/40 | 0.898 | 0.368 | 0.994 | 1.487 | 4.019 | 2.703 |
| 12/31/39 | 0.889 | 0.385 | 0.993 | 1.420 | 3.667 | 2.582 |
| 12/31/38 | 0.877 | 0.393 | 0.993 | 1.321 | 3.342 | 2.530 |
| 12/31/37 | 0.871 | 0.396 | 0.993 | 1.262 | 3.168 | 2.510 |
| 12/31/36 | 0.877 | 0.366 | 0.993 | 1.281 | 3.472 | 2.711 |
| 12/31/35 | 0.866 | 0.382 | 1.000 | 1.256 | 3.291 | 2.619 |
| 12/31/34 | 0.841 | 0.384 | 0.992 | 1.178 | 3.047 | 2.586 |

Figure 83

| 10 Sequences of Independent Uniform Random Variables on (0,1) Each Sequence with Different Seed Clock Rate | | | | | | | | | |
|---|---|---|---|---|---|---|---|---|---|
| 0.382 | 0.655507 | 0.894681 | 0.670064 | 0.267006 | 0.436171 | 0.672079 | 0.682669 | 0.817438 | 0.922178 |
| 0.100681 | 0.01825 | 0.803186 | 0.609638 | 0.456893 | 0.46028 | 0.326518 | 0.770135 | 0.326426 | 0.697958 |
| 0.596484 | 0.54442 | 0.608997 | 0.666982 | 0.136814 | 0.106754 | 0.822169 | 0.469069 | 0.421735 | 0.396039 |
| 0.899106 | 0.208106 | 0.477767 | 0.745323 | 0.523515 | 0.135258 | 0.938231 | 0.353069 | 0.620075 | 0.492477 |
| 0.88461 | 0.734306 | 0.8717 | 0.62392 | 0.058046 | 0.272378 | 0.341227 | 0.664327 | 0.019074 | 0.329875 |
| 0.958464 | 0.372997 | 0.612537 | 0.552904 | 0.94821 | 0.313913 | 0.698569 | 0.623615 | 0.999817 | 0.841304 |
| 0.014496 | 0.998077 | 0.352062 | 0.854305 | 0.563677 | 0.968749 | 0.967925 | 0.218543 | 0.545366 | 0.524918 |
| 0.407422 | 0.420728 | 0.557237 | 0.837062 | 0.05829 | 0.751366 | 0.514237 | 0.059633 | 0.882534 | 0.454726 |
| 0.863247 | 0.994873 | 0.240364 | 0.2725 | 0.45497 | 0.40611 | 0.176885 | 0.025178 | 0.138371 | 0.320322 |
| 0.138585 | 0.038575 | 0.085757 | 0.181555 | 0.411969 | 0.20304 | 0.689779 | 0.061922 | 0.501938 | 0.466964 |
| 0.245033 | 0.231605 | 0.99353 | 0.207984 | 0.234107 | 0.721549 | 0.931394 | 0.452071 | 0.718406 | 0.171087 |
| 0.045473 | 0.312296 | 0.053133 | 0.168188 | 0.785485 | 0.359416 | 0.517777 | 0.379711 | 0.54564 | 0.003143 |
| 0.03238 | 0.694113 | 0.681448 | 0.768456 | 0.286569 | 0.601428 | 0.369366 | 0.005127 | 0.940367 | 0.044099 |
| 0.164129 | 0.367962 | 0.407544 | 0.227638 | 0.192389 | 0.701071 | 0.848903 | 0.295785 | 0.708365 | 0.69808 |
| 0.219611 | 0.315806 | 0.798059 | 0.462203 | 0.123966 | 0.547655 | 0.207404 | 0.246956 | 0.303262 | 0.741264 |
| 0.01709 | 0.782281 | 0.214637 | 0.245766 | 0.252541 | 0.203711 | 0.540849 | 0.452803 | 0.055757 | 0.090121 |
| 0.285043 | 0.298135 | 0.817225 | 0.962249 | 0.984985 | 0.250984 | 0.41258 | 0.570788 | 0.984924 | 0.627155 |
| 0.343089 | 0.969085 | 0.102298 | 0.524979 | 0.268868 | 0.753685 | 0.383984 | 0.769463 | 0.742454 | 0.707907 |
| 0.553636 | 0.907682 | 0.519089 | 0.459639 | 0.967345 | 0.739494 | 0.601978 | 0.737815 | 0.019898 | 0.561663 |
| 0.357372 | 0.916715 | 0.301584 | 0.009033 | 0.740349 | 0.518754 | 0.375134 | 0.973327 | 0.48207 | 0.698263 |
| 0.371838 | 0.877468 | 0.8081 | 0.134159 | 0.759117 | 0.816034 | 0.803034 | 0.844569 | 0.877529 | 0.73748 |
| 0.355602 | 0.144566 | 0.368755 | 0.438093 | 0.36079 | 0.983489 | 0.690939 | 0.999145 | 0.848933 | 0.145451 |
| 0.910306 | 0.056795 | 0.019898 | 0.989959 | 0.067537 | 0.910184 | 0.771722 | 0.225929 | 0.451277 | 0.226936 |

Figure 84

Numeric Output of Box-Muller Transformation on Uniform R.V. Sample Sequences
Ten Uniform Sampling Sequences, each separately seeded; made standard normal by Box-Muller Method:
Box-Muller: Standard Normal Random Variable V1 = SQRT(-2*LN(U(Ia))) * COS(2*PI()*(U(Ib)))
Box-Muller: Standard Normal Random Variable V2 = SQRT(-2*LN(U(Ia))) * SIN(2*PI()*(U(Ib)))

| Pair A: | | Pair B: | | Pair C: | | Pair D: | | Pair E: | |
|---|---|---|---|---|---|---|---|---|---|
| V1 | V2 | V1 | V2 | V1 | V2 | V1 | V2 | V1 | V2 |
| -0.77614 | 0.62068 | -0.22712 | -0.41352 | -1.49615 | 0.634424 | -0.366 | -0.8129 | 0.560542 | -0.29825 |
| 2.128731 | 1.673026 | -0.51109 | -0.42086 | -1.21287 | 0.30914 | 0.18877 | -1.48422 | -0.48062 | -1.41708 |
| -0.97723 | -0.62832 | -0.49626 | -0.86349 | 1.562444 | 1.239769 | -0.61401 | 0.120856 | -1.04354 | 0.798606 |
| 0.120006 | -1.04951 | -0.03572 | -1.2149 | 0.750996 | 0.854626 | -0.21543 | 0.284799 | -0.97657 | 0.046197 |
| -0.04875 | -0.52118 | -0.37306 | -0.36803 | -0.33437 | 2.362462 | -0.75181 | -1.25905 | -1.35373 | 2.467037 |
| -0.20336 | -0.36238 | -0.9359 | -0.32308 | -0.12747 | 0.300181 | -0.60412 | -0.5937 | 0.010386 | -0.01607 |
| 2.909723 | 0.005643 | 0.880622 | -1.1456 | 1.050193 | -0.20891 | 0.050141 | 0.250374 | -1.08771 | -0.1717 |
| -1.17726 | 0.722988 | 0.562509 | -0.92364 | 0.020449 | -2.38416 | 1.073304 | 0.422092 | -0.47982 | 0.1403 |
| 0.542037 | -0.07679 | -0.23791 | 1.671706 | -1.04289 | 0.698167 | 1.838077 | 0.293227 | -0.85046 | 1.797873 |
| 1.929991 | 1.951441 | 0.92407 | 2.014589 | 0.387277 | 1.274217 | 0.797428 | 0.326918 | -1.14892 | 0.241972 |
| 0.193411 | 1.70956 | 0.029731 | 0.109991 | -0.30301 | -1.67694 | -0.36005 | 0.111832 | 0.386931 | 0.71535 |
| -0.94849 | 0.429991 | 1.191293 | 2.109679 | -0.44099 | 0.537062 | -0.83496 | 0.786935 | 1.100508 | 0.021739 |
| -0.90097 | 0.17266 | 0.101332 | -0.86994 | -1.27067 | -0.94072 | 1.410628 | 0.045458 | 0.337296 | 0.095927 |
| -1.28354 | 1.213177 | 0.187642 | 1.326651 | -0.54943 | -1.73049 | -0.1624 | 0.54886 | -0.26612 | -0.78662 |
| -0.69959 | 1.490714 | -0.65282 | 0.15802 | -1.95249 | -0.60273 | 0.033927 | 1.773422 | -0.08476 | -1.54244 |
| 0.574655 | 0.075106 | 0.046672 | 1.753693 | 0.475742 | 1.589351 | -1.06031 | 0.323988 | 2.027779 | 1.289033 |
| -0.47191 | 1.51821 | 0.617569 | -0.1493 | -0.00108 | 0.173945 | -1.2012 | -0.57252 | -0.12157 | -0.12491 |
| 1.435203 | 0.208953 | -2.10911 | -0.33376 | 0.037519 | -1.62039 | 0.168773 | -1.37325 | -0.20174 | -0.74491 |
| 0.909556 | -0.14554 | -1.10852 | 0.287302 | -0.017 | -0.25712 | -0.07706 | -1.00456 | -2.59152 | -1.05749 |
| 1.242578 | 0.325676 | 1.545865 | 0.087836 | -0.77004 | -0.09116 | 1.380717 | -0.2336 | -0.38582 | -1.14476 |
| 1.009935 | 0.368658 | 0.434281 | 0.487381 | 0.299273 | -0.67944 | 0.370814 | -0.54883 | -0.04017 | -0.50958 |
| 0.884465 | 1.549458 | -1.30701 | 0.535688 | 1.42023 | -0.14787 | 0.859876 | -0.00462 | 0.349495 | 0.453213 |
| 0.406218 | -1.27949 | 2.793407 | -0.17648 | 1.961681 | -1.24175 | 0.108469 | 0.711686 | 0.182174 | 1.248263 |

Figure 88

| PairA, V1 | | PairA, V2 | | PairB, V1 | | PairB, V2 | |
|---|---|---|---|---|---|---|---|
| Mean | 0.029718 | Mean | 0.25206 | Mean | 0.107852 | Mean | 0.017778 |
| Standard E | 0.158592 | Standard E | 0.137522 | Standard E | 0.145238 | Standard E | 0.146055 |
| Median | 0.065401 | Median | 0.190806 | Median | 0.100486 | Median | -0.1503 |
| Mode | #N/A | Mode | #N/A | Mode | #N/A | Mode | #N/A |
| Standard D | 1.09876 | Standard D | 0.952784 | Standard D | 1.006237 | Standard D | 1.011897 |
| Sample Va | 1.207273 | Sample Va | 0.907796 | Sample Va | 1.012513 | Sample Va | 1.023936 |
| Kurtosis | -0.31892 | Kurtosis | -0.26996 | Kurtosis | 0.722071 | Kurtosis | 0.254814 |
| Skewness | 0.381712 | Skewness | -0.05139 | Skewness | 0.149183 | Skewness | 0.4922 |
| Range | 4.801632 | Range | 3.944707 | Range | 5.114252 | Range | 4.548292 |
| Minimum | -1.89191 | Minimum | -1.9692 | Minimum | -2.32085 | Minimum | -2.30396 |
| Maximum | 2.909723 | Maximum | 1.975503 | Maximum | 2.793407 | Maximum | 2.244334 |
| Sum | 1.426485 | Sum | 12.09887 | Sum | 5.176872 | Sum | 0.853352 |
| Count | 48 | Count | 48 | Count | 48 | Count | 48 |
| Confidence | 0.319046 | Confidence | 0.276659 | Confidence | 0.292181 | Confidence | 0.293824 |

| PairC, V1 | | PairC, V2 | | PairD, V1 | | PairD, V2 | |
|---|---|---|---|---|---|---|---|
| Mean | 0.116748 | Mean | -0.03693 | Mean | -0.12866 | Mean | 0.019805 |
| Standard E | 0.147548 | Standard E | 0.143687 | Standard E | 0.148233 | Standard E | 0.113792 |
| Median | 0.083812 | Median | -0.00224 | Median | -0.21236 | Median | 0.077359 |
| Mode | #N/A | Mode | #N/A | Mode | #N/A | Mode | #N/A |
| Standard D | 1.022242 | Standard D | 0.995491 | Standard D | 1.02699 | Standard D | 0.788373 |
| Sample Va | 1.044978 | Sample Va | 0.991003 | Sample Va | 1.054709 | Sample Va | 0.621532 |
| Kurtosis | -0.76122 | Kurtosis | -0.23206 | Kurtosis | 0.200353 | Kurtosis | -0.22563 |
| Skewness | -0.05751 | Skewness | -0.14942 | Skewness | 0.430159 | Skewness | 0.123458 |
| Range | 3.914167 | Range | 4.746622 | Range | 4.840904 | Range | 3.257642 |
| Minimum | -1.95249 | Minimum | -2.38416 | Minimum | -2.01586 | Minimum | -1.48422 |
| Maximum | 1.961681 | Maximum | 2.362462 | Maximum | 2.825042 | Maximum | 1.773422 |
| Sum | 5.603888 | Sum | -1.77268 | Sum | -6.17575 | Sum | 0.950643 |
| Count | 48 | Count | 48 | Count | 48 | Count | 48 |
| Confidence | 0.296828 | Confidence | 0.28906 | Confidence | 0.298207 | Confidence | 0.228919 |

| PairE, V1 | | PairE, V2 | |
|---|---|---|---|
| Mean | -0.10218 | Mean | -0.05258 |
| Standard E | 0.144669 | Standard E | 0.126471 |
| Median | -0.04147 | Median | -0.07049 |
| Mode | #N/A | Mode | #N/A |
| Standard D | 1.002297 | Standard D | 0.876214 |
| Sample Va | 1.004599 | Sample Va | 0.767751 |
| Kurtosis | 0.441772 | Kurtosis | 0.366947 |
| Skewness | -0.02939 | Skewness | 0.39663 |
| Range | 4.875202 | Range | 4.111267 |
| Minimum | -2.59152 | Minimum | -1.64423 |
| Maximum | 2.283682 | Maximum | 2.467037 |
| Sum | -4.90459 | Sum | -2.52385 |
| Count | 48 | Count | 48 |
| Confidence | 0.291036 | Confidence | 0.254426 |

Figure 89

| PairA, V1 | | PairA, V2 | | PairB, V1 | | PairB, V2 | |
|---|---|---|---|---|---|---|---|
| Mean | 0.096989 | Mean | 0.196302 | Mean | 0.104324 | Mean | -0.00952 |
| Standard E | 0.13961 | Standard E | 0.122261 | Standard E | 0.123087 | Standard E | 0.134324 |
| Median | 0.109633 | Median | 0.168694 | Median | 0.103114 | Median | -0.1503 |
| Mode | #N/A | Mode | #N/A | Mode | #N/A | Mode | #N/A |
| Standard D | 1.099287 | Standard D | 0.962687 | Standard D | 0.969186 | Standard D | 1.05767 |
| Sample Va | 1.208433 | Sample Va | 0.926765 | Sample Va | 0.939322 | Sample Va | 1.118666 |
| Kurtosis | -0.54311 | Kurtosis | -0.47122 | Kurtosis | 0.606116 | Kurtosis | 0.036602 |
| Skewness | 0.270592 | Skewness | -0.00894 | Skewness | 0.104529 | Skewness | 0.385504 |
| Range | 4.801632 | Range | 3.944707 | Range | 5.114252 | Range | 4.548292 |
| Minimum | -1.89191 | Minimum | -1.9692 | Minimum | -2.32085 | Minimum | -2.30396 |
| Maximum | 2.909723 | Maximum | 1.975503 | Maximum | 2.793407 | Maximum | 2.244334 |
| Sum | 6.013295 | Sum | 12.17075 | Sum | 6.46811 | Sum | -0.59005 |
| Count | 62 | Count | 62 | Count | 62 | Count | 62 |
| Confidence | 0.279167 | Confidence | 0.244477 | Confidence | 0.246127 | Confidence | 0.268598 |

| PairC, V1 | | PairC, V2 | | PairD, V1 | | PairD, V2 | |
|---|---|---|---|---|---|---|---|
| Mean | 0.058135 | Mean | -0.02677 | Mean | -0.2056 | Mean | -0.03363 |
| Standard E | 0.127375 | Standard E | 0.124805 | Standard E | 0.123796 | Standard E | 0.097062 |
| Median | 0.009687 | Median | -0.03285 | Median | -0.22023 | Median | 0.014122 |
| Mode | #N/A | Mode | #N/A | Mode | #N/A | Mode | #N/A |
| Standard D | 1.002953 | Standard D | 0.982716 | Standard D | 0.974768 | Standard D | 0.764267 |
| Sample Va | 1.005915 | Sample Va | 0.965731 | Sample Va | 0.950173 | Sample Va | 0.584104 |
| Kurtosis | -0.62364 | Kurtosis | 0.254169 | Kurtosis | 0.386065 | Kurtosis | -0.19345 |
| Skewness | -0.04033 | Skewness | 0.090306 | Skewness | 0.468056 | Skewness | 0.175304 |
| Range | 3.965942 | Range | 4.972036 | Range | 4.840904 | Range | 3.261751 |
| Minimum | -2.00426 | Minimum | -2.38416 | Minimum | -2.01586 | Minimum | -1.48833 |
| Maximum | 1.961681 | Maximum | 2.587876 | Maximum | 2.825042 | Maximum | 1.773422 |
| Sum | 3.60437 | Sum | -1.65981 | Sum | -12.747 | Sum | -2.08523 |
| Count | 62 | Count | 62 | Count | 62 | Count | 62 |
| Confidence | 0.254702 | Confidence | 0.249563 | Confidence | 0.247545 | Confidence | 0.194088 |

| PairE, V1 | | PairE, V2 | |
|---|---|---|---|
| Mean | -0.09963 | Mean | -0.03354 |
| Standard E | 0.124201 | Standard E | 0.118063 |
| Median | -0.04147 | Median | 0.033968 |
| Mode | #N/A | Mode | #N/A |
| Standard D | 0.977963 | Standard D | 0.929633 |
| Sample Va | 0.956411 | Sample Va | 0.864217 |
| Kurtosis | 0.33183 | Kurtosis | 0.486656 |
| Skewness | -0.15939 | Skewness | -0.14884 |
| Range | 4.875202 | Range | 5.053046 |
| Minimum | -2.59152 | Minimum | -2.58601 |
| Maximum | 2.283682 | Maximum | 2.467037 |
| Sum | -6.1771 | Sum | -2.0793 |
| Count | 62 | Count | 62 |
| Confidence | 0.248356 | Confidence | 0.236083 |

Figure 90

| Numeric Output of Alternate Box-Muller Transformation on Uniform R.V. Sample Sequences ||||||||||
| Standard Normal Random Variable = SQRT(-2*LN(U(Ia)))*COS(2*PI()*(U(Ib))) ||||||||||
| Ui, Ui+1 | Ui+1, Ui | Ui, Ui+2 | Ui+2,Ui+1 | Ui, Ui+3 | Ui+1,Ui+4 | Ui+3,Ui+5 | Ui+2,Ui+4 | Ui+2,Ui+1 | Ui, Ui+4 |
|---|---|---|---|---|---|---|---|---|---|
| 1.118872 | -1.58306 | -0.3654 | -0.69476 | -1.6074 | -0.17458 | -0.1134 | -0.63082 | -0.60704 | -0.19364 |
| -1.76096 | 1.095513 | -0.65562 | -0.38205 | 1.169318 | -0.82681 | 1.436749 | -1.02918 | -0.86182 | 0.460259 |
| 0.819048 | -1.70328 | 0.68948 | -0.02854 | 1.889885 | 1.961848 | -0.84363 | 0.177595 | -2.05044 | -1.34441 |
| 0.345205 | 0.204495 | -0.92403 | -0.77499 | -1.04786 | 0.013839 | 0.113221 | 0.904402 | 0.019001 | -1.14238 |
| 0.478427 | -0.13826 | -0.31349 | -0.53047 | 2.227761 | -1.26497 | -0.42605 | 1.722225 | 1.101179 | -0.63685 |
| 0.290076 | -0.04331 | -0.92676 | 0.363487 | -0.31316 | 0.073278 | 1.69105 | 2.1972 | -0.47974 | -0.57526 |
| -2.43136 | 1.315783 | 0.087433 | 0.838752 | -0.91111 | -0.13445 | -0.85647 | -2.59147 | 1.471324 | 0.540154 |
| 0.875082 | -0.08907 | 0.928218 | -0.26028 | 0.237685 | -0.85193 | -0.25699 | -1.71653 | 0.757633 | 1.255192 |
| 0.34939 | 2.550201 | 1.687156 | 0.738855 | 0.277506 | -1.43518 | 0.667983 | 1.259439 | -0.81323 | 1.451371 |
| 0.062034 | 1.660399 | 2.094043 | 0.492712 | -0.30331 | -0.24448 | 0.373243 | -0.39485 | -0.21708 | -0.39549 |
| 1.609129 | 0.175941 | -0.04757 | 0.356863 | 0.603471 | -1.36692 | -0.55363 | 0.062113 | -0.33635 | -0.10309 |
| 2.434943 | -0.32601 | -2.02536 | 0.199063 | 0.494561 | 0.289171 | -1.51283 | -1.49272 | 0.772804 | 2.864967 |
| 1.345626 | -0.4864 | 0.260467 | 0.173989 | -0.02524 | -0.00521 | -0.82696 | -1.50974 | -0.39952 | -1.74264 |
| 0.360793 | -1.02509 | 0.295265 | -1.62831 | 1.807546 | 0.025406 | -1.06672 | 0.153557 | -0.78919 | -0.22163 |
| 1.731175 | -0.28156 | 0.275344 | 0.00738 | -0.24168 | -0.11767 | -0.97916 | -0.081 | 0.163716 | -0.71646 |
| -0.62307 | 0.313393 | 1.404233 | 1.103463 | 1.624228 | -1.65122 | 0.329543 | 0.713821 | 0.768284 | -0.70068 |
| -0.87475 | -0.07465 | -0.6308 | -1.23152 | -0.01054 | 0.30315 | -0.50781 | 0.436578 | -0.13265 | -0.07591 |
| -1.38043 | 0.431863 | -0.68004 | -2.97004 | 0.0928 | 0.772726 | 0.090119 | 0.232528 | 1.198599 | 0.507581 |
| -0.67922 | 0.348821 | 0.408813 | 2.001131 | -0.16524 | 0.968065 | 0.854391 | 0.087577 | -0.50793 | 0.155113 |
| -0.99403 | 0.442878 | -1.05106 | 0.854715 | 0.706641 | -0.63139 | 0.435125 | 0.041212 | 0.411071 | 0.740369 |
| -0.86633 | 1.412089 | 0.647699 | -0.13145 | -0.71215 | 0.179567 | -1.55995 | -0.92316 | 0.734627 | 0.769818 |
| 1.215636 | 1.473141 | 0.799973 | 0.353926 | 0.873706 | 0.315574 | -1.80975 | 0.161371 | -0.92429 | 1.631629 |
| -0.42369 | 1.695935 | 0.968575 | 0.635109 | 1.888085 | -1.08472 | -0.5051 | -1.40106 | -1.63588 | -1.00551 |

Figure 95

| Temporary disable feature on memory and/or graphics, internal or as outside device, for tests |
|---|
| this enables the calculators to be used in test environments without further ado or loss<br>by having temporary disable feature, memory is not deleted, but is non-functional for tests<br>disable memory and/or graphics functions for a time period, so the calculator can be used:<br>an internal disable feature with timed duration, using the processor's clock to count time<br>or by central storage, memory loading, device, with storage space per calculator in group. |

Figure 96

| Short coded demos in on-board memory of interesting usage, topics, subjects and formulae |
|---|
| it's always fun for an electronic device to have simple programs, showcasing capabilities<br>it's always good for dedicated devices to stimulate interest and learning in their subject<br>the depth of features available in such calculators often remain hidden from casual use:<br>demos on topics, functions and formulas in memory, wherein elaboration in user manual<br>the user manual is organized, conceived and focused on capabilities, usage, applications<br>examples: reference items, formulae, even graphical art generations, sample, "Insect":<br>graph in polar: $r1 = 5\cos(2\Pi)$; $r2 = 2+2\cos(2\theta)$; $r3 = 5-2\tan(5\theta)$; $r4 = 4+4\sin(2+2\theta)$.<br>add brief elaboration and context to educate, to inform; see also Reference Resources. |

Figure 97

| Resident resource compendia, RAM/ROM sets, providing coded functions and items on-board |
|---|
| not much on-board memory need be taken up by assorted demos, being fixed-coded items<br>by executing demos on user command, stored graphics, results or images are not required<br>add required list, group or function for the variety of subject expositions ala encyclopedia:<br>target assemblage of reference compendia to varied educational levels of math and science<br>high school version supports teaching of geometry, algebra, probability, calculus, sciences<br>elementary to college versions help educate; scaleable to lower end units, and useable in all;<br>make advanced specialized resources per industry, as modules loaded to RAM or installed<br>per electrical, mechanical, environmental, financial engineering; math, physics, astronomy<br>such items include today's methods, theorems, formulae, procedures, pre-coded functions<br>compendia add pivotal resources: references, equations, algorithms, processes, programs. |

Figure 98

| professional standard industry-specific software, pre-loaded or accessible through interface |
|---|
| develop the reference resources along with subject functions coded to existent calculators<br>arm a portion of calculator memory with compendium of equations, conversions, etc.<br>some to full pre-loading, or as modules by industry fields, with downloading to RAM |

Figure 99

| value-added software is packaged as desirable assets for different operational specialties |
|---|
| Calculator has application archives, of science, math, engineering, focus on user-friendly<br>proper subject archives arranged, to be categorically supplemented by newly coded items<br>new archives are value-added property to integrate, install, or avail, by cable, line or net<br>all software can be pre-loaded (opt. delete), be availed separately, or transmitted on-line<br>provide additional access and memory capacity, i.e. RAM/ROM cards, ext/int drive/storage<br>technology path of calculator unit on improved digital interfaces, bus, PCMCIA, memory. |

Figure 100

| Resident Financial Equations and Algorithms coded for use in Equation (iterative) Solver, include: | | | | |
|---|---|---|---|---|
| AI CorpB | AI TB | Annuity | Bond Equiv Yield | Bin 1, Bin2, Bin 3 |
| Binomial | BS | Bond | BonK, BonV | Brown |
| CBT | CLT | Comp | Con, Conadj, Condp | Convexity |
| DeltaP, dP | dPdY | DurMod | DurMc | DV01 |
| FFOTD | Forward | FX | Hedge, HR | MDS |
| Min1,Min2,Min3 | Mortgage | MPC | Muni | OAS3 (example) |
| OCF | PAY, PAY1 | PR, PRBond | PRCalB, PRMunat | PRO |
| PROMOD | PROPC | PTIC | PV | SPC |
| Spot | Swap | FXSwap | Tbill1, TB2, | TBT |
| TDCap | V | Var | W | BoxMuller |

| Resident Financial Reference Resource Items coded for display to screen or output, include: | | | | |
|---|---|---|---|---|
| Bernoulli | optionbond | Borel-Cantelli | Boundary | Brownian |
| Option | optionlog | CAPM | Chebychev | Correlation |
| CoVar | Credit | cut-off | distfunc | E(N) |
| EQU | EX | Floater | FOCF | GenFunc |
| GcS | lattice | Inde | Intre | Ito |
| Lambda | lease | martingale | minrisk | mpr |
| partition | PCP | Poisson | Portf | RandomW |
| replication | riskadverse | SPC | strong | theorfut |
| tokens | tree | utility | weak | weight |

| Other Reference Resource Sources for Financial Matter, Data, Equations and References, include: |
|---|
| Books    Periodicals    Newspapers    Internet    Real-time digitized data providers |

Resident Processing, Reference Resource Items and Programmed Functions, include:
clock, date, calendar, default value present time/date
equation solver function and simultaneous equation solver function
intervals between dates, coupons, valuation, exercise, expiration
day-count conventions, instrument standards, conversions
fixed-income general valuations (annuity, mortgage, lease, bond, rates and yields)
fixed-income advanced valuations (variable cash-flows, inverse, MBS, sinking, optionality)
fixed-income derivative valuations (options, futures basis, hedge ratios, swaps, FX dP/dY)
fixed-income and derivative sensitivities (duration, convexity, delta, gamma, theta, dtheta)
fixed-income yield curve building (spot, risk-free short rates and forward curves)
accounting standards, (GAAP, statutory, derivatives, credit quality, risk-adjusted capital)
financial statement and performance ratios, operating ratios of financial criterion
credit and ratings grade conventions, calculating ratings and spread approximations
insurance ratios, pricing, quantitative methods
reinsurance forms and pricing of excess of loss, facultative, treaty varieties
actuarial mathematics and sciences, loss distributions, contingencies, survival models
standard normal and lognormal random number generation, selectable N, descriptive statistics of sample
simulations by lattice, brownian motion, random sequence generation, interpolation
portfolio management of VaR, performance analytic measures
direct approximations by derivation, linear algebra, symbolic, integration, interpolation
mapping to charts, display multiple list and graphical display (to 3D)
one, two and more variable statistics and multi-factor regression
time series and artificial intelligence data mining, normalization procedures
inferential and descriptive statistics, probability distributions
real-time and formatted data loading and serial, IRDA and TCP/IP
stored column formulas, spreadsheet capability, data set manipulation
split screen, display size minimum pixels 128x64, 8x21 display characters
trace, overlay (or by split screen) and combine scatter plots, histograms, interpolations, results.

INVENTION IN FINANCE

RELATED APPLICATIONS

Sole Applicant/Sole Inventor: David Andrew D'Zmura (pro se independent inventor):
Application No. 60/030,085 of Nov. 5, 1996;
Application No. 60/117,261 of Jan. 26, 1999;
Application No. 60/117,260 of Jan. 26, 1999;
Application No. 60/127,512 of Apr. 2, 1999.

INCORPORATION BY REFERENCE

D'Zmura, David Andrew. "Forecasting Expectations of Insured Depository Default and Catastrophic Losses". Proceedings of the IEEE/IAFE/INFORMS 1998 Conference on Computational Intelligence for Financial Engineering. CIFEr '98. New York. P. 66-91. 1998.

STATEMENT

The inventions herein were not made under Federally sponsored research and development.

TECHNICAL FIELD

Financial methods, processes, logic, algorithms, computerized apparatus and system.

SUMMARY

Methods and processes for valuing a financial security, wherein comprising unique mathematical and computational programming functions. A method for portfolio aggregation. Processes computing change in price of a security or portfolio respective a change in yield. These methods and processes are demonstrated as more robust and precise than standard art. A security composed of similar securities, engineered in manufacture process to reflect target criterion. These securities would afford investors customized hedging or immunization needs. Business logic of analytic valuation, of security generation, and of arbitrage differentials and relative value spreads, such providing basis of computerized automation. A computer-based system which incorporates the business logic engines. A mutual fund, operating on the methods, processes, business logic and system, for investor public. Numerical data cleaning and preparation. Further process utilizing cleaned and prepared data. A process establishing a likelihood of default of depository banks by use of operating ratios. Method and process simulating variable statistical distributions in small sample environment. A theta variable modeling technology, including a process of theta's mathematical programming functions. An OAS/martingale valuation lattice, modified for default or loss and recovery or development. A business process, a swap transaction, between insured deposit default and catastrophic loss. Improvements to the art, and unique functional specifications, of computational calculators.

BACKGROUND

The invention is necessitated by the shortcomings evident in prior art financial theories, methodologies, practices and products. The present invention affords improvements.

Prior art financial valuation rests on a pricing relation between coupon, yield to maturity and time to maturity, wherein the price is equal to a valuation formula based on a summation. This summation form creates a problem in derivation, as the first derivative, which should capture the change in price with respect to the yield, is actually only a first order term of the Taylor series approximation needed to find such a solution. Thus, the second derivative, which should capture the change in the change in price with respect to yield, is actually the second order term of the Taylor series approximation. Only by an infinite number of ordered terms does the solution become precise. The first derivative, duration, in the prior art, the first order term, is positive in magnitude, and hence fails to capture the negative magnitude of Einstein's fourth dimension, duration. Further, the prior art duration formulation contains four variables: coupon, yield, maturity and price, wherein price and yield are related by definition, and hence, the prior art formulation involves an analytic tautology, as price is defined as related to coupon, yield and maturity. Thus, prior art fails to deliver a precise algorithm for duration or to reflect space-time science. The present invention identifies a non-summation form and therefrom derives a precise first (and second) derivative.

When applied to valuation, and valuation changes over time, the prior art process is demonstrably imprecise, which often leads to tragic error when relied upon, as it is, in the hedging of securities and portfolios. And because the nature of imprecision can over or understate the actual change in pricing, when implemented within a portfolio comprising many securities, the error of each can become diffuse in the group and can lead to calamity.

The invention provides innovative algorithms for valuing financial securities, wherein the price (P) of a security relates to three variables via a function, said securities include the group of fixed-income, equity and premium policy instruments, said variables comprising the cash receipts (C), yield (Y) and time (T) to maturity or expiration, said function relating change in price with respect to yield, at instantaneous condition, by a novel formulation of duration. The invention's duration is a perfect form first derivative based on a non-summation formulation of price respective C, Y and T, and hence, is an exact conveyance of change in price with respect to Y in continuous time. The invention's duration is isomorphic to Einstein's postulation of the fourth dimension respective three dimensions of the space-time continuum, also called duration, which he shows as bearing negative magnitude. The invention's formulation of three variables, C, Y, T, embodies the characteristics of any financial security, and has continuous relation via a fourth dimension, duration, termed K.

In discrete time, the notion of theta, the derivative with respect to increments in time, is described and is implemented in valuation mechanics and in drawings and spreadsheets. The processes accurately and precisely capture price change respective to time and yield.

The invention presents its governing yield which is the spot yield of a security or payment at present or future time. This notion can replace prior art forward rate curve process, this latter process bearing two serious flaws: 1) it is not a continuous curve, but a series of short hyperbolae strung together and joined where each asymptotically explodes; 2) the prior art forward rate curve is not isomorphic to or indicative of pricing realized forward.

The invention relates portfolio aggregation methodologies which afford the establishment of valuation and sensitivity values for a portfolio as a whole, useful in trading and hedging. A variable is specified, Yield M, useful for a portfolio of one or more securities.

The invention specifies algorithms, processes and systems which provide the computation of the novel financial methods. In addition, it specifies arbitrage based thereon, as well as a fixed-income mutual fund utilizing the relative value arbitrage afforded thereby.

The assortment of available financial instruments is limited, and often, what is available, with respect to a sought after duration (for instance, for immunization of a portfolio) may not be available in the market. To such ends, and as means for creating securities which may be alternatives or arbitrage matches for existing securities, the invention creates a new class of financial security, called a Replicated Equivalent Primary Security.

Most of the valuation methods and algorithms used in the pricing of options and derivatives rely on a set of assumptions regarding the log normal condition of the underlying variables. The invention provides data cleaning techniques to identity and to test for such log normal states of a variable, which are necessary as the conditions of the underlying change. The invention provides data analysis methods and process for small sample environments.

The data cleaning technology is applied to financial variables found in depository banking and P&C insurance industries. Such variables, having nominal value, can function as the underlying variables of financial securities modeled thereon, and therefore, the invention organizes and describes the technology pertaining to underlying state, theta, variables. The invention further specifies a process useful in establishing the likelihood of default of insured depository banks. As the insured banks pay a fee to the FDIC Bank Insurance Fund, such process, utilizing a set of operating ratios in concert, can be helpful in identifying the causes of default risk, as well as assessing the level of risk on an aggregate or individual bank basis. Included in modeling a theta variable is described its mathematical programming functions.

Pursuant to the mechanics of prior art OAS (Option Adjusted Spread) and martingale valuation lattice, useful for modeling values having an element of default or loss probability, is the shortcoming that default or loss is held realized at the event of default (or catastrophe) whereas default is followed by recovery, and a catastrophic event by loss development. Hence, the invention specifies a modified lattice incorporating the recovery and development.

Given that the insured depository banks pay insurance fees to the FDIC's BIF, and given that the Property & Casualty insurance industry has a shortage of underwriting capacity with respect to the prospect of severe catastrophic losses, and because the taxpaying public stands as the end guarantor against catastrophic bank depository default and catastrophic loss, presented herein is a swap transaction between the quasi-governmental bodies of the FDIC and the NAIC, between insured depository default and catastrophic loss, useful on industry treaty or per individual institution basis. Specified therein is the use of public sector capital. Such swap or treaty reinsurance provides a mechanism towards open market reinsurance of such relatively uncorrelated risks between the insured banking and P&C insurance industries.

Among the aspects of the invention are specifications of computerized apparatuses and systems to performing valuation, analysis, identification and execution of transactions. Further aspects of the invention include improvements to the art of computational calculators. Such improvements include resident educational features for teaching and scholastic usage. Specified in functional detail is a financial engineering calculator, with computational and resident coded features suitable to the demanding needs of the technical financial community. To date, the prior art financial calculators provide only few rudimentary resident algorithms and lack resident reference resource type items, these shortcomings directly addressed herein.

BRIEF DESCRIPTION OF THE DRAWINGS

The formulaic means and functions for valuation of a security:

FIG. 1, Formula 1.1;

FIGS. 2 and 3, Formula 1.2 and alternate 1.2d;

FIG. 4, Formula 1.3;

FIG. 5, Formula 1.4.

The means and functions to aggregate a portfolio or divisible security, FIGS. 6 to 10.

Figure 11:
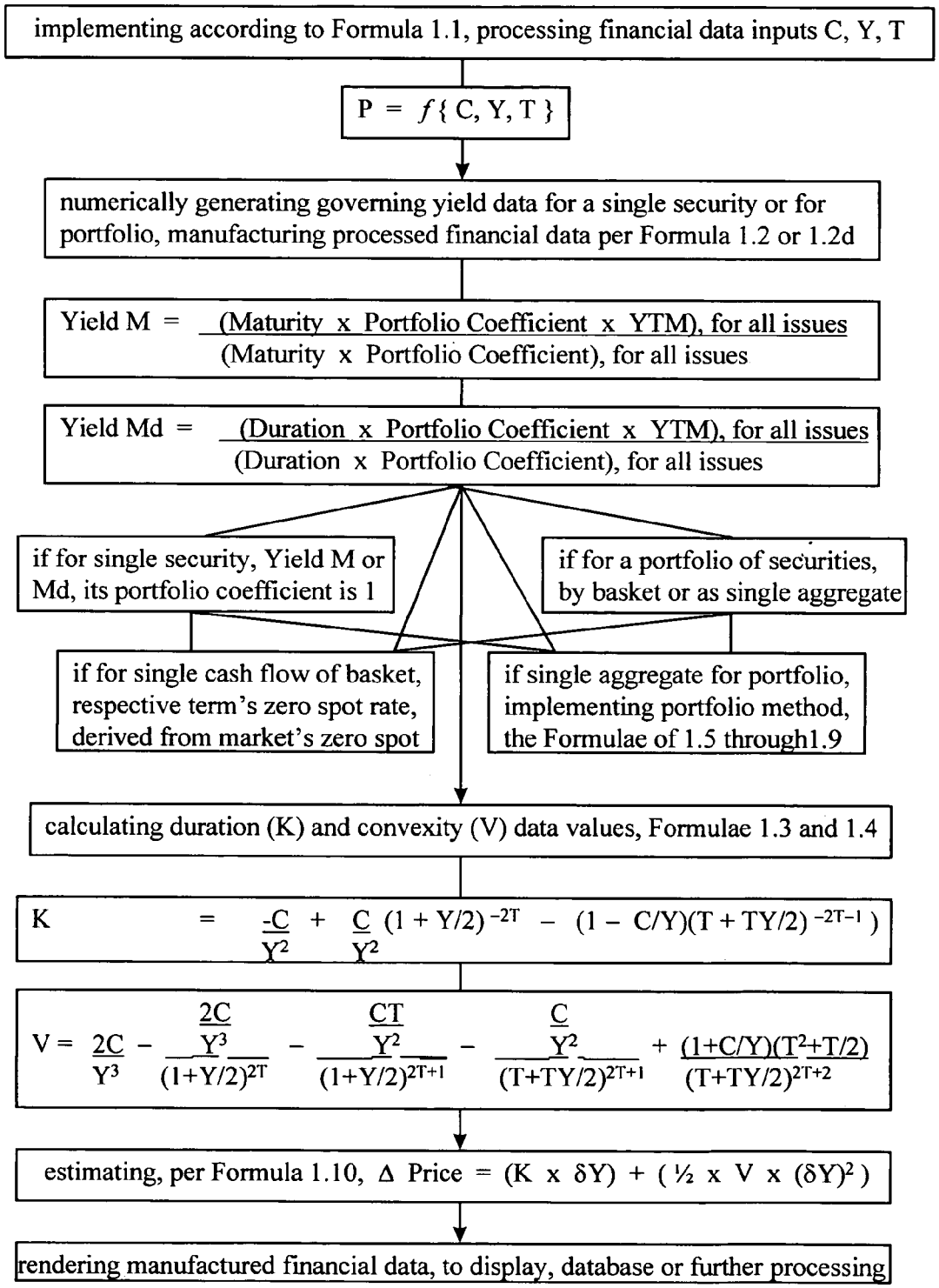

The process of valuation, of establishing pricing sensitivities, and of estimating change in price, based on means, FIG. 11.

Figure 12:
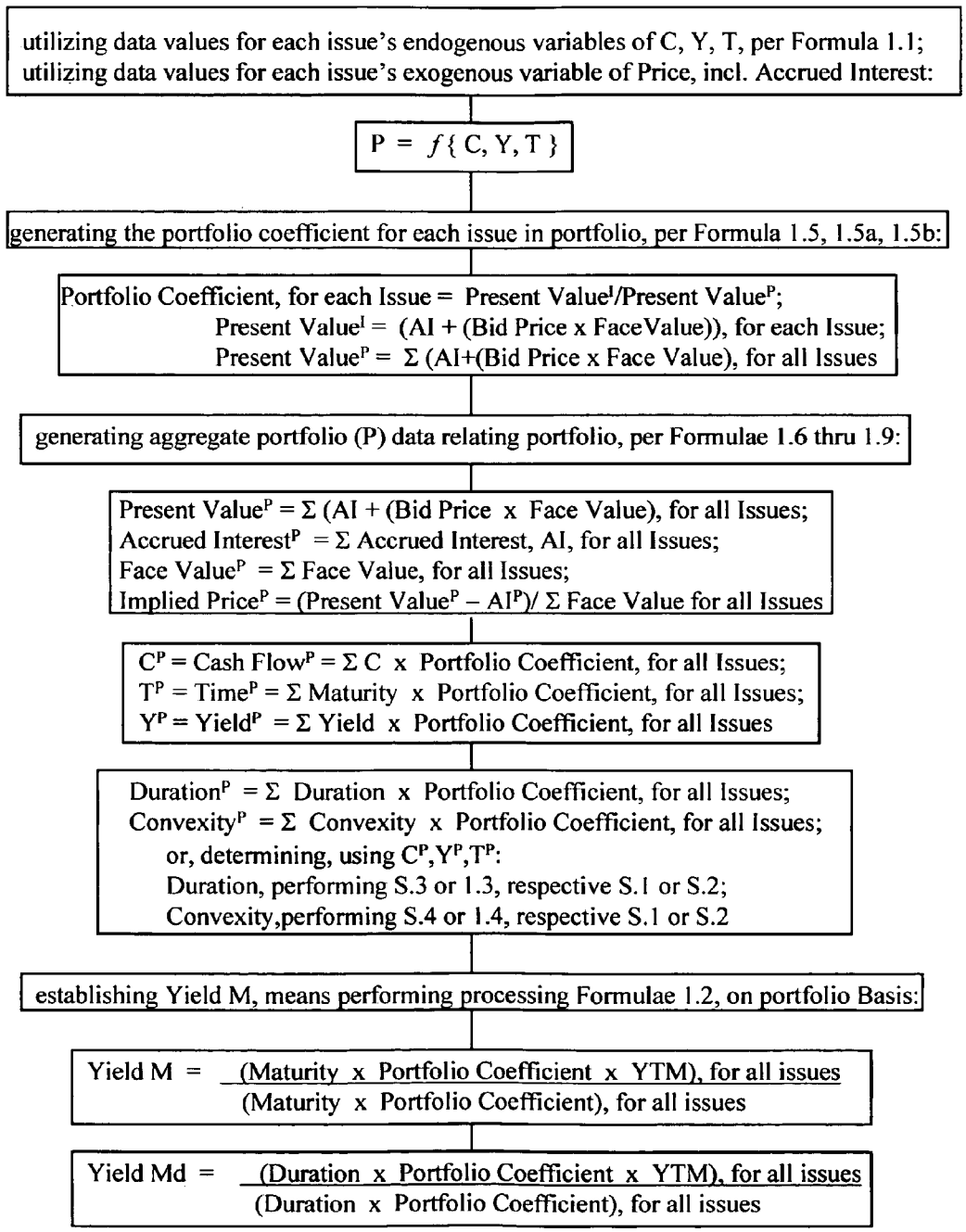

The method of portfolio aggregation based on means, FIG. 12.

FIG. 13, a sample portfolio comprised of financial securities, with data values per security.

FIGS. 14 and 15, the aggregation programming functions and aggregate values generated.

FIG. 16, Yield M values and relative basis to zero spot corresponding to portfolio maturity.

FIG. 17, estimation over time of change in price by change in Yield M, vs. standard Yield.

FIG. 18, the pricing sensitivity of duration, K, contrasted with standard duration.

FIG. 19, standard convexity, used in combination with K and Yield M, estimating the change in price.

FIG. 20, the convexity V, varied inputs, contrasted with standard; Yield M-spot differential.

FIG. 21, estimation of price change based on Yield M, K and V, see FIGS. 1 through 22.

FIG. 22, means and functions for estimating change in price, operating by FIGS. 1 to 22.

FIG. 23, demonstrated mathematical relation of duration and convexity to change in price.

FIG. 24, the method of manufacturing valuation and pricing sensitivity data for a portfolio.

FIG. 25, coded algorithms corresponding to formulae for valuation of security or portfolio.

FIG. 26, coded algorithms corresponding to formulae for valuation of security or portfolio.

FIG. 27, means and functions for estimating price change, plus derivative respective time.

FIG. 28, means and functions for estimating price change, after FIG. 27, for a portfolio.

FIGS. 29 and 30 implement FIGS. 27 and 28, and calculate and sort arbitrage differentials.

Figure 31:
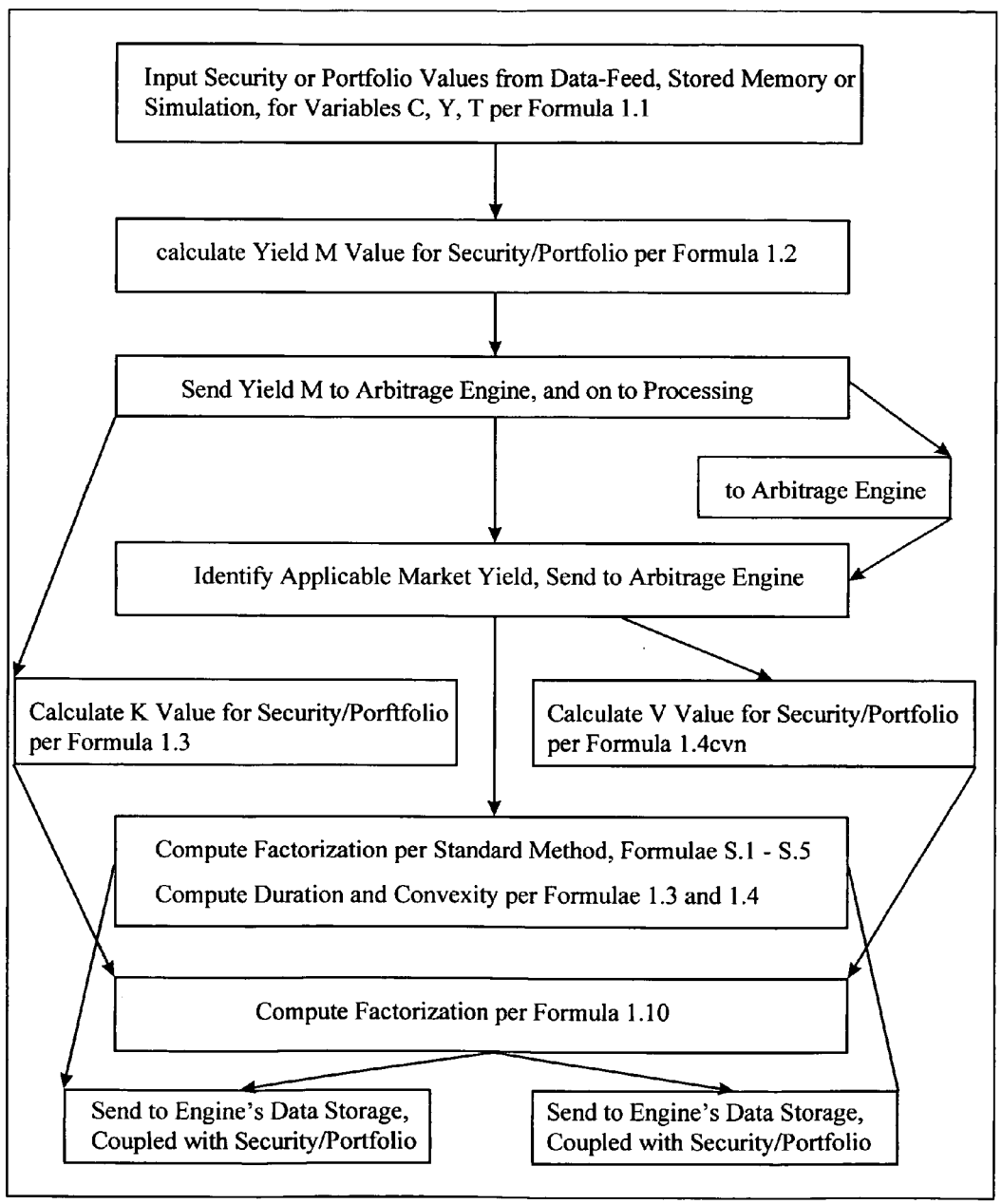
Figure 32:
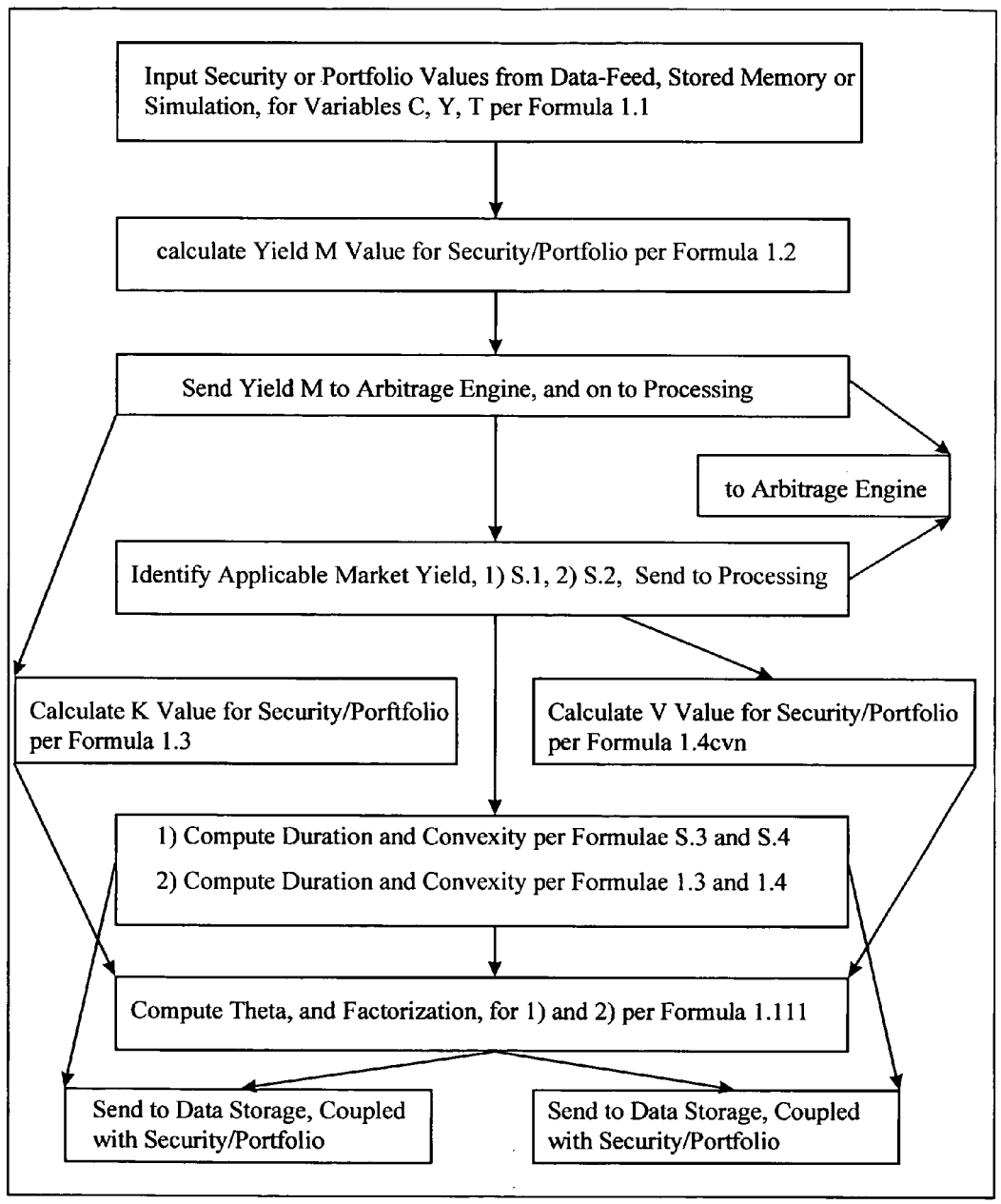

FIG. 31 diagrams analytic valuation engine;

FIG. 32, engine modified for time derivative.

Figure 33:
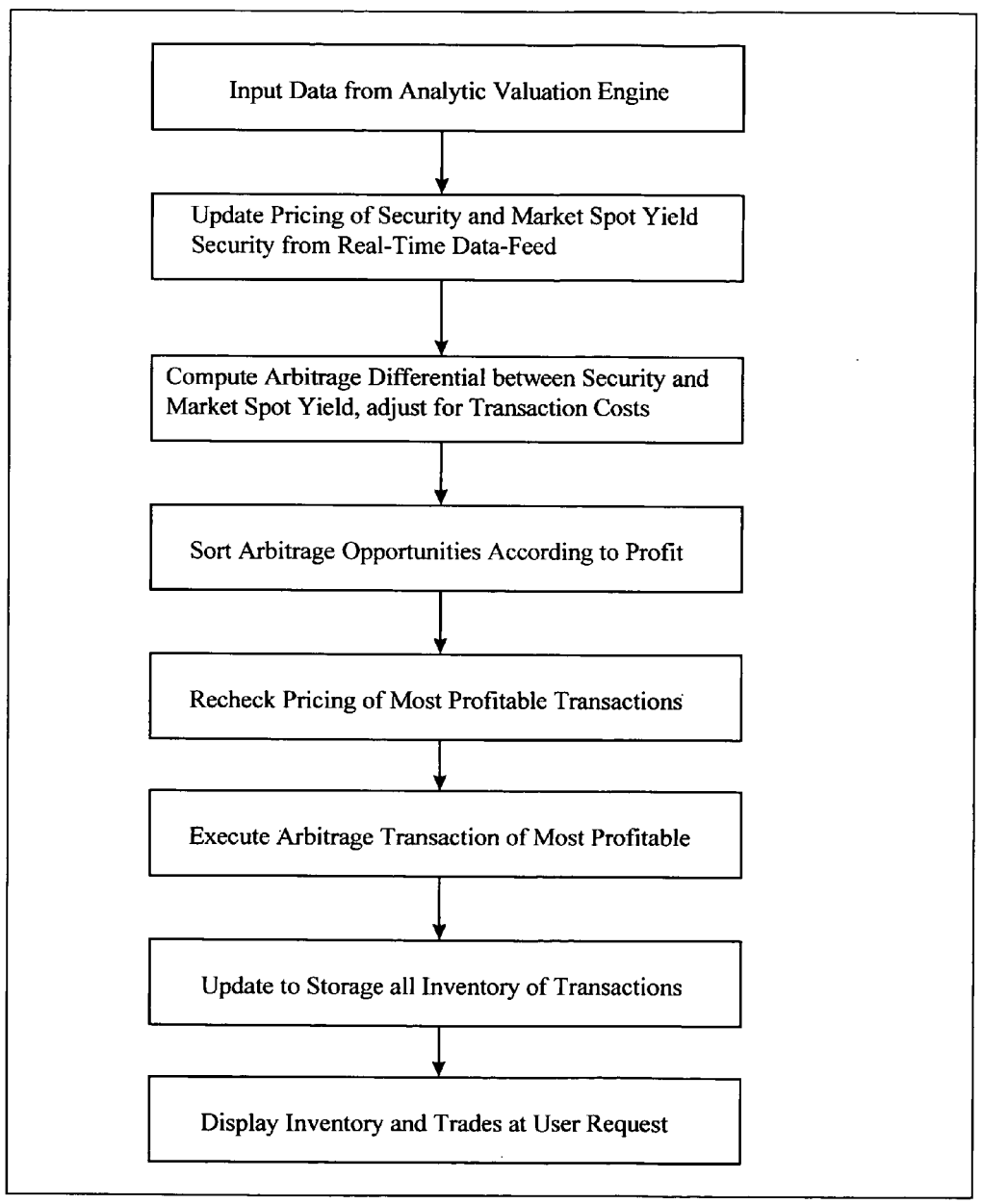
Figure 34:
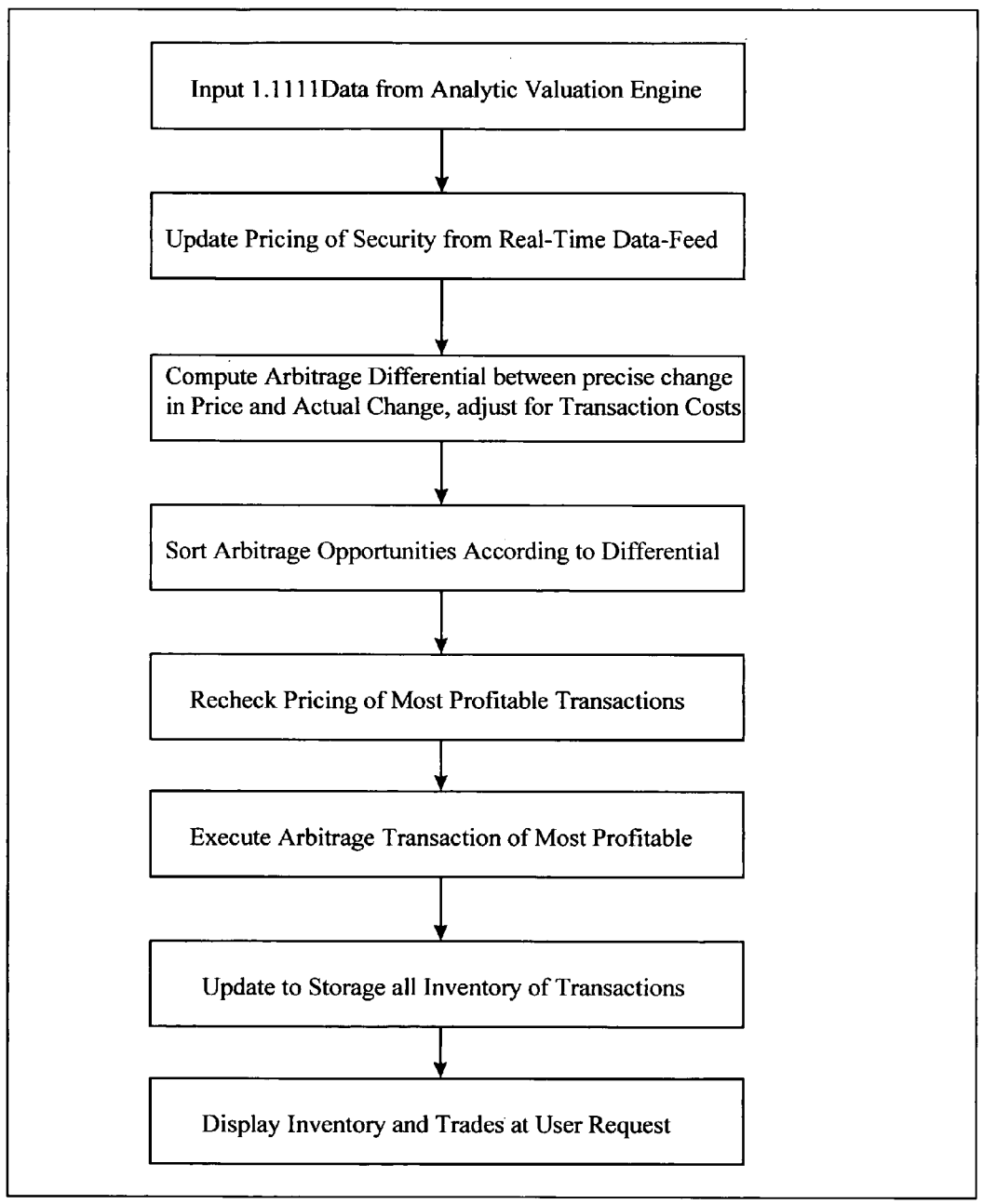

FIG. 33 diagrams automated arbitrage engine, spread arbitrage;

FIG. 34, notch arbitrage.

Figure 35:
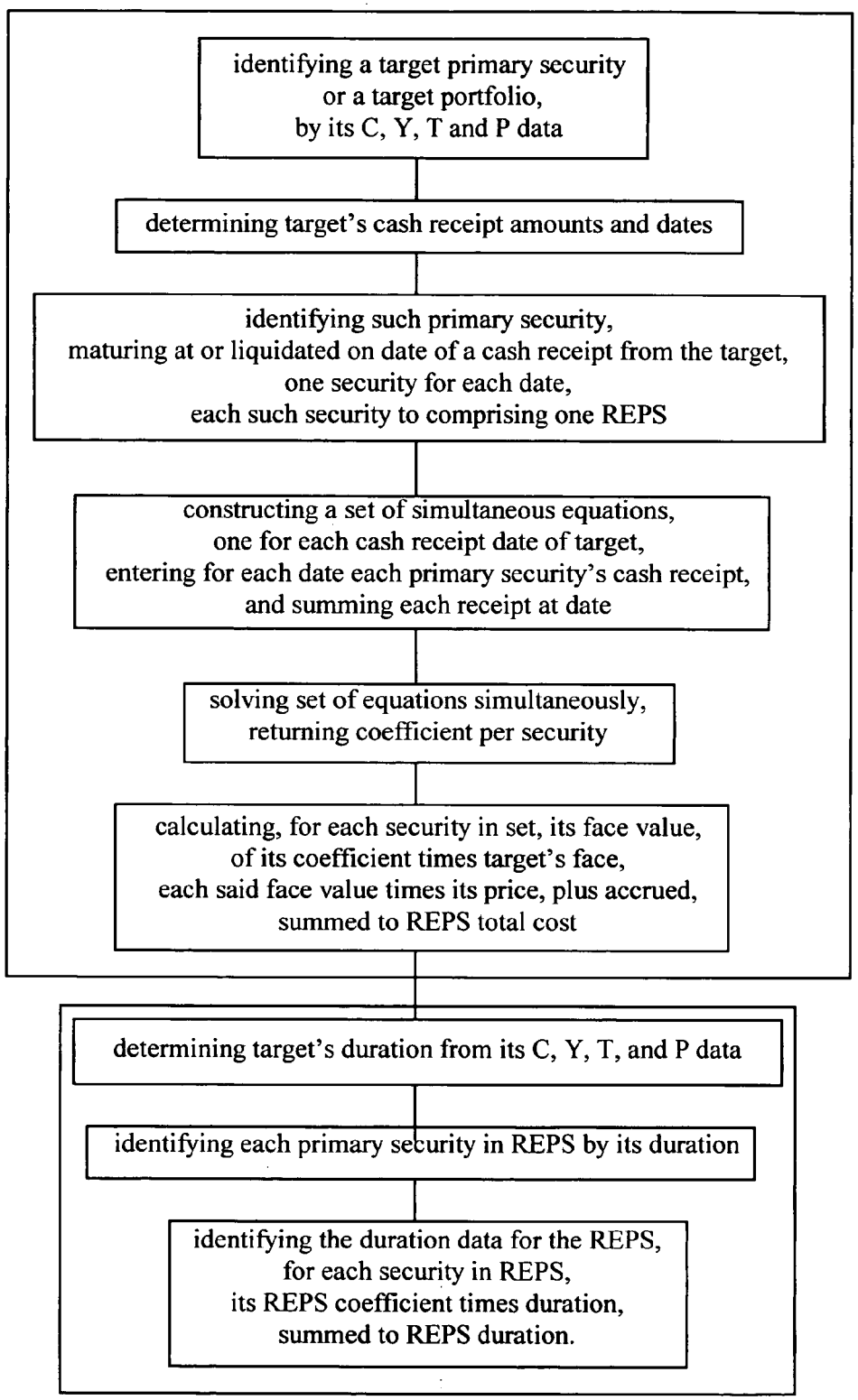

FIG. 35 process manufacturing a REPS security.

FIGS. 36, 37, 38, three alternate REPS.

FIG. 39, the target security.

FIG. 40, price matrix, buy and sell prices of REPS and target.

FIG. 41, arbitrage opportunities between buy, sell pairings, each of REPS and target; sorted.

Figure 42:
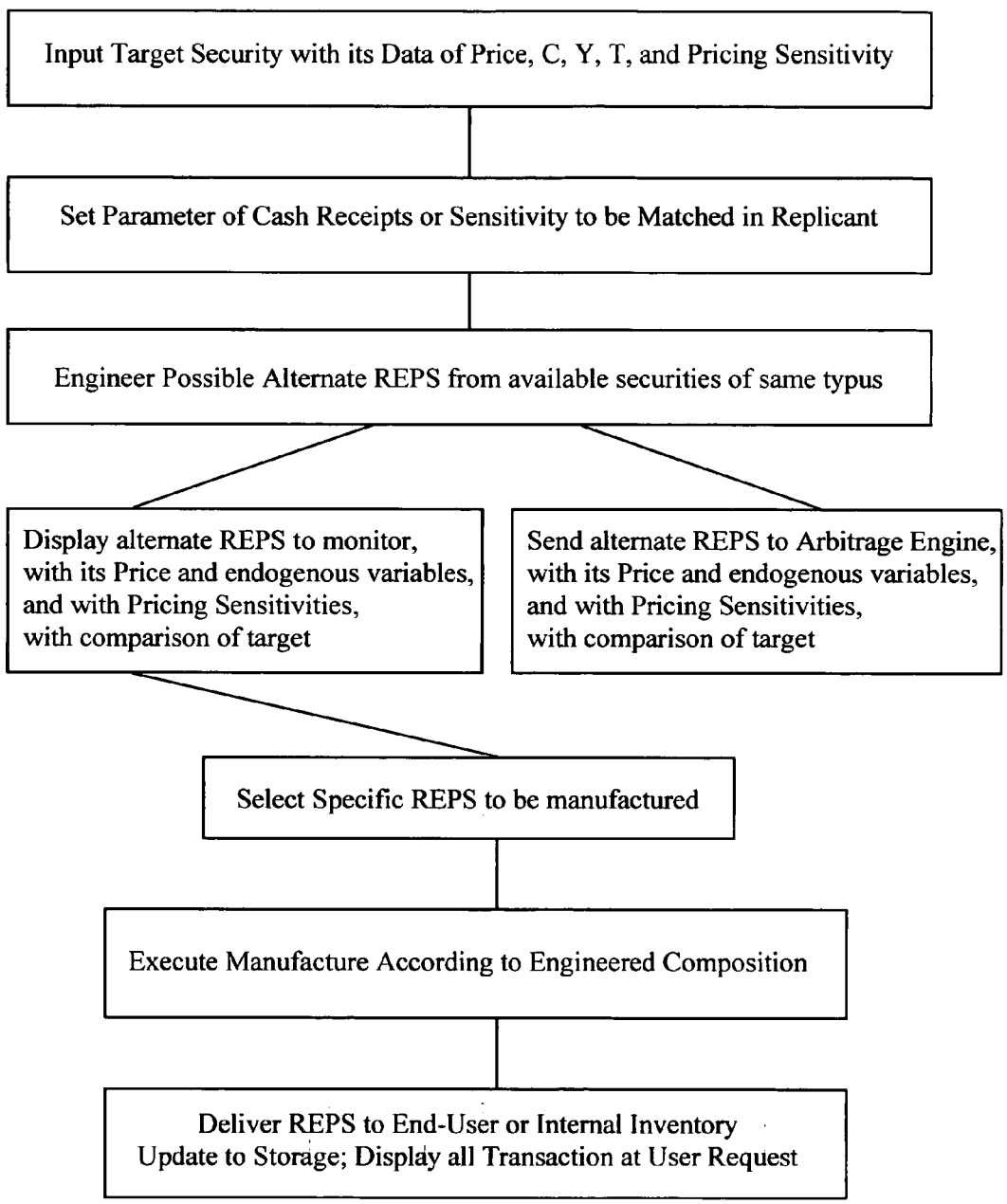

FIG. 42, REPS generator.

Figure 43:
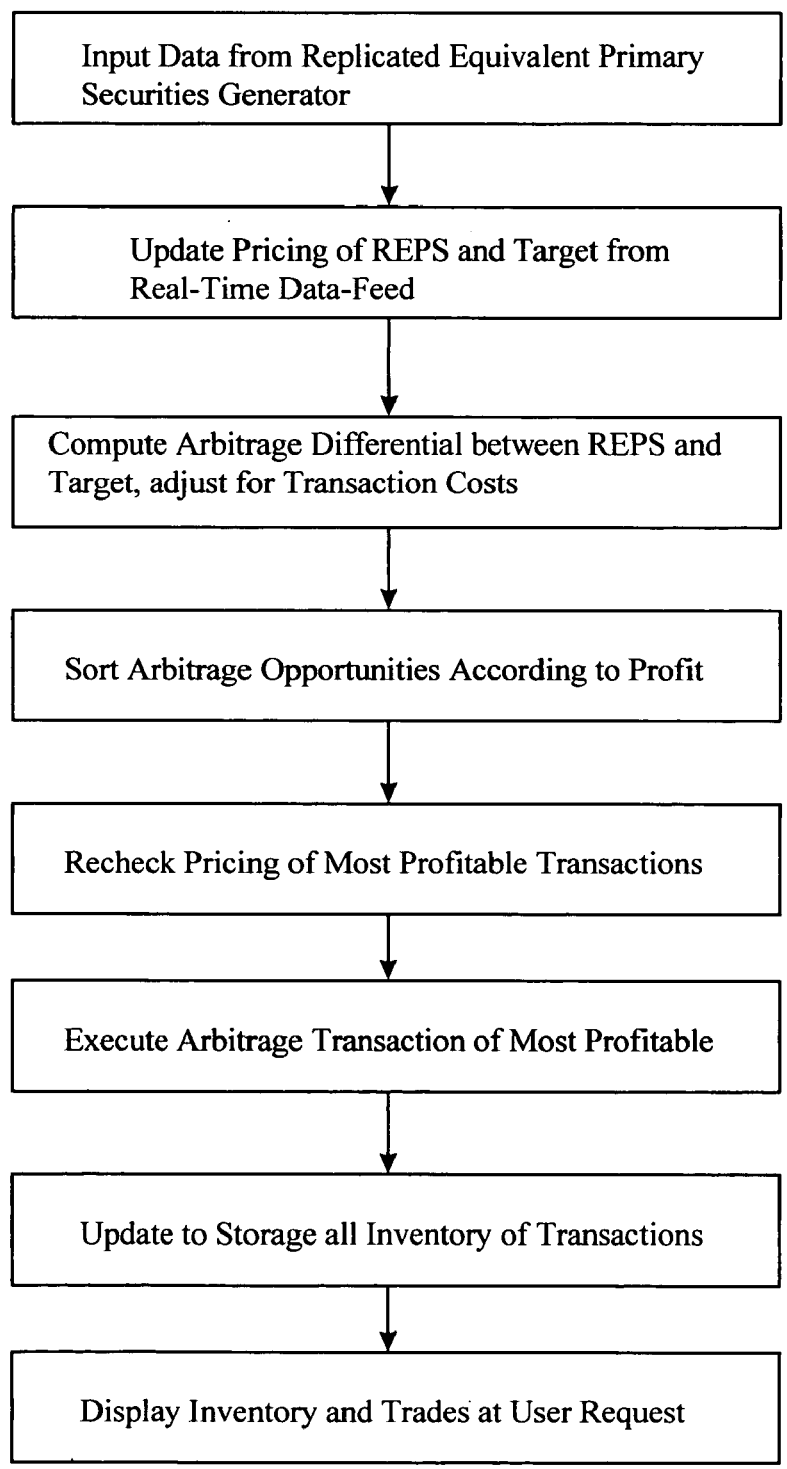

FIG. 43, the automated arbitrage engine, basis REPS arbitrage.

Figure 44:
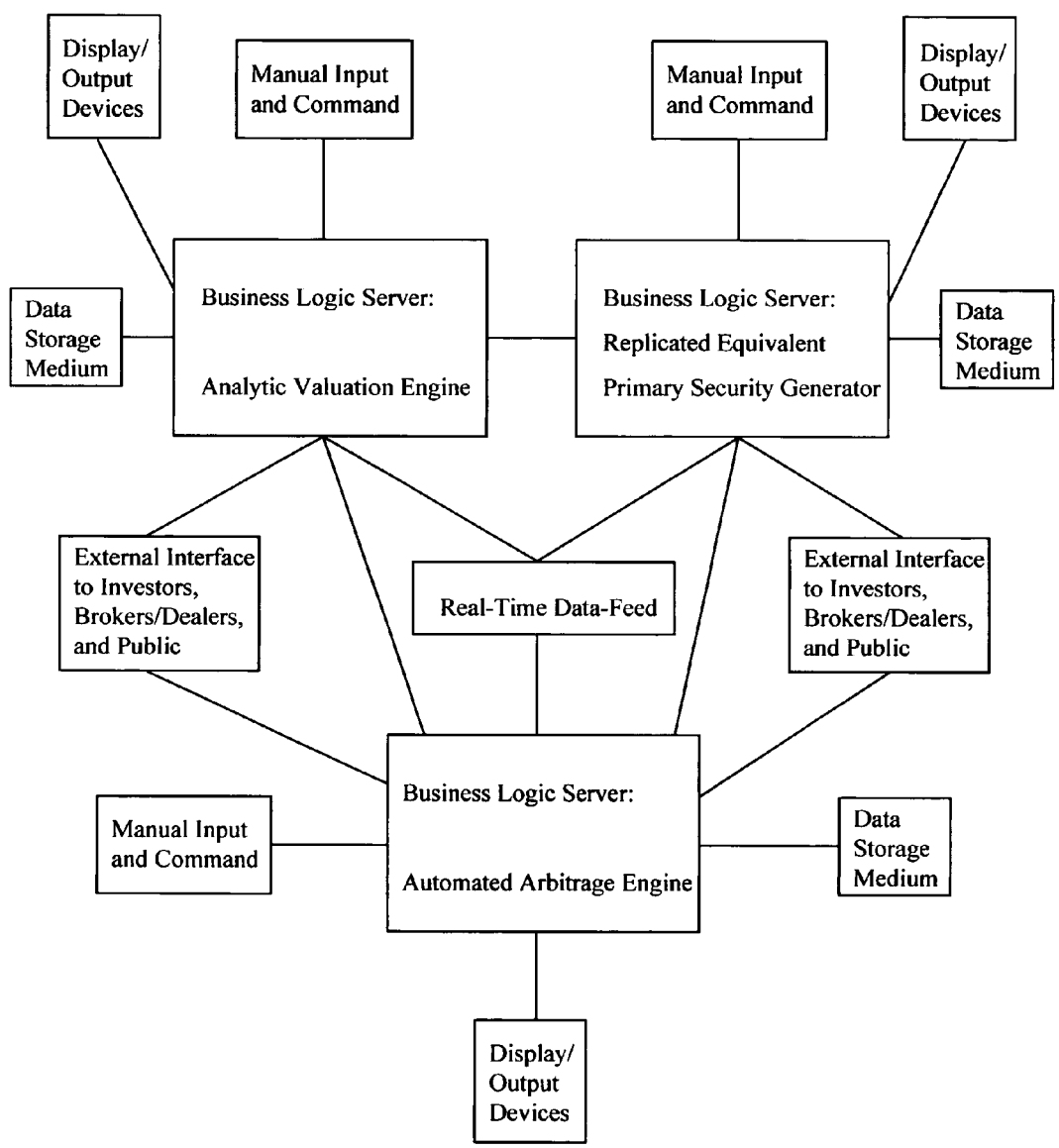

FIG. 44, systems architecture, integrating the core valuation, REPS and arbitrage engines.

Figure 45:
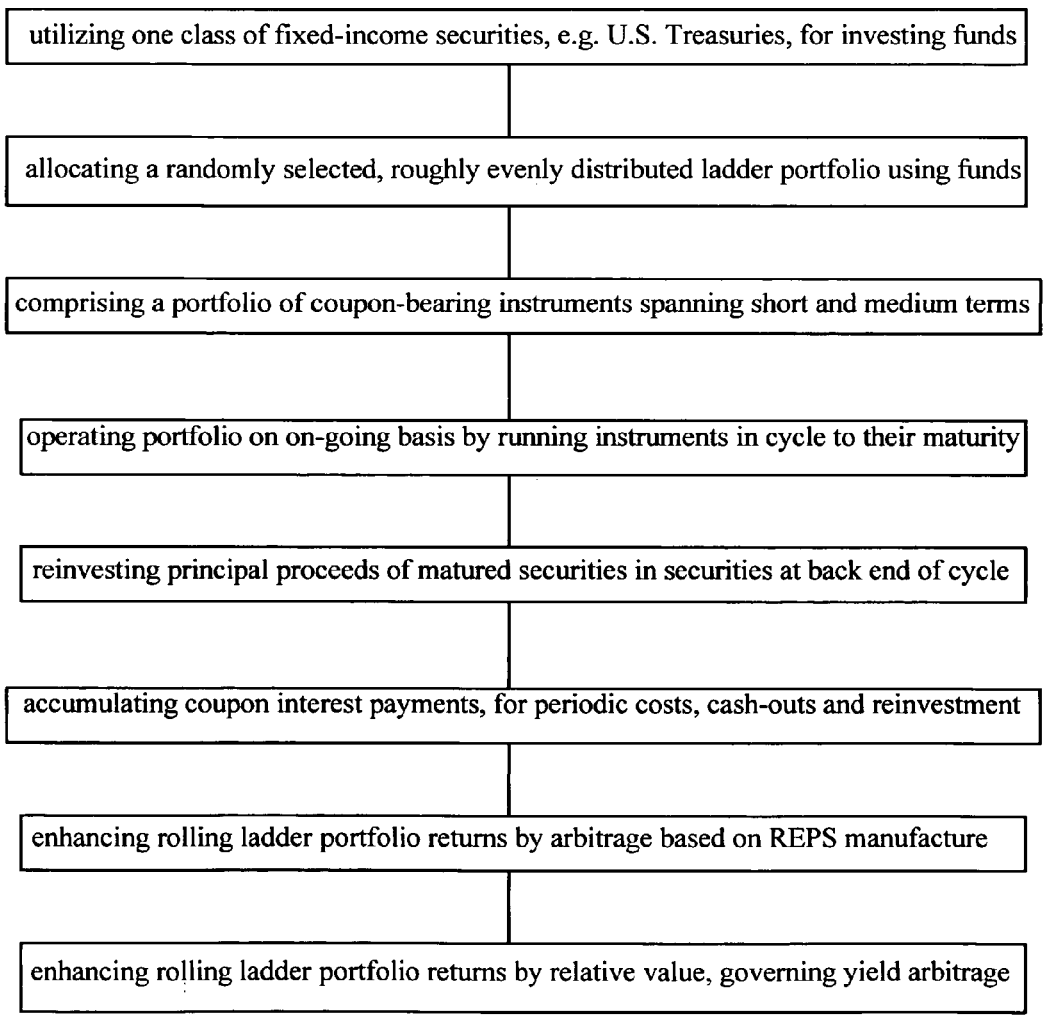

FIG. 45, method of mutual fund operation, incorporating valuation, REPS and arbitrage.

Figure 46:
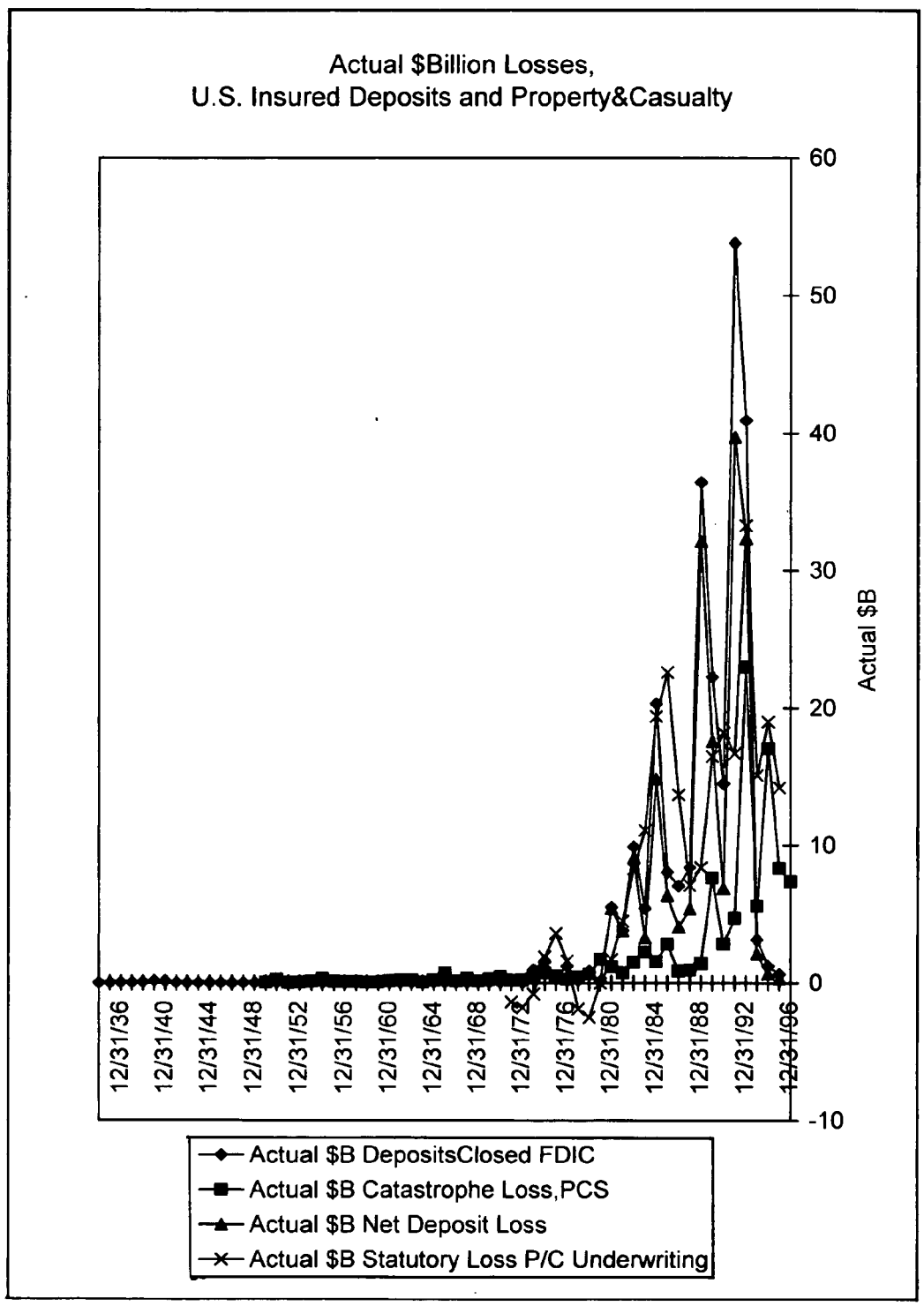

FIG. 46 graphically renders nominal data of variables of depository default and P&C losses.

FIG. 47, tabled arrays of variables' nominal and inflation-adjustment data; inflation scalar.

FIG. 48 is tabular rendering of variables' log and delta log data arrays using adjusted data.

Figure 49:
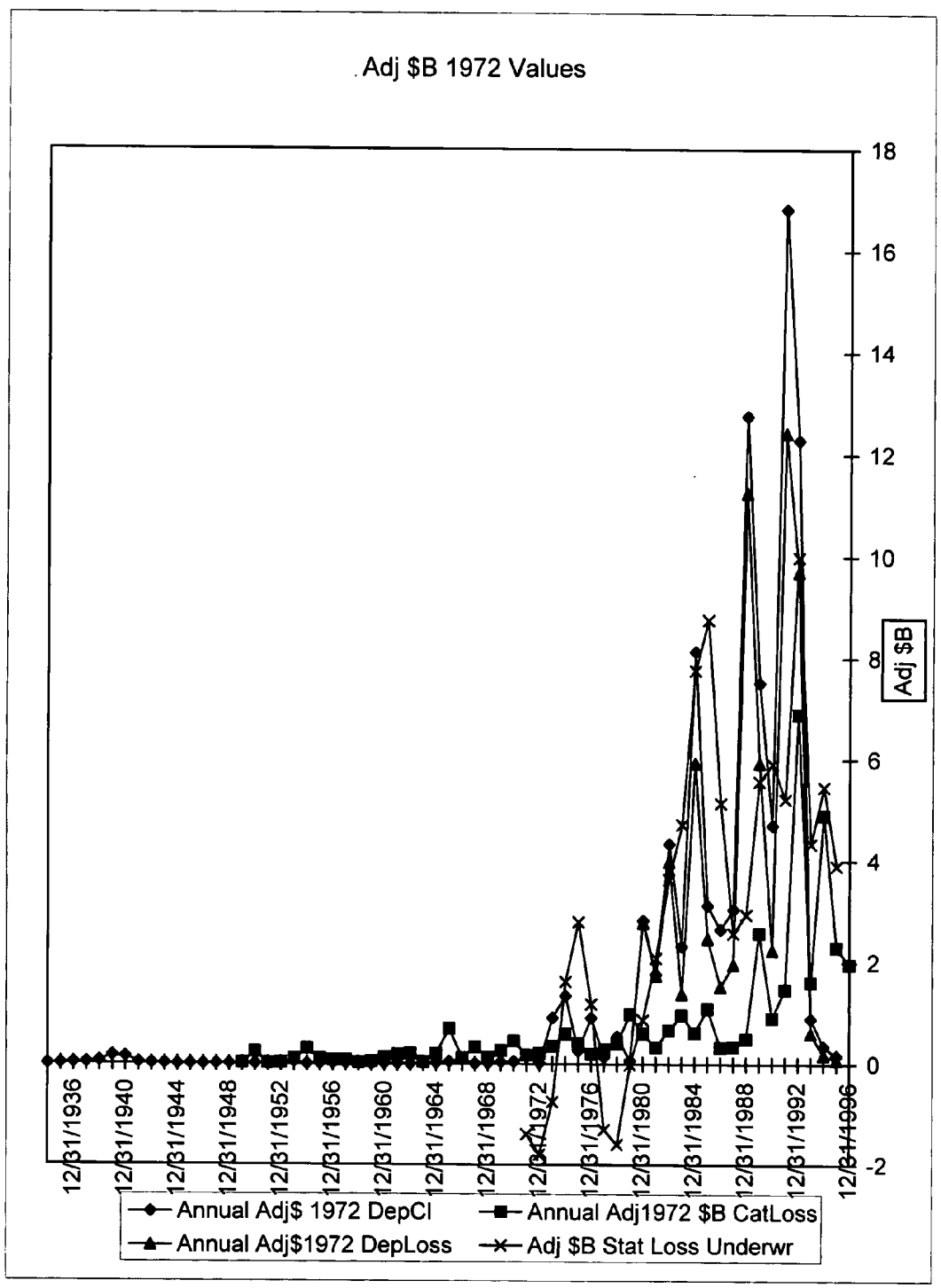

FIG. 49 graphically renders adjusted data of variables of depository default and P&C losses.

Figure 50:
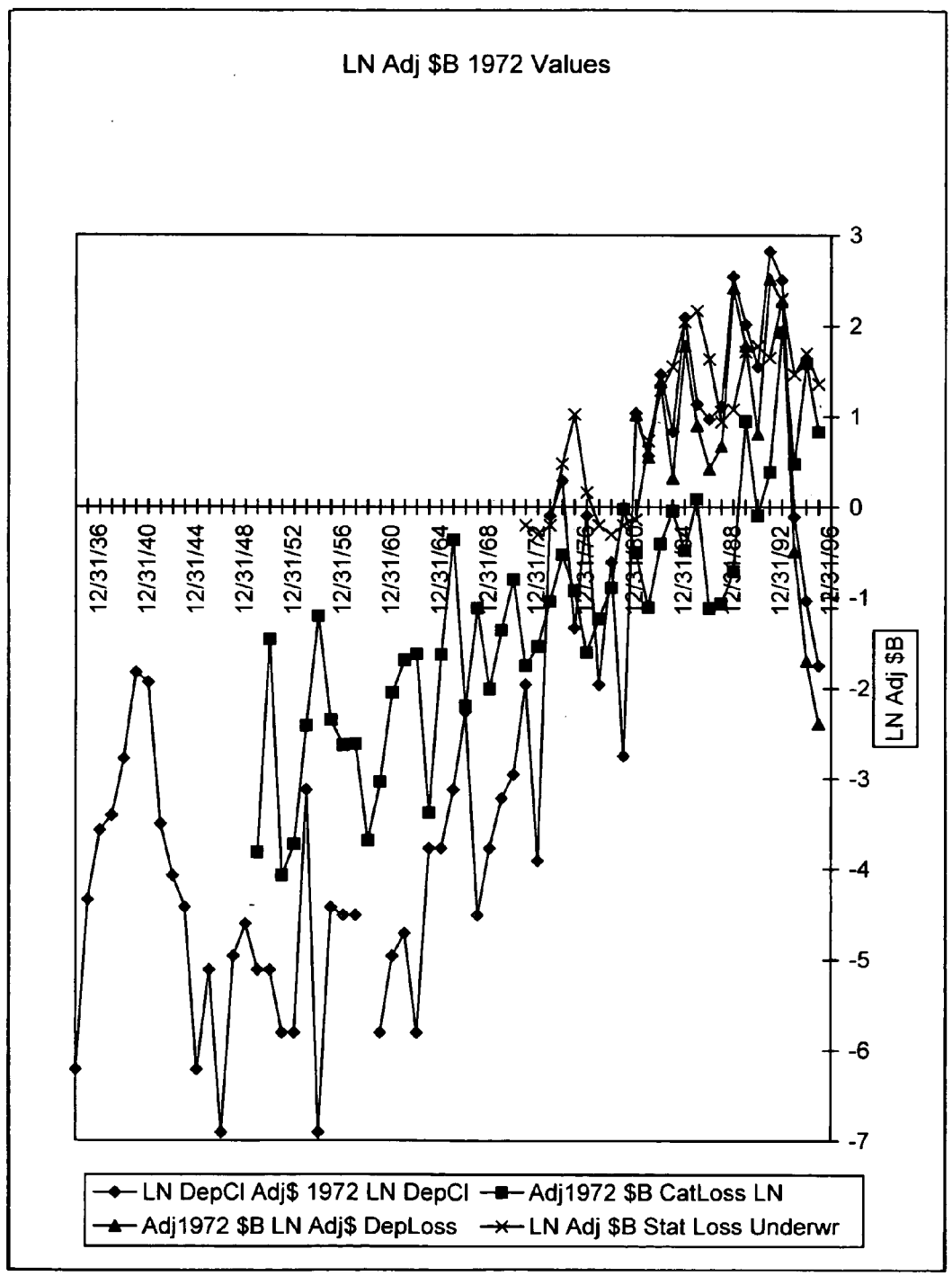

FIG. 50 graphically renders log data of the variables of depository default and P&C losses.

Figure 51:
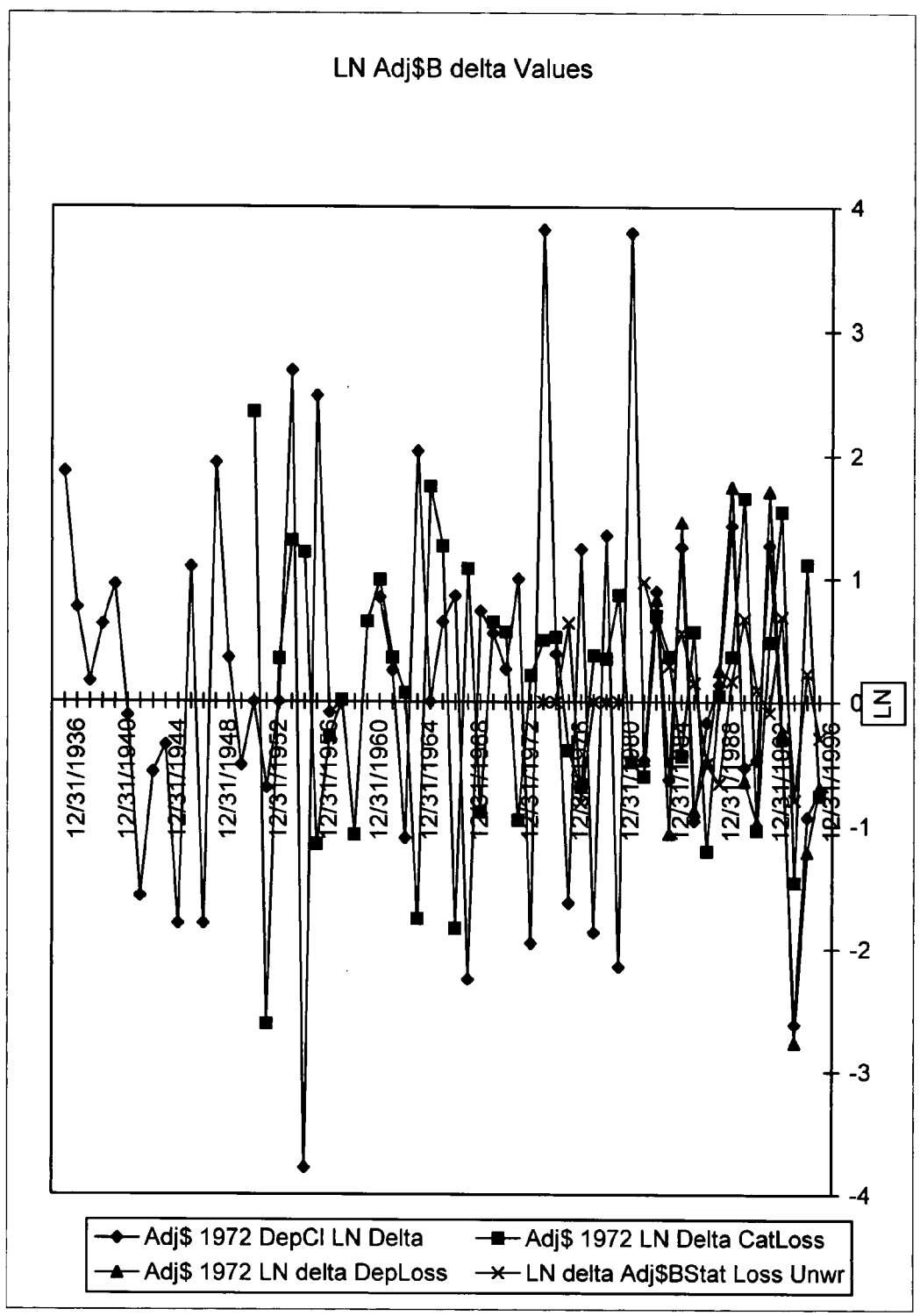

FIG. 51 graphically renders log delta data of variables of depository default and P&C losses.

Figure 52:
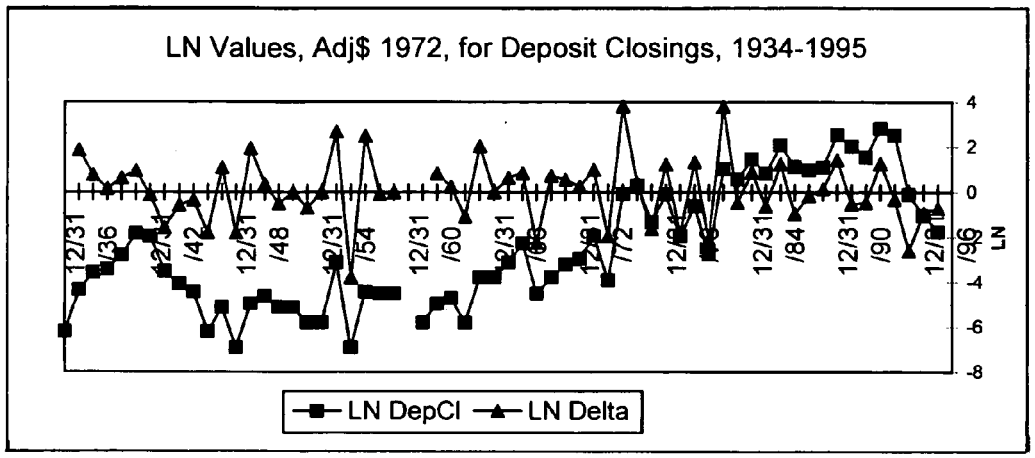
Figure 53:
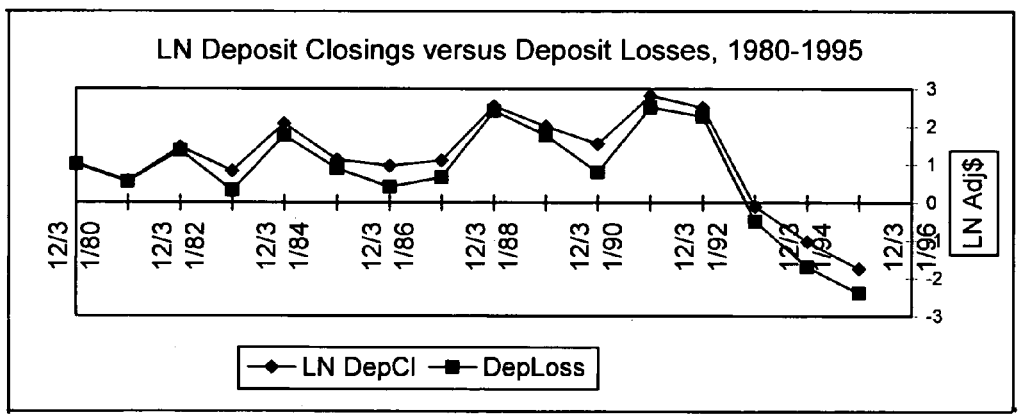
Figure 54:
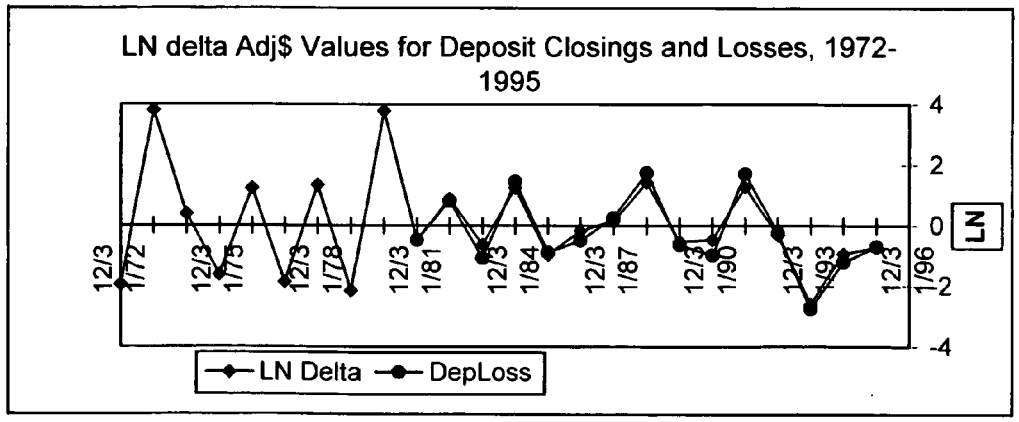
Figure 55:
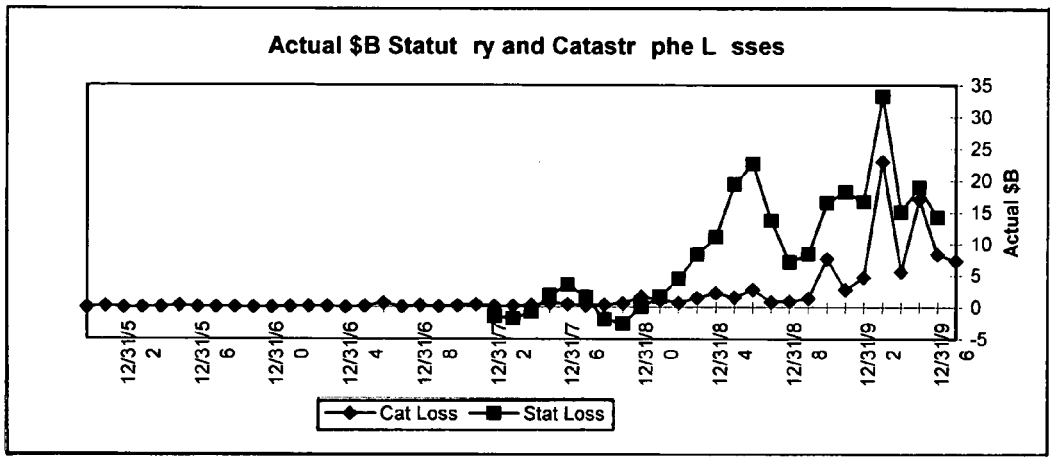
Figure 56:
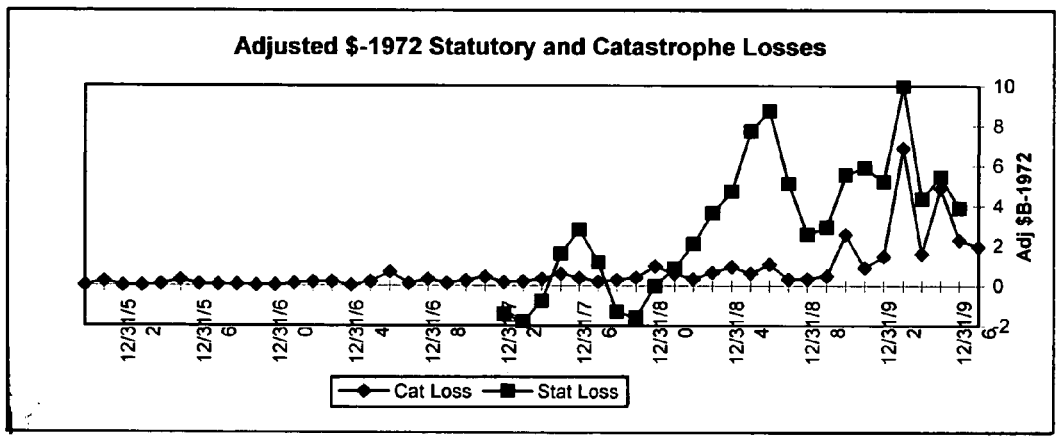
Figure 57:
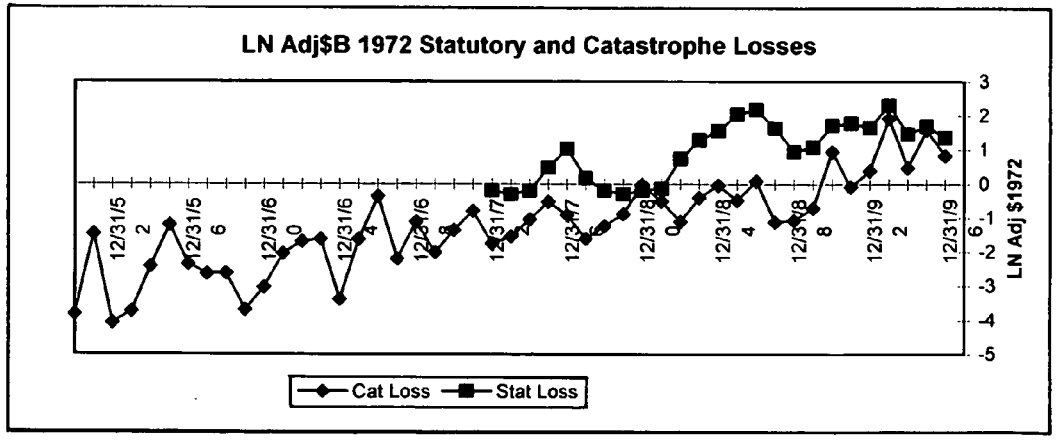
Figure 58:
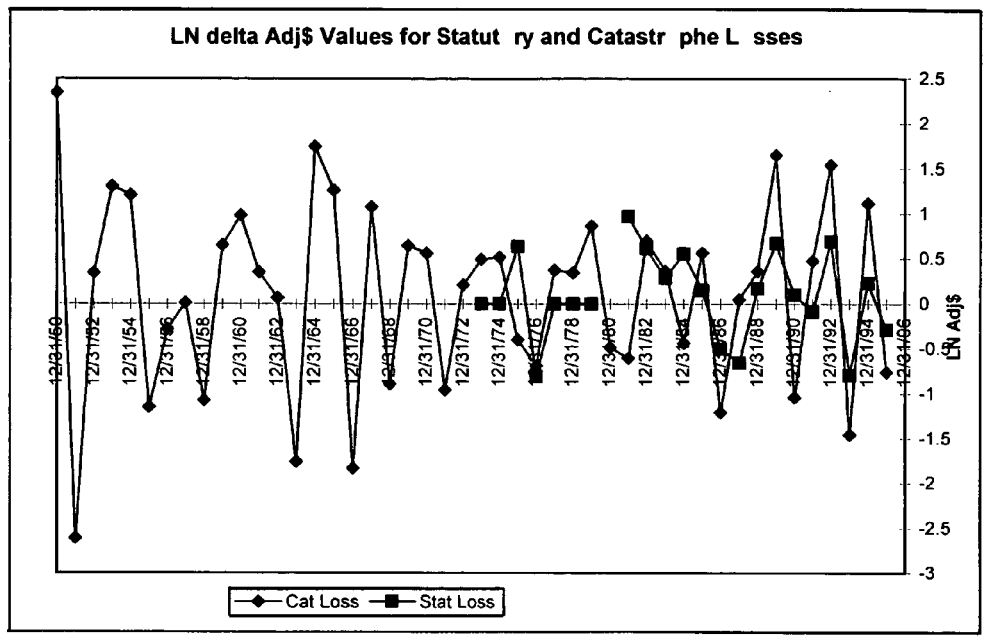

FIGS. 52 through 54 render log and delta log data of deposit closings and of deposit losses.

FIGS. 55 through 58 graphically render processed P&C underwriting and catastrophe data.

Figure 59:
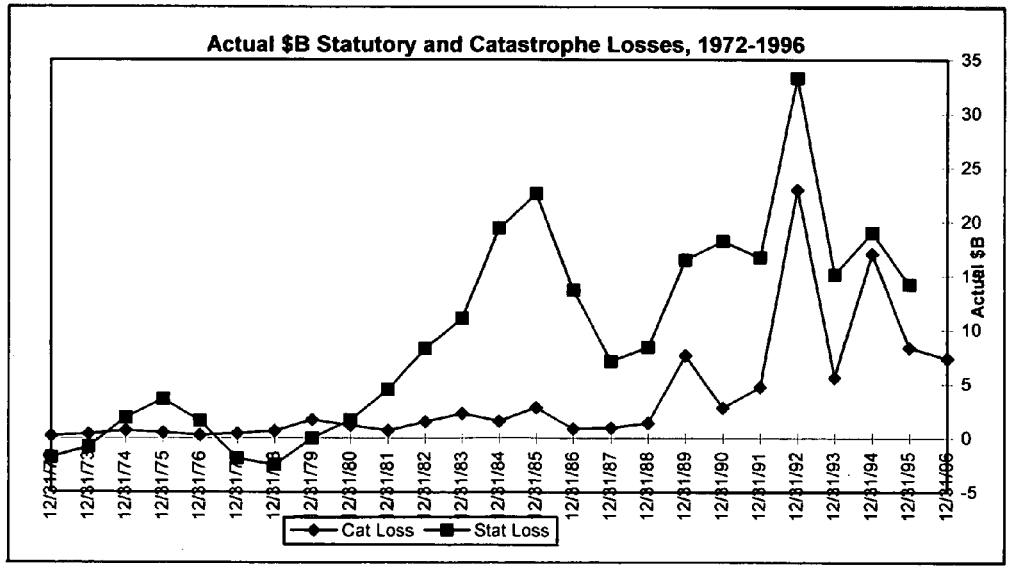

FIG. 59 graphically renders variable statutory underwriting loss respective catastrophe loss.

Figure 60:
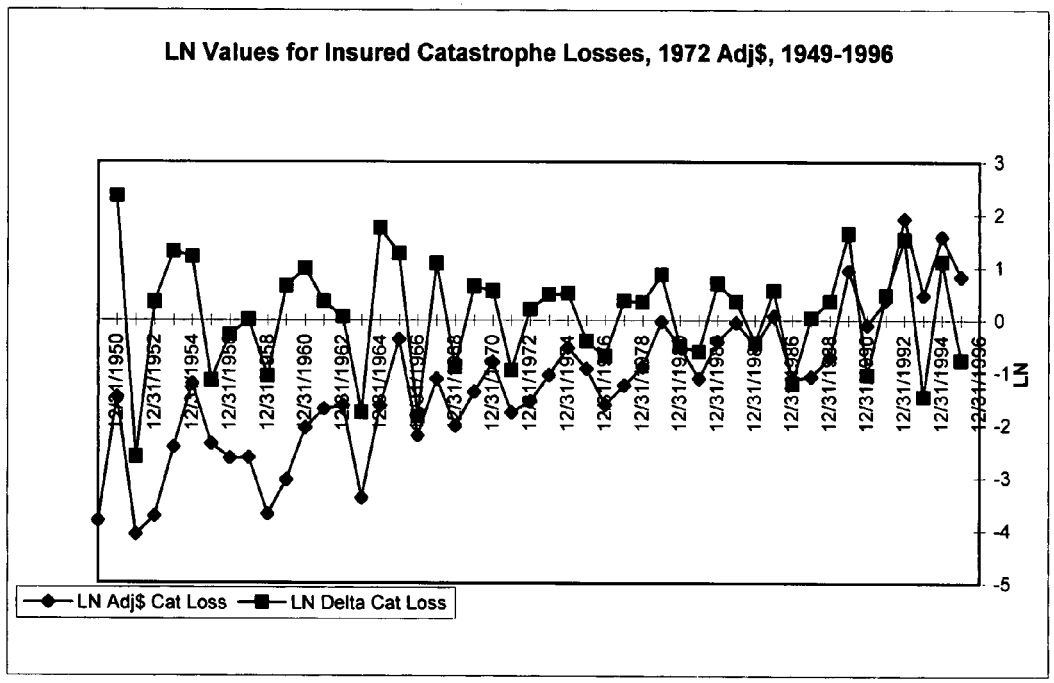

FIG. 60 graphical rendering, log and delta log values for variable insured catastrophe loss.

Figure 61:
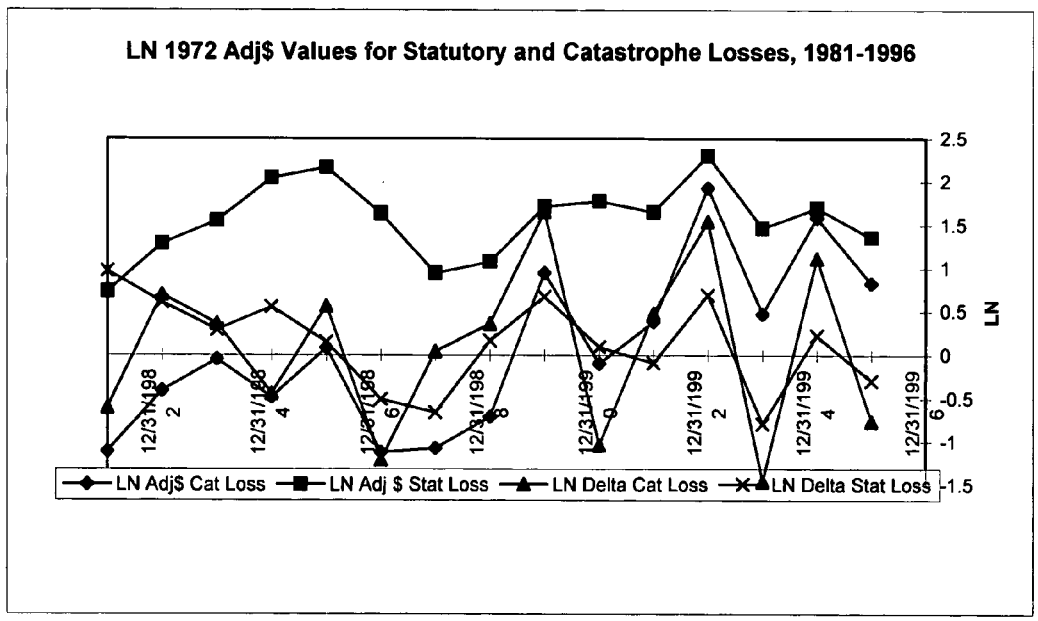

FIG. 61 graphical rendering, log and delta log values of underwriting and catastrophe losses.

FIG. 62, descriptive statistics of deposit closings, nominal, adjusted, log and log delta data.

FIG. 63, descriptive statistics of catastrophe loss, nominal, adjusted, log and log delta data.

FIG. 64, descriptive statistics of deposit closings and catastrophe loss, over a recent period.

FIG. 65, descriptive statistics of deposit closings and catastrophe loss, over life of variable.

Figure 66:
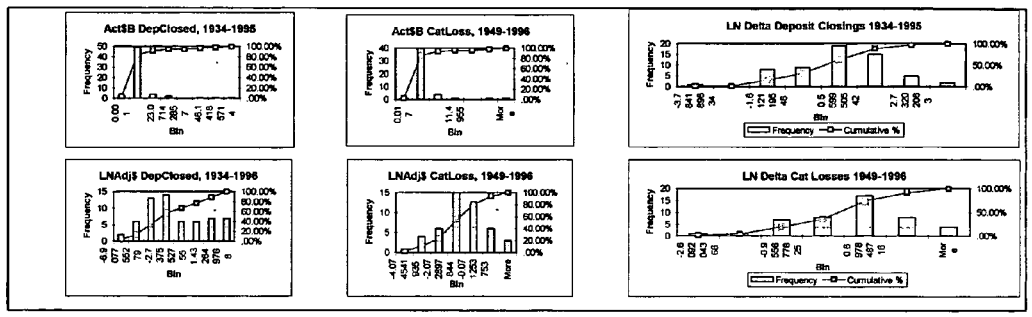
Figure 67:
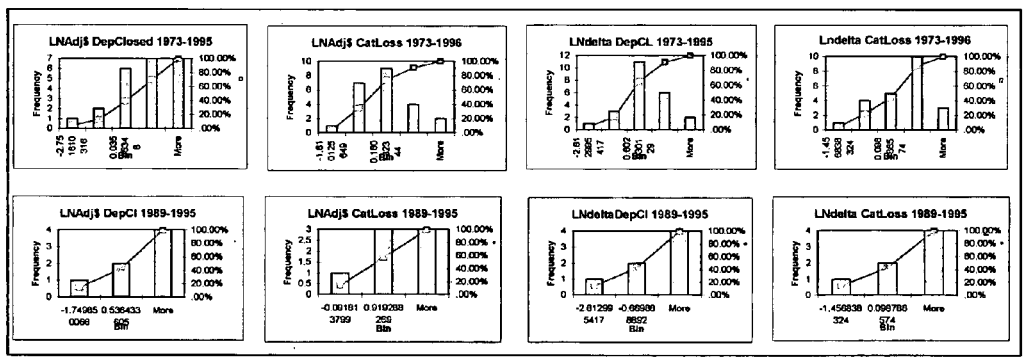
Figure 68:
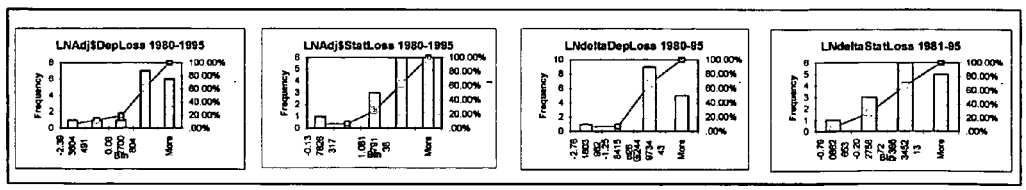

FIGS. 66, 67 and 68, histograms of deposit closings and catastrophe loss, in varied periods.

FIG. 69 growth scalar; growth-adjusted nominal, inflation-adjusted, log and delta log data of deposit closings.

FIG. 70, descriptive statistics of deposit closings' growth-adjusted data.

FIG. 71, growth scalar; growth-adjusted nominal, inflation-adjusted, log and delta log data of catastrophe losses.

FIG. 72, histograms of growth-adjusted deposit closings and cat loss.

FIG. 73, data arrays of U.S. insured deposits and assets closed and total deposits and assets.

FIG. 74, default magnitude data of closed deposits and assets per total deposits and assets.

Figure 75:
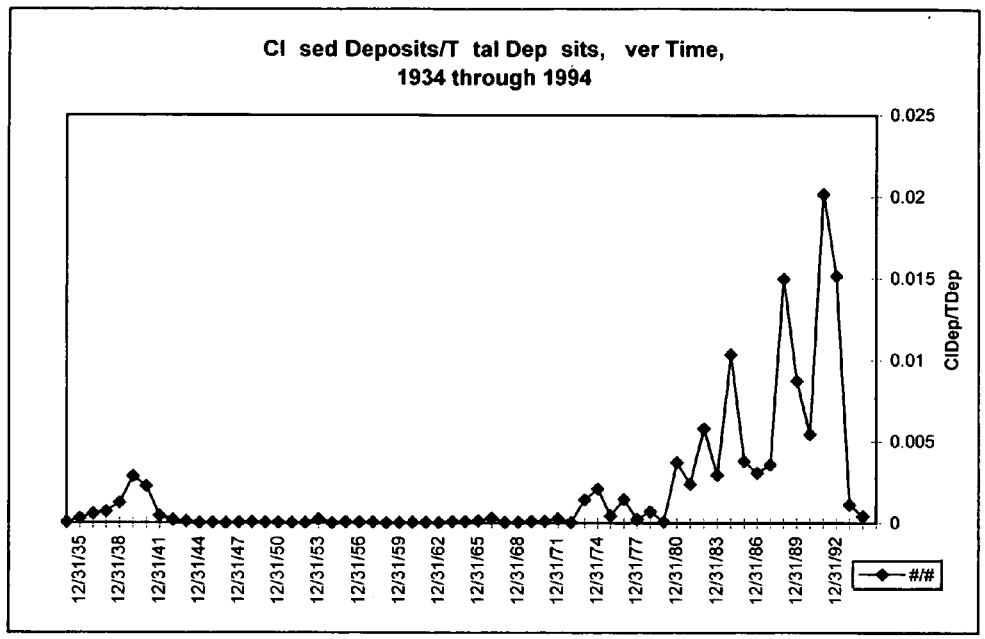

FIG. 75, graphical rendering of default magnitude data of closed deposits to total deposits.

Figure 76:
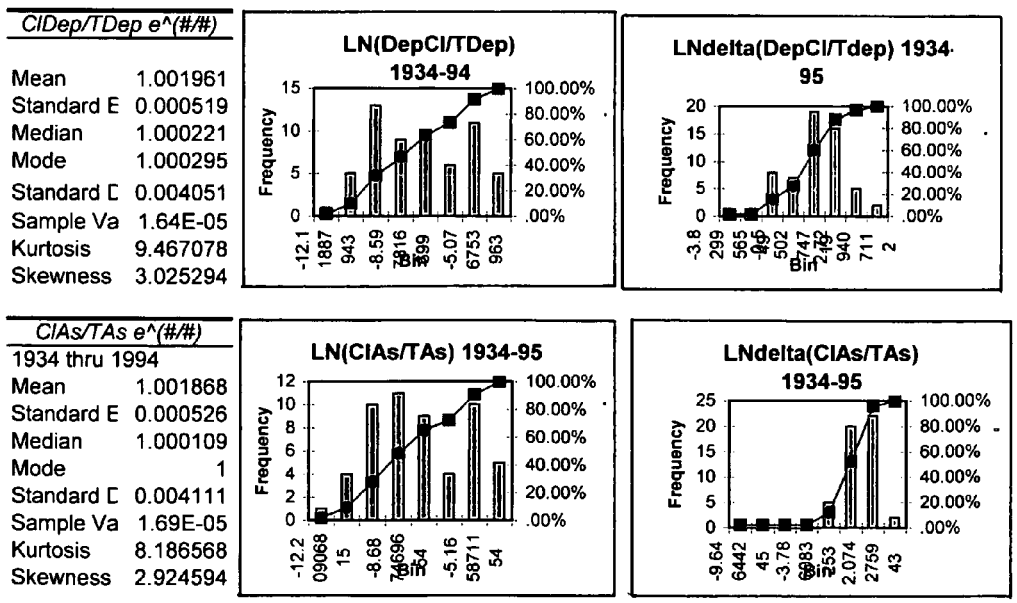

FIG. 76, descriptive statistics and histograms of default data of closed deposits and assets.

FIG. 77, operating data of total deposits (TD), interest-bearing deposits (IBD), total assets (TA), interest-bearing assets (IBA) and interest bearing liabilities (IBL).

FIG. 78, operating ratios of TD/TA, IBD/IBA, IBD/IBL, TD/IBA, TD/IBL and IBA/IBL.

Figure 79:
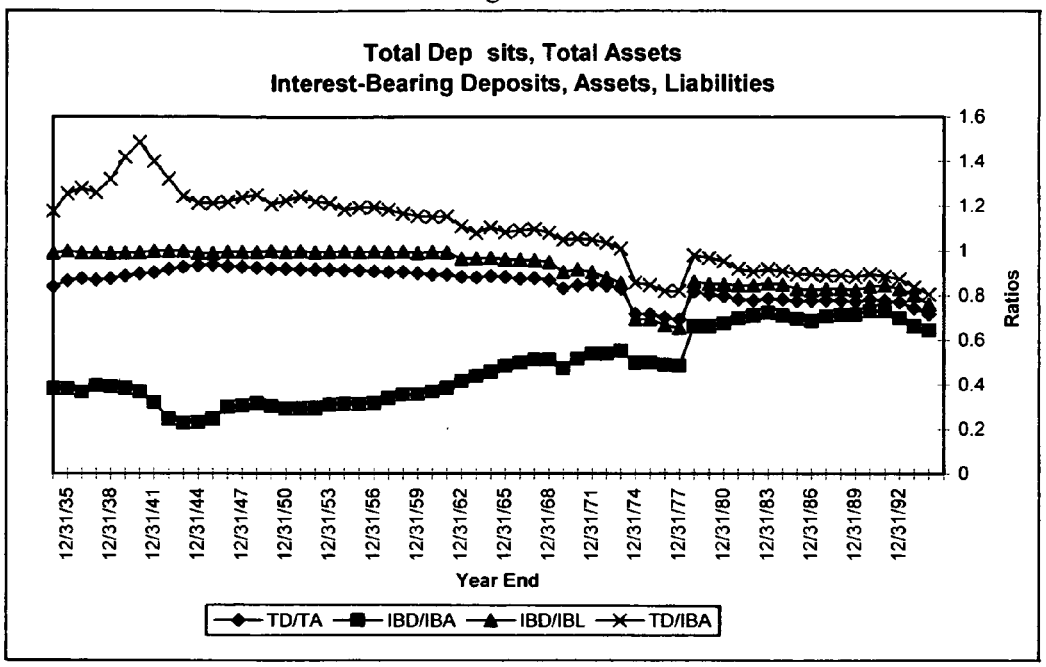

FIG. 79 graphically renders the ratios of TD/TA, IBD/IBA, IBD/IBL and TD/IBA.

Figure 80:
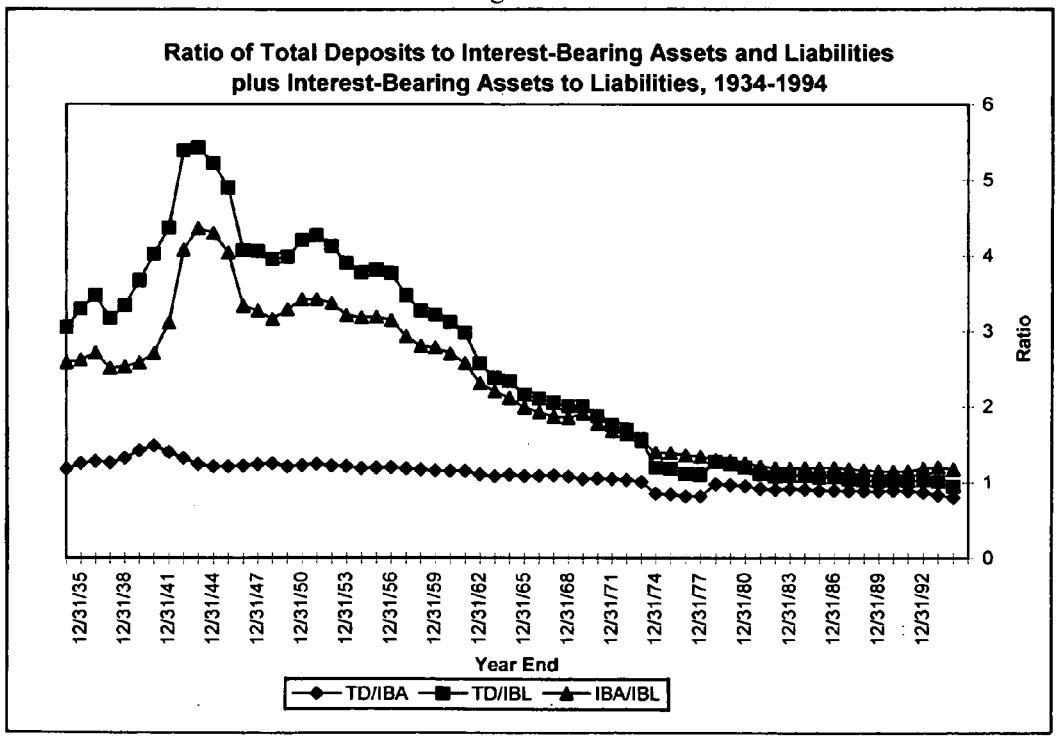

FIG. 80 graphically renders the ratios of TD/IBA, TD/IBL and IBA/IBL.

Figure 81:
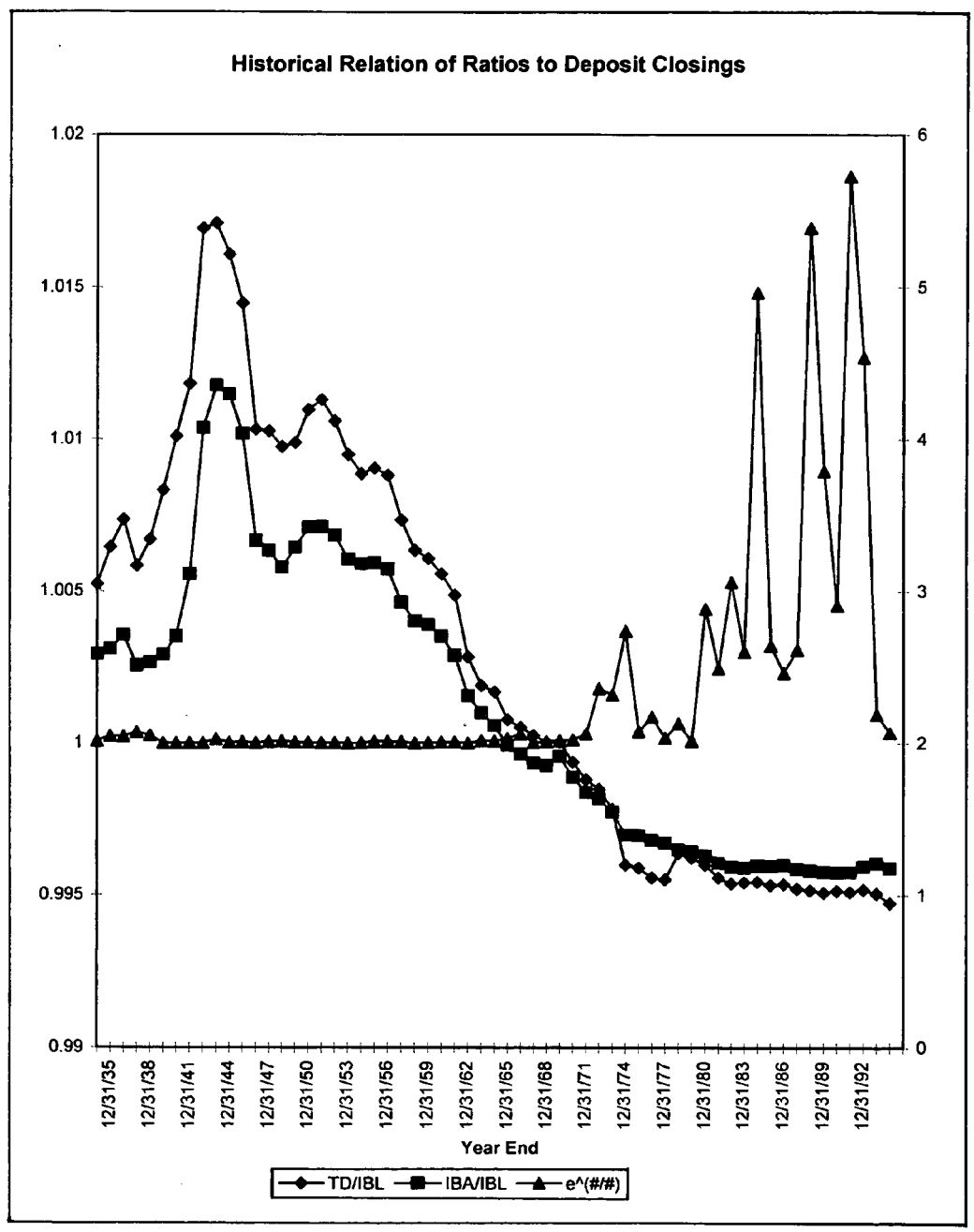

FIG. 81, graphical rendering of the historical relation of the ratios TD/TL, TD/IBL and IBA/IBL to deposit closings as default martingale.

Figure 82:
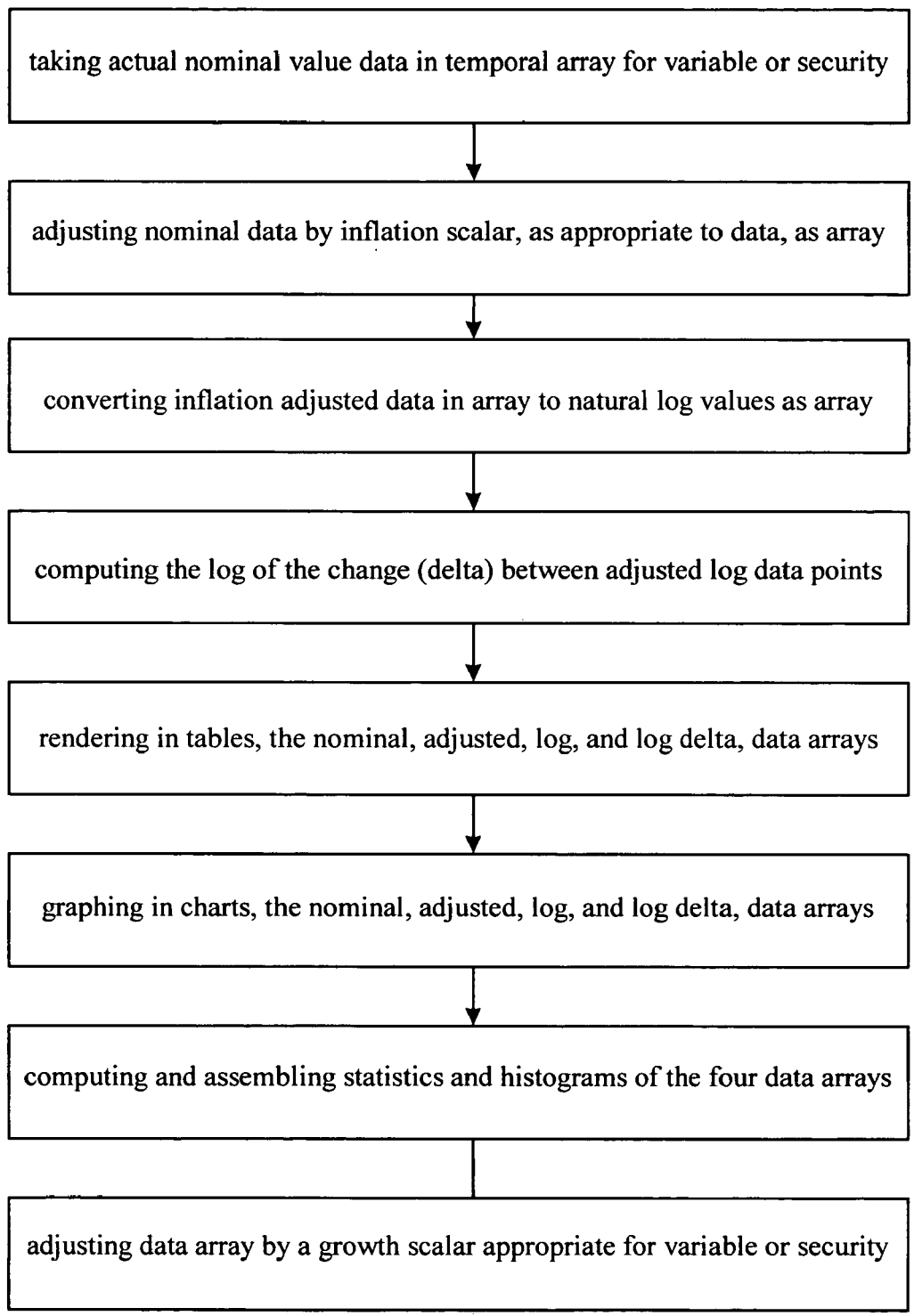

FIG. 82, a method for cleaning and preparing nominally valued data plus further processing.

FIGS. 83 through 89, processing steps of small sample technology and representative results.

FIG. 90, alternate process step of small sample process and representative sequence results.

Figure 91:
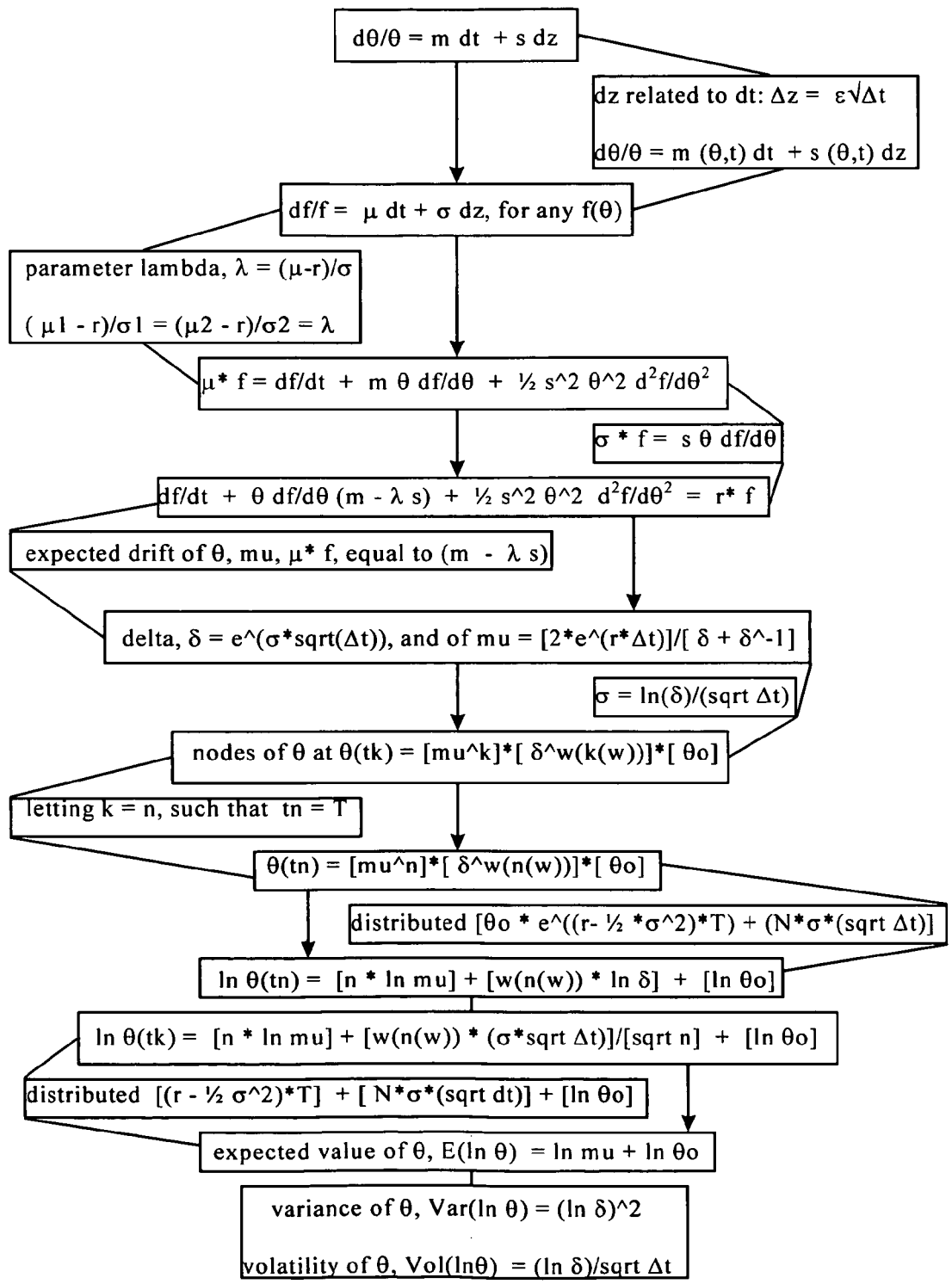

FIG. 91, mathematical programming functions modeling a theta, underlying state, variable.

Figure 92:
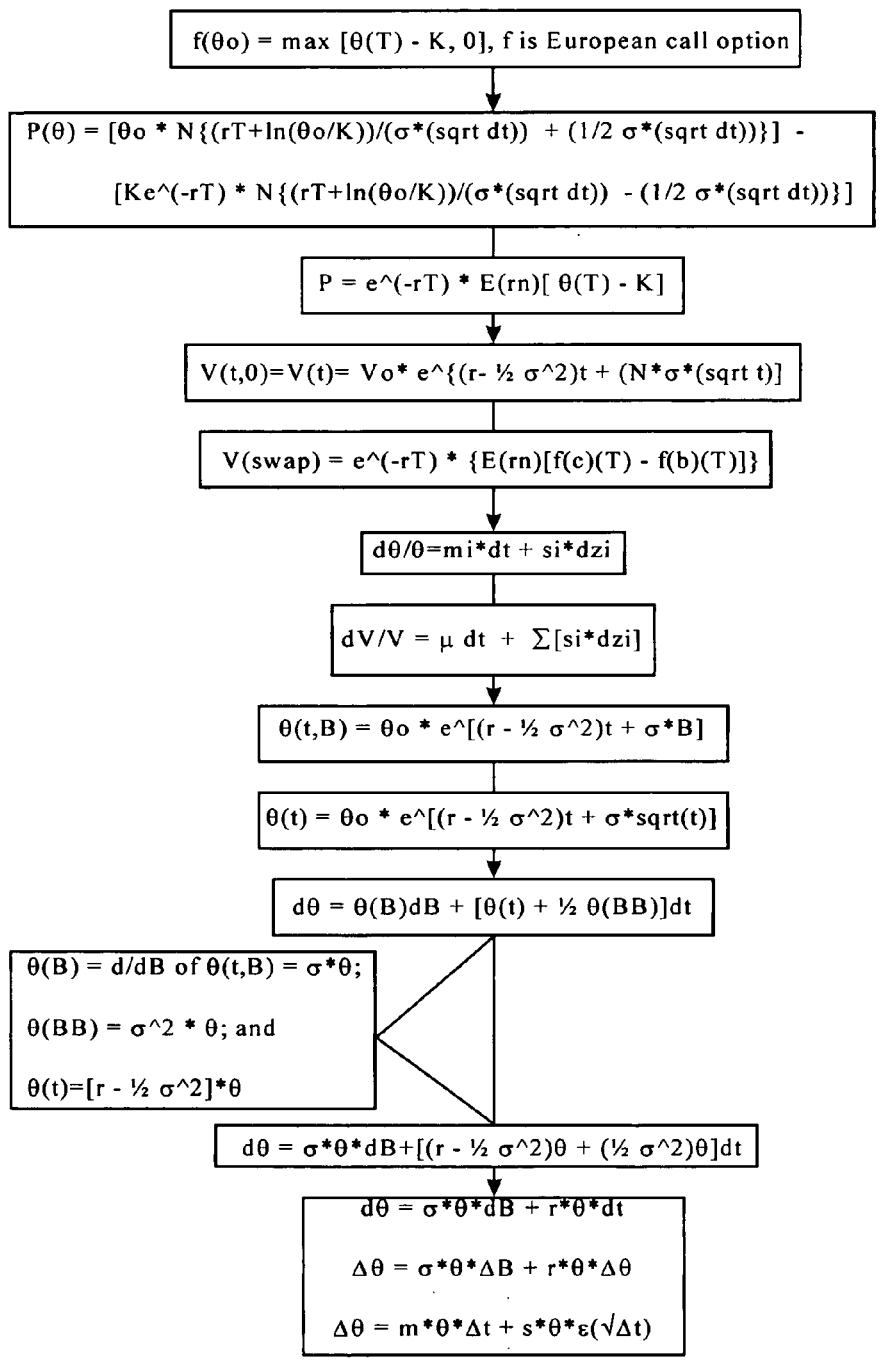

FIG. 92, the mathematical programming functions for modeling a security based on a theta.

Figure 93:
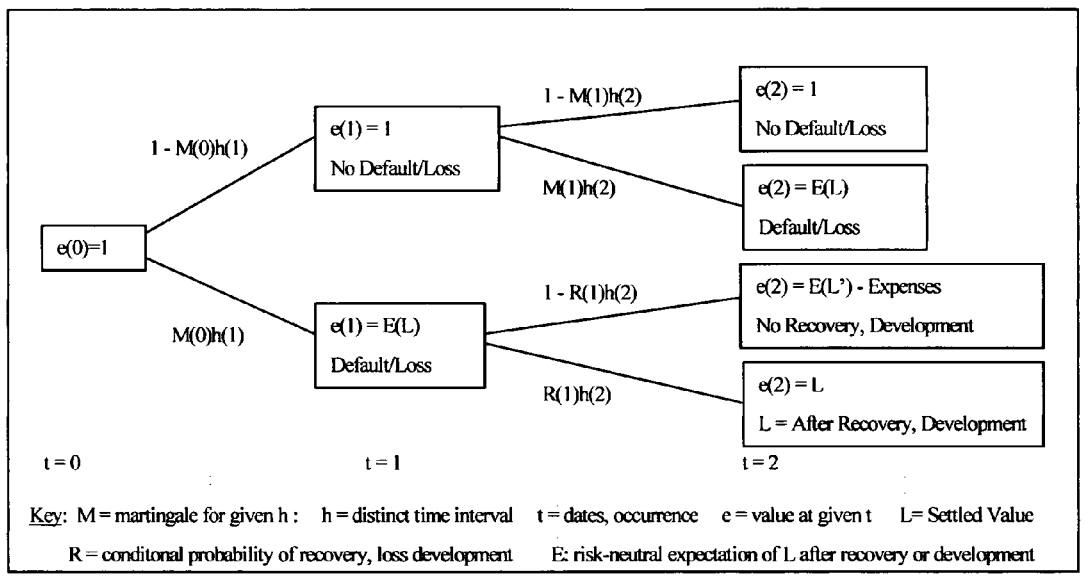

FIG. 93, a martingale valuation lattice, modified for default/loss and recovery/development.

Figure 94:
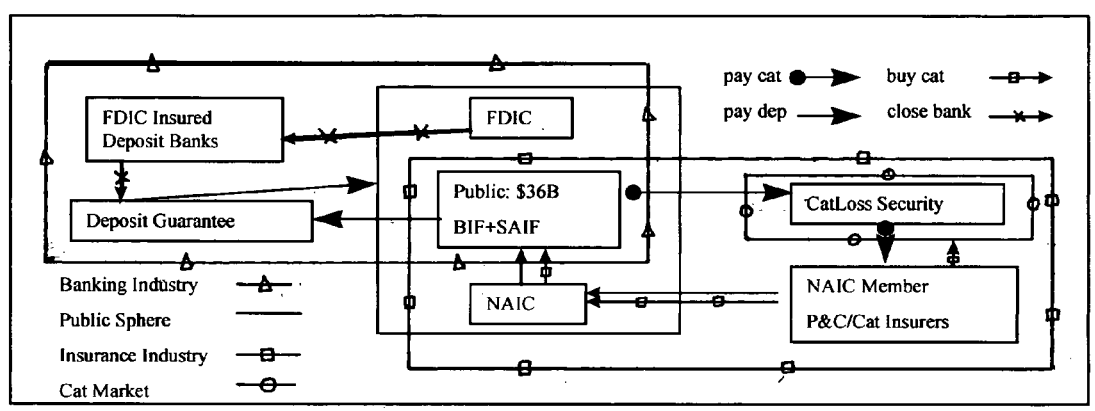

FIG. 94, a swap transaction diagrammed between depository default and catastrophic loss.

FIGS. 95 through 99, improvements to a calculator;

FIG. 100, a financial engineering unit.

DESCRIPTION OF THE PREFERRED EMBODIMENTS

A process for the manufacture of financial data using the endogenous variables of a financial security, and for estimating change in the security's prices given change in its yield with respect to time, which comprises implementing within conformance to the Formula 1.1:

$$P = f\{C, Y, T\} \text{ where C, Y, and T are variables endogenous to the security} \quad 1.1$$

P=Price

C=Cash Receipts, periodic coupon, dividend or premium payments

Y=Yield, a single term relating security's return, relative to P, C, T

T=Time, a terminal or continuous measure of the life of the security.

The Formula 1.1 provides a methodological process engineering the data values of a security's governing yield. Y, governing yield, establishes market rates of return, showing relativity appropriate the market yield structure, a zero spot rate for respective security's time.

The Formula 1.2 or 1.2d are applied to numerically determine governing yield, for a single security issue, and a portfolio of issues, or for a basket of divisible cash receipts:

$$\text{Yield } M = \frac{\Sigma(\text{Maturity} \times \text{Portfolio Coefficient} \times YTM), \text{ for all issues}}{\Sigma(\text{Maturity} \times \text{Portfolio Coefficient}), \text{ for all issues}} \quad 1.2$$

where

Yield M=Governing Yield=Y

Maturity=Time=Maturity in Years

Portfolio Coefficient=Present Value, per issue/Present Value, Σ issues

Present Value=Accrued Interest+(best bid Price×Face Value)

YTM=Yield-To-Maturity, a means providing yield respective time;

for Single Issue: its Portfolio Coefficient is one, its Yield M=its YTM for Portfolio: the formula creates a single Yield M value of all issues.

$$\text{Yield } Md = \frac{\Sigma(\text{Duration} \times \text{Portfolio Coefficient} \times YTM), \text{ for all issues}}{\Sigma(\text{Duration} \times \text{Portfolio Coefficient}), \text{ for all issues}} \quad 1.2d$$

Yield M, the governing yield, is the Yield-To-Maturity of a fixed-income security, such as U.S. Treasuries, but is not equivalent to standard YTM forms on a portfolio basis.

Formula S.1 and S.2 provide formula algorithms for semi-annual-coupon Yield-To-Maturity:

$$\text{S.1 Price} = \frac{C}{2}\sum_{T=1}^{2T}(1+Y/2)^{-T}+(1+Y/2)^{-2T}$$

where C=Coupon Y=YTM T=Maturity (in years).

An alternate expression of the price, yield relation, without summation, Formula S.2:

$$\text{S.2 Price} = \frac{C}{Y}(1-(1+Y/2)^{-2T})+(1+Y/2)^{-2T}$$

where
C=Coupon Y=YTM T=Maturity (in years).

However, the processing algorithms, S.1 and S.2 are not identical and do not provide exactly equivalent data for the same security, each algorithm using identical C, Y, and T data. This genuine difference is evidenced in my data processing with this algorithmic function. These two algorithms, for solving YTM, stand apart, yet comprise a relative value correlation.

Because these two algorithmic measures of the yield-to-maturity differ, so too do their mathematical derivatives, the first derivative, or, duration, ie. Duration, modified annualized:

$$\text{(S.1') (Duration)} \quad \text{S.3 Durmodan} = \frac{\frac{C}{Y^2}\left[1-\frac{1}{(1+Y)^{2T}}\right]+\frac{2T(100-C/Y)}{(1+Y)^{2T+1}}}{2P}$$

where $D = \Delta P/\Delta YTM$
$Y = YTM$
$T = \text{Mat. in Years}$
$C = \text{Coupon}$
$P = \text{Price (par = 100)}$.

(S.2') (Duration, modified annualized, semi-annual C)

$$1.3 \quad K = \frac{-C}{Y^2}(1-(1+Y/2)^{-2T})+\frac{C}{Y}(T+TY/2)^{-2T-1}-(T+TY/2)^{-2T-1}$$

wherein I utilized the chain rule of calculus to derive K, first derivative of S.2
where

| C = Coupon | Y = YTM | T = Maturity in Years | δY = ΔYield M | δP = ΔPrice |
| (decimal entry, portfolio) | (portfolio) | | (with δP/δY = K) | |

$1.3n \quad K$ generalized =

$$\frac{-C}{Y^2}(1-(1+Y/n)^{-nT})+\frac{C}{Y}(T+TY/n)^{-nT-1}-(T+TY/n)^{-nT-1}$$

wherein n=# coupon or dividend payments per annum, wherein 1.3 can be written:

(S.2') (Duration, mod. ann., semi–ann.)

$$1.3w \quad K = \frac{-C}{Y^2}+\frac{C}{Y^2}(1+Y/2)^{-2T}-(1-C/Y)(T+TY/2)^{-2T-1}$$

The Formula 1.3 is in noteworthy contrast to Formula S.3, as the former relies only on C, Y and T to relate a security's change in price respective its change in yield-to-maturity. It is a clean, non-tautological expression of duration, as it does not simultaneously require price, which, in the implementation of S.3, is an exogenous, market-generated, variable. Also, K is of inverse sign to the conventional duration, D, but not its inverse, K accurately reflecting the fact that as the yield of a security rises, its price declines, ceretis paribus. K states duration sensitivity to change in price respective change in governing yield. Hence, K depicts the primary pricing sensitivity of a security, or portfolio thereof, and satisfies the Formula 1.1.

The second derivative, convexity, the price sensitivity indicating change in curvature of the first derivative, that is, how the security's propensity to change in price is transforming:

(S.1") (Convexity)
S.4 Convex =

$$\frac{\frac{2C}{Y^3}\left[1-\frac{1}{(1+Y)^{2T}}\right]+\frac{2C(2T)}{Y^2(1+y)^{2T+2}}+\frac{2T(2T+1)(100-C/Y)}{(1+Y)^{2T+2}}}{4P}$$

(S.2") (Convexity)
$$1.4 \quad V = \frac{2C}{Y^3}-\frac{\frac{2C}{Y^3}}{(1+Y/2)^{2T}}-$$

$$\frac{\frac{CT}{Y^2}}{(1+Y/2)^{2T+1}}-\frac{\frac{C}{Y^2}}{(T+TY/2)^{2T+1}}+\frac{(1+C/Y)(T^2+T/2)}{(T+TY/2)^{2T+2}}$$

wherein I utilized the chain rule of calculus to derive V, V=K' and V=S.2"
wherein V≠ standard Convexity (Convex);
wherein V can be calculated Y=standard YTM, Yield M, or, Yield M—YTM basis.

A method for valuing a security by its endogenous variables, comprising steps of: identifying the data values for the security's endogenous variables, of C, Y, T, per 1.1; establishing Yield M, means for performing process 1.2, or using spot or quote values; utilizing values of C, Yield M, T, calculating the security's price, if it is fixed-income:

by solving price, means for performing either S.1 or S.2, or both separately;

utilizing values of C, Yield M, T, calculating duration and convexity price sensitivity:

by solving duration, means for performing S.3 or 1.3, respective S.1 or S.2;

by solving convexity, means for performing S.4 or 1.4, respective S.1 or S.2.

A method for valuing a financial portfolio, containing more than one divisible issue, by singular portfolio (P) data values of endogenous variables $C^P$, $Y^P$, $T^P$, comprises steps of:

identifying the data values for each issue's endogenous variables of C, Y, T, per 1.1;

generating the portfolio coefficients for each single security issue in a portfolio, by:

Portfolio Coefficient, per each Issue=Present Value$^I$/ Present Value$^P$;  1.5

Present Value$^I$=(AI+(Bid Price×Face Value)), per Issue (I);  1.5a

Present Value$^P$=Σ(AI+(Bid Price×Face Value), for all Issues;  1.5b generating aggregate portfolio (P) data relating a portfolio's aggregate values, by:

Present Value$^P$=Σ(AI+(Bid Price×Face Value), for all Issues;  1.6a

Accrued Interest$^P$=ΣAccrued Interest, AI, for all Issues;  1.6b

Face Value$^P$=ΣFace Value, for all Issues;  1.6c

Implied Price$^P$=(Present Value$^P$−AI$^P$)/ΣFace Value for all Issues;  1.6d generating aggregate portfolio (P) data relating portfolio's endogenous variables:

$C^P$=Cash Flow$^P$=ΣC×Portfolio Coefficient, for all Issues;  1.7a $T^P$=Time$^P$=ΣMaturity×Portfolio Coefficient, for all Issues;  1.7b $Y^P$=Yield$^P$=ΣYield×Portfolio Coefficient, for all Issues;  1.7c if for a portfolio of U.S. Treasury issues, the formulations of $C^P$, $Y^P$, $T^P$ are:

$C^P$=Coupon$^P$=ΣCoupon×Portfolio Coefficient, for all Issues;  1.8a $T^P$=Maturity$^P$=ΣMaturity×Portfolio Coefficient, for all Issues;  1.8b $Y^P$=Yield$^P$=ΣYield×Portfolio Coefficient, for all Issues  1.8c where Yield by Yield M, by zero spot for T, or by YTM of S.1 or S.2;

processing C, Y, T, per issue, to generating portfolio's duration and convexity:

Duration$^P$=ΣDuration×Portfolio Coefficient, for all Issues;  1.9a

Convexity$^P$=ΣConvexity×Portfolio Coefficient, for all Issues.  1.9b or utilizing portfolio values, $C^P$, $Y^P$, $T^P$, calculating Duration, means for performing S.1' or 1.3, respective S.1 or S.2;

Convexity, means for performing S.1" or 1.4, respective S.1 or S.2;

establishing Yield M, means for performing process 1.2, or using spot or quote Y.

The FIG. 1 presents Formula 1.1. The FIG. 2 presents Formulae 1.2. The FIG. 3 presents Formula 1.2d. The FIG. 4 presents Formula 1.3. The FIG. 5 presents Formula 1.4. The FIG. 6 presents Formulae 1.5, 1.5a and 1.5b. The FIG. 7 presents Formulae 1.6a, 1.6b and 1.6c. The FIG. 8 presents Formulae 1.7a, 1.7b and 1.7c. The FIG. 9 presents Formulae 1.8a, 1.8b and 1.8c. The FIG. 10 presents Formulae 1.9a and 1.9b. The FIG. 11 presents a process manufacturing financial data. The FIG. 12, steps of method for valuing a portfolio.

A test portfolio of U.S. Treasuries is used to demonstrate operation of algorithmic formulae in processes and within methods, and to test the efficacy of processes and methods. The example portfolio is comprised of seven U.S. Treasury issues, maturing in five-year span, comprising a ladder portfolio, with each issue spread in maturity along the yield curve's time. The issues are U.S. Treasury Notes, paying semi-annual coupons until maturity. This class of financial security is simple in composition and variables, transparent in liquidity, and has a price-efficient market yield structure; the market yield of a term is its zero spot rate, this discovered by the zero spot yield curve, composed of U.S. Treasury zero-coupon STRIPS. I designed, conducted and implemented this test implementation in Spring and Summer 1996, and test three dates, of Mar. 22, 1996, Mar. 3, 19996 and Apr. 25, 1996, were utilized to set and determine values. The Issue 2) was held as purchased on Mar. 22, 1996, hence its absence of accrued interest that date. Not knowing the issuance day of month, I held each Note to mature on the $15^{th}$ of the month. A coupon payment from Issue 5), actually maturing Mar. 31, 1999, was held as paid out on Mar. 15, 1996.

The FIG. 13 identifies data for each of the Treasury issues: by its calendar date of maturity; and by its coupon interest, these fixed through the issue's life. Key values for each issue at each of the three test dates are presented: years to maturity; ask yield; bid price; accrued interest; and full value (present value), wherein the yield and price data were culled from published financial newspaper data, and wherein the other data were calculated per date, specifically *The Wall Street Journal and Investor's Daily*. The ask yield data, contained in the newspapers, operate, and are generated, by Yield-To-Maturity Formula S.1 on ask prices.

Utilizing the Formulae and method of portfolio aggregation, the FIG. 14 presents the aggregate value calculations for a portfolio as a whole, whereas the FIG. 15 presents the aggregate values for this portfolio, being manufactured data for the portfolio at each test date.

Having established the maturity in years for the portfolio at each test date, isomorphic to an implied maturity at future date, calculated from test date, counting out maturity in years. For that implied future date, the zero spot market rate was approximated from U.S. STRIPS. These data are presented in FIG. 16, as well as the portfolio's Yield M and YTM values. For each of the three test dates, the portfolio's Yield M better approximated the Zero Spot, than did the portfolio YTM. The portfolio's Yield D appeared to best approximate Zero Spot.

To conduct further testing of the processing algorithms, and to implement the methods on the example test portfolio, the estimation of a change in price for a given change in yield, the duration/convexity factorization, where the actual change in yield is given between dates. The standard computational process for estimating actual change in price for change in yield, comprises the summation of A) and B), this equivalent to C), due to duration and convexity:

A) ΔPrice, due to Duration=(−Duration mod. ann., e.g. S.3)×ΔYTM

B) ΔPrice, due to Convexity=½×Convexity, e.g. S.4)×(ΔYTM)²:

C) ΔPrice, due to Duration and Convexity=A)+B):     S.5 where values for standard Duration and Convexity at beginning of time-frame.

The FIG. 17 presents the actual change in yield between the test dates, as well as the portfolio duration and convexity, and utilizing the duration, convexity factorization, estimating change in price, Δ Price, and after calculating the actual Δ Price of the portfolio, the percentage accuracy of the factorization, as based upon the various formulations of yield. The Yield M data evidence a robust estimation of the actual change in portfolio implied price, whereas the YTM data did not closely estimate the actual change in price for the time-frames.

The FIG. 18 presents the calculation of duration variables, standard (Formula S.3) and K (Formula 1.3) for the aggregate portfolio, utilizing the coupon, maturity and YTM (and Price, for implementing standard) of the aggregate portfolio, showing their data's difference.

To implementing a duration, convexity factorization, wherein utilizing K for duration, formulation recognizing K as of inverse sign to Durmodan, thus, Δ Price, due to Duration (K):

A) ΔPrice, due to Duration $(K) = K \times \Delta Y$.     1.10k

The FIG. 19 processes 1.10k, the manufactured data for the portfolio, of its K value, Duration, and ΔY, this latter term herein represented in the drawing by theoretical value δY. The accuracy of the estimate for Δ Price, using K for the Duration value, and δY, K=δP/δY, as expected by the relation δP≅Δ Price, returns highly accurate estimates, with Error<0.5%.

To implementing a duration, convexity factorization, utilizing V for convexity,

B) ΔPrice, due to Convexity $(V) = \frac{1}{2} \times V \times (\Delta Y)^2$.     1.10v The FIG. 20 processes 1.10v, V values for portfolio, on Yield or spread basis for Y.

The FIG. 21 implements a price/yield factorization containing δY, K and V, comprising FIG. 22: the "duration/convexity" factorization, the Formula 1.10, incorporating 1.10 k and 1.10v, being means for estimating a change in price respective yield through time:

Estimated $\Delta\text{Price} = (K \times \delta Y) + (\frac{1}{2} \times V \times (\delta Y)^2)$     1.10 where δY=ΔY=Δ Yield M; approximated Δ zero spot, or Δ Price/K

K=Duration, e.g. Formula 1.3 and V=Convexity, e.g. Formula 1.4.

The nature of price, of price as defined by market price setting, is, at core, discrete, being that an outcry system of bids and asks has transactions marking prices and offer basis, with a particular price or quote existing at a particular time. The market's price is marked by discrete transactions at discrete moments. While open markets have standing pricing quotes, they are like held notes in musical play, momentary, having a duration for a snippet of time. Hence, the exogenous variable of Market Price is temporally represented as in discrete form.

The nature of yield, of yield with respect to time, hence, to the existence of continuity, is best understood as continuous, an on-going time value of money, without gap or stoppage. As an endogenous variable, yield provides the inner valued material of a security's existence, being calculable at any discrete moment bearing pricing data, and is reflected in pricing data. The nature of price discovery is by transaction point in time, standing quote snippet of time, and by the continuously unfolding, on-going fabric of developing information, events, rumors.

Because yield is calculable at any discrete time or date for which pricing data exists, it, like time, has a dual nature, that is, it can be reduced and identified at or in discrete time. The endogenous variable, K, an algorithm for calculating a security's duration, duration being a constant of the security throughout its life which transforms with respect to change in yield, used to establish a security's hedge ratio, value of basis point, or point of immunization (−K). Duration is an instantaneous constant, but it can also estimate change between points in time. The algorithm, K, expresses a negative number, as a decrease in duration causes price to fall.

Respective the magnitude of change reflected in pricing, yield or duration, the breadth and deviation of convexity, conveying the impetus and force of the change to change in yield, is much greater, though its discrete contribution to changes in yield and price, is much less.

The generalized form of Formula 1.10, of its mathematical programming function, in FIG. 23, function estimating the change in a security's price, with respect to yield and time:

$\Delta\text{Price} = (-|\text{Duration}| \times \delta Y) + (\frac{1}{2} \times \text{Convexity} \times (\delta Y)^2)$     S.5 where δY≅ΔY=ΔYield M; instantaneous, or across points in time

Duration=Formula 1.3 or S.3 and Convexity=Formula 1.4 or S.4.

A method of estimating change in the price of a financial security, the FIG. 24, such price function of said financial security determined by identified endogenous variables, satisfying a mathematical pricing function, Formula 1.1, steps of method conforming thereto. The values of endogenous variables, C, Y, and T, wherein if a fixed-income security with semi-annual interest coupons, these variables conform to its coupon rate, yield-to-maturity and years-to-maturity, respectively, and endogenous variable, price, are identified for security, with such data values determined at a given point in time, or by expectation or simulation.

For a portfolio of securities, the portfolio is comprised of each security, each with its own data values for C, Y, T; aggregate data values of the portfolio, Formulae 1.5 through 1.9.

Processing data from C, Y and T, generating data value of governing yield variable, Yield M, the Formula 1.2, or variable of Yield Md, the Formula 1.2d, for security or portfolio. Providing said data of said endogenous variables to database, storage, or further processing.

Determining the security or portfolio data values for duration and convexity, include the group of paired mathematical functions, Formulae S.3 and S.4, or Formulae 1.3 and 1.4.

Determining change in price for change in Yield M, Formula 1.10 or Formula 1.11.

Means for processing and generating data by Formulae S.2, S.3, S.4, the FIG. 25:

Relation of Price to Yield, with respect to time:

semi-annual $P = PR = ((C/Y) \ast (1-(1+(Y/2))^{\wedge}(-2\ast T)) + (1+(Y/2))^{\wedge}(-2\ast T)$     S.2c where C, Y and P are decimal values, T=Maturity in years generalized $P = PRBOND = ((C/Y) \ast (1-(1+(Y/N))^{\wedge}(-N\ast T)) + (1+(Y/N))^{\wedge}(-N\ast T)$     S.2c where N=n=cash receipts per annum, e.g. semi-annual=2

Duration, First Derivative Sensitivity of Price to Yield, incl. variable Price Data:

semi-annual Durmodan=$DURMOD=(((((C/2)/((Y/2)^2))*(1-(1/((1+(Y/2))^(2*T)))))+((2*T)*(100-((C/2)/(Y/2))))/((1+(Y/2))^((2*T)+1))))/(2*P)$   S.3c where P=Price (of 100)

generalized Durmodan=$DURMD=(((((C/N)/((Y/N)^2))*(1-(1/((1+(Y/N))^(N*T))))+(((N*T)*(100-((C/N)/(Y/N))))/((1+(Y/N))^((N*T)+1))))/(2*P)$   S.3cn where N=n=# C periods per annum, e.g. semi-annual=2; T=Maturity in years Convexity, Second Derivative Sensitivity of Price to Yield, incl. variable Price Data:

semi-annual Convex=$CON=(((C/((Y/2)^3))*(1-(1/((1+(Y/2))^(2*T)))))-((C*(2*T))/(((Y/2)^2)*((1+(Y/2))^((2*T)+1))))+(((2*T)*((2*T)+1)*(100-(C/Y)))/((1+(Y/2))^((2*T)+2))))/(4*P)$   S.4c generalized Convex=$CONDP=(((C/((Y/N)^3))*(1-(1/((1+(Y/N))^(N*T)))))-((C*(N*T))/(((Y/N)^2)*((1+(Y/N))^((N*T)+1))))+(((N*T)*((N*T)+1)*(100-(C/Y)))/((1+(Y/N))^((N*T)+2))))/(4*P)$.   S.4cn Duration (S.3), Convexity (S.4) Factorization, Change of Price to change of Yield:

generalized Delta$P=DP=-(Durmodan)*(CHY)+(0.5*Convexity*(CHY^2))$   S.5c where CHY=$\delta Y=\Delta Y=(Y_1-Y_0)$, $Y_0$=Y at start, $Y_1$=Y at second point and where DeltaP=DP=-abs(DurationS.3cn)*(CHY)+(0.5*(ConvexityS.4cn)*(CHY^2)).

Means for processing and generating data by Formulae 1.2, 1.3, 1.4, 1.10, FIG. 26:

Yield $M=YM=$(sum{(Maturity*Portfolio Coefficient*$YTM)_1,(M*PC*YTM)_2,\ldots$})/(sum{(Maturity*Portfolio Coefficient)$_1,(M*PC)_2,\ldots$})   1.2

Yield $Md=YMD=$(sum{(Duration*$PC*YTM)_1,(D*PC*YTM)_2,\ldots$})/(sum{(Duration*Portfolio Coefficient)$_1,(D*PC)_2,\ldots$}).   1.2d Duration, (1.3), First Derivative, Price Sensitivity to Yield, endogenous C, Y, T, only:

semi-annual $K=DPDY=((-C/(Y^2))*(1-((1+(0.5*Y))^(-2*T))))+((C/Y)*((T+(0.5*Y*T))^((-2*T)-1)))-((T+(0.5*Y*T))^((-2*T)-1))$   1.3cw where C and Y are decimal values, T=Maturity in years generalized $K=BONK=((-C/(Y^2))*(1-(1+(Y/N))^(-N*T))))+(((C/Y)-1)*T*((1+(Y/N))^((-N*T)-1)))$   1.3cn where C and Y are decimal values; N=n=#C periods per annum; T=Maturity in years Convexity, (1.4), Second Derivative Sensitivity of Price to Yield, endogenous Data only:

generalized $V=BONV=(((2*C)/(Y^3))*(1-(1+(Y/N))^(-N*T)))-((C/Y^2)*(2*T)*((1+(Y/N))^((-N*T)-1)))-((C/Y)-1)*(((N*T)+1)*(T/N))*((1+(Y/N))^((-N*T)-2)))$   1.4cn where C and Y are decimal values; N=n=#C periods per annum; T=Maturity in years spread-based, semi-annual $V=VEXA=(((2*C)/(Y^3))-(((2*C)/(Y^3))*((1+(Y/2))^(-2*T)))-((C*T)/(Y^2))*((1+(Y/2))^((-2*T)-1))-((C/(Y^2))*(T+(T*(Y/2)))^((-2*T)-1)))+((1+(C/Y))*((T^2)+(T/2))*((T+(T*(Y/2)))^((-2*T)-2))))/10000$ where e.g. Y=spread=YieldM—YTM, expressed in decimal, i.e. if Y=0.14%=0.14 where e.g. Y=Yield M, expressed in decimal, i.e. if Y=Yield M=6.06%=0.0606 spread-based, generalized $V=VEX=(((2*C)/(Y^3))-(((2*C)/(Y^3))*((1+(Y/N))^(-N*T)))-((C*T)/(Y^2))*((1+(Y/N))^((-N*T)-1))-((C/(Y^2))*(T+(T*(Y/N)))^((-N*T)-1)))+((1+(C/Y))*((T^2)+(T/N))*((T+(T*(Y/N)))^((-N*T)-2))))/10000$   1.4cvn where e.g. Y=Yield M, expressed in decimal, i.e. if Y=Yield M=6.06%=0.0606.

Duration (1.3), Convexity (1.4) Factorization, Change of Price to change of Yield:

generalized $\Delta P=$DELTA$P=K*(CHY)+(0.5*V*(CHY^2))$   1.10c and where $\Delta P=$DELTAP=-abs(Duration1.3n)*(CHY)+(0.5*(Convexity1.4cvn)*(CHY^2)).

Universal Duration, Convexity Factorization, change of Price for change of Yield:

$\Delta P=DP=-abs$(Duration)*$(CHY)+(0.5*$(Convexity)*$(CHY^2))$.   1.11

A Partial Differential Process and Algorithms for Change ($\Delta$ or $\delta$) in Price (P) with respect to Yield and Time, in Discrete Form, where $\Delta P$ occurs over Points in Time, FIG. 27:

$\Delta P=A+B+C+D$   Formula 1.111:

where, $\Delta P$=change in bid price, for given changes in yield and time $A=-abs$(Duration)$\times$Price(dirty)$\times\Delta Y$ $B=\frac{1}{2}\times$Convexity$\times$Price(dirty)$\times(\Delta Y)^2$ $C=$Theta$\times$Price(dirty)$\times\Delta t$ $D=-(\Delta$ Accrued Interest, for given $\Delta t$), wherein, Y (YTM), computed on applicable day-count basis (Formula S.1 or Formula S.2) Duration and Convexity, standard modified annualized (Formulae S.3 or 1.3, and S.4 or 1.4) Theta ($\theta$) recalculated at cash flow dates, such a theta: $\theta=2\ln(1+r/2)$, wherein r=ytm Price (dirty) equals bid price, plus accumulated interest (an accumulated cash receipt) $\Delta t$ is the elapsed time between two points in time on which the estimations are made $\Delta P$ rounded to nearest pricing gradient per market price convention, $\Delta P$ occurring $\Delta t$.

Arbitrage differential is the difference of precise $\Delta P$ and actual market price change.

The process can be used for a single security or group thereof, each single security processed separately, or as a set of securities in aggregate weighted summation, FIG. 28:

$\Delta P_p=A_p+B_p+C_p+D_p$   Formula 1.112 where p is on a portfolio basis, each security having a portfolio coefficient based on its portion of the present value, with such Aggregate Value Calculations for Portfolio utilized, establishing the Aggregate Values for Portfolio, comprising the identified process variables.

Processing Spreadsheets for 2.1 and 2.2 are constructed at minimum with Columns, for each point in time at which the change in price or yield is to be determined by calculation, for each security, comprising the Rows of the spreadsheet, at each column row variable value:

columns Bid Price (P); Maturity (T); Coupon (C); Accrued Interest outstanding; and Yield (Y), where source of values per security are printed, quoted or digitalized information;

Duration; Convexity; and Theta columns follow, means for performing algorithms;

columns computing values of A, B, C and D between two time points per security;

column computing $\Delta P$ from A, B, C and D; column rounding value to price gradient;

column posting actual change in price per security over the two points in time;

column calculating the arbitrage differential of $\Delta P$ minus actual change in price.

In application of the process Formulae 1.111 or 1.112, the returned calculations for a change in price are in accord with the change in market price, pricing within one gradient, here, a $32^{nd}$ referring to U.S. Treasuries. Because up to $\frac{1}{64}^{th}$ of one percent is under- or over-valued relative to notching of market price, Arbitrage Differentials are identified and sorted. FIG. 29 using S.1, S.3 and S.4; FIG. 30, S.2, 1.3 and 1.4: Prices, *The Wall Street Journal*.

An apparatus, generating financial data, an analytic valuation engine, FIGS. 31 (and 32). Apparatus processes input values from a data-feed, stored memory or by simulation, for a security, or for securities in a portfolio, with respect to C, Y and T. The system calculates the governing yield, the Yield M, for the security or for portfolio, applying coded algorithms of Formulae 1, and sends the calculated value(s) on to the arbitrage engine, together with the security's market yield values determined using prior art Formula S.1 or S.2. The governing yield value and the market yield values are sent to further analytic processing, wherein using yield data, duration and convexity (and theta) data per Formulae 1.3, 1.4 (1.111), and wherein per market yield data, duration and convexity (and theta) data per Formulae S.3, S.4 (1.111). Sending the governing yield, and its convexity, duration and theta, data set to data storage, and computing the factorization per Formula 1.10 (1.111), whereas sending market yield data set to data storage and computing its factorization per Formula S.5 (or 1.111). Apparatus has means tabling, graphing and charting data, useful to analyzing pricing or setting hedge ratios.

An apparatus, processing data and transaction, comprising automated arbitrage engine. The apparatus processes input data from storage or data-stream of analytic valuation engine. The apparatus updates the market pricing of security and the security's market yield data from real-time datafeed. An arbitrage differential is computed between market yield and security's governing yield (precise price change vs. actual). Transaction costs adjust arbitrage differential. Arbitrage opportunities are sorted according to profit, spread or embedded premium. A relative value trade basis of Yield $M^P$—$YTM^P$ data, generated FIG. 20, $YTM^P$ as S.1 or S.2. Apparatus rechecks pricing of opportunities and executes profitable transaction. Apparatus contains and updates inventory of securities, all transactions updated to storage. Apparatus provides to displaying opportunities, inventory and data to user. FIGS. 33 (and 34).

A unique type of financial security, a Replicated Equivalent Primary Security (REPS), wherein a REPS is engineered from available Primary Securities, e.g. fixed-income securities. REPS are unique composite securities, which replicate the targeted characteristics of an existing or nonexisting primary security according to specified criteria. By replication, it is herein meant that a targeted primary security, such as a Treasury, Bond or Stock, is reproduced by an engineered manufacturing process from a set of similar category primary securities. For example, for a bond, the REPS is composed from other bonds of comparable credit risk and feature sets (i.e. coupon payment periodicity), so as to provide a critical identity of the target, such as cash receipts which match the target bond's, both in amount and in the timing of cash receipts. The target can be an analytical value, i.e. the duration of a portfolio.

As an example, assume a U.S. Treasury Note matures in exactly two years. A Treasury security in general is of the highest credit quality, which is equivalent in quality only to other Treasury securities. A holder of the Note will receive interest payments every six months until maturity, plus the redemption of principal to par on the final payment date. This cash receipt sequence is another key identity of Treasuries, along with the facts that Treasuries are devoid of optional features (early call or sinking fund provisions) and are priced according to unique determinants, such as proportioning annual time increments at actual days divided by 365.

Let this two-year to maturity Treasury carry an interest coupon of 6.00 percent, payable on a semi-annual basis, and let the owner hold a face amount of this bond equal to $100 million. Thereby, in six months, the bond holder will receive $3 million, in one year, the holder will receive another $3 million, in one-and-a-half years, the holder will receive a third interest payment of $3 million and at two years, the holder receives $3 million in interest plus the redemption of principal at par of $100 million.

Given that this example target instrument is a Treasury Note, it is possible to replicate the amount and timing of cash receipts, without alteration of the credit quality, through alternative Treasury instruments, assuming these latter Treasuries provide cash receipts about the dates payable by the target Treasury. It is possible to replicate the example target's cash receipts with either other coupon-bearing Treasury Notes or Bonds, or with zero-coupon Treasury STRIPS. The target criteria can be a REPS's duration, for immunization or hedging.

Method of manufacturing a replicated equivalent primary security comprises steps of:

identifying a target primary security, available in the market or of hypothetical design, or a target portfolio, by C, Y, T and P data, determining its cash receipt amounts and dates;

identifying such primary security, available in the market or of hypothetical design, maturing at or liquidated on date of a cash receipt from the target, one security for each date;

constructing a set of simultaneous equations, one for each cash receipt date of target, applying for each date each primary security's cash receipt, and summing each receipt at date;

solving set of equations simultaneously, returning coefficient per issue (basis of 100);

calculating for each security in set its face value, of its coefficient times target's face.

Method of manufacturing a replicated equivalent primary security further comprises:

identifying a target primary security, available in the market or of prospective design, or a target portfolio, by its C, Y, T data, determining its duration from C, Y, T, and price;

identifying each primary security by its immunization sensitivity of duration, which in aggregation with one or more such identified security, combining together to target duration;

identifying the duration data for the composite replicated equivalent primary security.

The FIG. 35 diagrams the method of replication by targeting receipts and duration.

Cash receipt replicant method demonstrated, a 6.00% p.a. coupon, 2-year, Treasury Note is the target security, face amount of $100, paying in six months, one year and one-and-a-half years, each of those dates coupon cash receipt of $3; at 2 years, $3 plus $100 principal.

A replicated equivalent primary security of Treasury Notes or Bonds, matching target:
1) T-Note, maturing in six months, carrying a 5.00% coupon;
2) T-Note, maturing in one year, carrying a 5.50% coupon;
3) T-Note, maturing in 1.5 years, carrying a 7.00% coupon;
4) T-Note, maturing in 2.0 years, carrying a 4.50% coupon.

Setting simultaneous equations to replicate based on cash receipt amounts and dates:

| Equation | 1) | | 2) | | 3) | | 4) | = | T) |
|---|---|---|---|---|---|---|---|---|---|
| a) | $1.025 \times 1)$ | + | $0.0275 \times 2)$ | + | $0.035 \times 3)$ | + | $0.0225 \times 4)$ | = | 3.00 |
| b) | $0 \times 1)$ | + | $1.0275 \times 2)$ | + | $0.035 \times 3)$ | + | $0.0225 \times 4)$ | = | 3.00 |
| c) | $0 \times 1)$ | + | $0 \times 2)$ | + | $1.035 \times 3)$ | + | $0.0225 \times 4)$ | = | 3.00 |
| d) | $0 \times 1)$ | + | $0 \times 2)$ | + | $0 \times 3)$ | + | $1.0225 \times 4)$ | = | 103.00. |

Solving for these equations gives the following face amounts per security in replicant:
1)=$0.672959   2)=$0.689783   3)=$0.706984   4)=$100.733496.

A replicated equivalent primary security of Treasury Zero-Coupons, matching target:
1) six-month zero-coupon U.S. Treasury STRIPS, face value $3
2) one-year zero-coupon U.S. Treasury STRIPS, face value $3
3) 1.5-year zero-coupon U.S. Treasury STRIPS, face value $3
4) two-year zero-coupon U.S. Treasury STRIPS, face value $103.

Alternate replicated equivalent primary securities for a target security or portfolio: Target Security, a U.S. Treasury Note, held to mature May 15, 1999, as of Apr. 3, 1996, FIG. 39:

| | |
|---|---|
| Maturity: | May 1999 |
| Coupon: | 6.75% per annum, semi-annual payments |
| Prices: Bid/Ask | 102:07; 102:07/102:09; 102:11 |
| Face Value: | $50 million |
| Best Price: | $51,140,625 |
| Accrued Interest: | $1,300,205 |
| Total Cost (P + AI): | $52,440,830 |
| Duration (S.3 mod. ann.): | 2.782972. |

Replicant A: Replicated Equivalent Primary Security having intermediate T-Notes, comprising FIG. 36, to matching target primary security's cash receipts by amount and date.

Replicant B: Replicated Equivalent Primary Security having zero-coupon STRIPS, comprising FIG. 37, to matching target primary security's cash receipts by amount and date.

Replicant C: Replicated Equivalent Primary Security having intermediate T-Notes, comprising FIG. 38, to matching target primary security's cash receipts by amount and date.

The FIG. 40 provides tabulation of the target and the assorted REPS, respecting the cost of buying or selling each one of them respectively. The FIG. 41 provides tabulation of permutations of target versus REPS arbitrage opportunities and sorted arbitrage opportunities.

A replicated equivalent primary security (REPS) generator, comprising means to input a target security's data values of C, Y, T and P for target, and pricing sensitivity, for instance, duration. The target parameter to be matched by REPS is set, of cash receipts, or of pricing sensitivities. Possible REPS are engineered from available securities of same security typus, such manufacture operating by replicating method, such a method is the method of FIG. 35. Generator having means sending alternate REPS to arbitrage engine, with price, variables and pricing sensitivities, with comparison of target. Generator having means displaying alternate REPS to monitor or rendering device, with comparison target. Generator with means to select a specific REPS to be manufactured, and to execute manufacture in transacting specific REPS. Generator having means to deliver and render REPS to end-user or internal memory, updating to storage, wherein having means to display all transactions at user request. The FIG. 42.

An apparatus, processing data and transaction, comprising automated arbitrage engine, the FIG. 43. The apparatus having means to input data from REPS Generator. The apparatus means updating the market pricing of alternate REPS and the target security's from real-time data-feed. An arbitrage differential is computed between target and each alternate REPS, and between pairings of each REPS, whereas a profitable arbitrage transaction comprises profit from selling either target or an alternate and buying either an alternate or target. Transaction costs adjust arbitrage differential. Arbitrage opportunities are sorted according to profit, spread or embedded premium. Apparatus rechecks pricing of opportunities and executes profitable transaction. Apparatus contains and updates inventory of securities, all transactions updated to storage. Apparatus provides to displaying opportunities, inventory and data to user.

An integrated computer-based financial information and transaction processing system providing for: the analytic processing; the manufacture and delivery of replicated equivalent primary securities; assessment of arbitrage spreads and execution of arbitrage transactions.

The system compose those business logic computational engines as three core server-based systems: the analytic valuation engine, with its methods, data, processes, means and functions described FIG. 1 through FIG. 32; the replicated equivalent primary security generator, with its methods, data, processes, means and functions detailed FIG. 35 through FIG. 42; and an automated arbitrage engine, with spread arbitrage differentials contained in FIG. 20, with notching arbitrage differentials contained in FIGS. 30 and 31, and with replicant arbitrage differentials contained in FIGS. 40 and 41, and with its methods, data, processes, means and functions detailed therein and in FIG. 33, FIG. 34, and FIG. 43.

Each of the component business logic servers receives market pricing data through a real-time financial data-feed, whereas the relevant signal data (i.e. for analytic valuation: of security typus, credit rating, C, T, P) are delivered as arrays for computational processing. The output data of the analytic valuation engine and REPS generator are sent into the arbitrage engine for processing, as well as to displays or external destinations necessary for functioning, manufacture, monitoring and control. Output from any of the engines can be sent to terminals and printers, and each of the engines is linked to storage medium allowing output and results to be stored to memory, so as to enable monitoring, review and assessment of the operating systems, trades, sales, inventory and P&L. Automated control sequences are established, to accomplish assembly of REPS, and execution of computer-driven transactions, effected over tele-communications, with exchanges, dealers, brokers or investment entities. The system is secured by encryption, and gate-keepers and firewalls between cores. FIG. 44.

In addition to the cause for proprietary in-house investment management and analytic technologies, these adding profitability and security to in-house trading, investment and insurance portfolios, the market is screaming for superior fixed-income mutual funds. A low-risk, guaranteed profit, index out-performing, portfolio investment and management method.

Utilizing the U.S. Treasury instruments, being the lowest-risk, guaranteed return, credit risk-free, fixed-income investment, U.S. Treasury portfolio managers strive to enhance returns, but with the burden of increased risk, by taking on risk as lengthier expirations, yield curve weightings, speculative tactics and credit spread on U.S. agency paper. My independent study of the mutual fund industry dedicated to U.S. Treasury funds, shows that this sector (as the index performed) earns returns in excess of shortest-term U.S. Treasury paper. Yet unlike tactics above, my study showed that indexed aggregate sector performance approximated, and could be mirrored by a, randomly selected, roughly evenly distributed, ladder index portfolio. Allocating funds in to Treasury Notes or Bonds, spanning the short- to mid-term maturations.

The reward of the managed U.S. Treasury mutual fund sector can thus be replicated simply by a ladder allocation. Using allocation of a ladder portfolio, a low-risk foundation, achieving the average returns of professional portfolio managers, yet earning without chance.

Wherein, the centerpiece of the strategy is a ladder-based U.S. Treasury portfolio, comprised of coupon-bearing Notes and Bonds which span the short and medium terms. This composition itself can be expected to earn approximately, and with vastly less risk, the return of the mutual fund industry sector, and without its managerial overhead or speculative risks.

Moreover, by virtue of balanced capital over a maturity spectrum, the structure has a reliable yield-curve risk, as it tracks the developments in the yield curve, plus it provides a higher return to variance, a natural awareness of risk-points and a reduced reinvestment risk.

The business logic allows the ladder to run, with sequentially, each issue maturing. The logic need not allocate in the shortest maturities, since, soon after start-up, the portfolio de facto maintains the shortest maturities, as the cycle brings to maturity yesterday's Note, whereas at identical maturation (expiration), Treasury Bills, Notes and Bonds convergence.

Such management of such portfolios is easy, little is required, just an automated reinvestment of matured funds to the end of the portfolio line. Skilled management can add, that is also because the character of such ladder mutual funds can be so readily approached. The intricacies of optimization, of loss avoidance, profit capture and of continuous perfection of the investment composition are simple, for example, the coupon interest payments received can be accumulated and reinvested periodically, and while accumulating on cash account, providing operational liquidity, i.e. to periodic cash-outs of investors and administrative costs.

This rolling ladder portfolio mutual fund's first enhancement is discussed above—the arbitrage to mutual fund sector performance accomplished by the reduction of assumed risk. The final two enhancements are similarly derivative-free arbitrages. The second enhancement to return is the group of relative-value managements to the exact portfolio holdings over time.

Remembering that any coupon-bearing Note or Bond issue is itself a fixed ladder portfolio of cash receipts, and that such cash receipts are zero STRIP equivalents, the business method identifies replications, the compositions and permutations of issues and their parts, which, by automated computerization, pricing out arbitrages on cash receipts, represented or divisible within portfolio holdings, against replications by available instruments not in hand.

The final arbitrage is risk-free basis, capturing the reversional pricing dynamic between a ladder portfolio, or its single issues, and relative, governing yield, valuations. The engines and system can implement, allocate and transact the fund, by this method, FIG. 45.

A process for transforming data, such data in nominal or monetary units, to ameliorate the influence of inflation and to transform the data mathematically to revealing distribution. The financial data, of a value expressed as an amount of a currency unit, and/or its underlying object of value, are discrete samplings of a variable taken over time. The process utilizes the actual monetary units of a data set, wherein such units include the group of world currencies, and provides the data array of the actual nominal value of a security or an underlying variable, spanning a range of time, with discrete sample values identified within the given time-frame. The sequential array of a security's price (value) data over time, or of a variable with nominal valuation, such as the temporal development of insured losses due to catastrophes or defaults.

The data are processed to spread-sheets, rendered in charts, or statistically described, in actual nominal data values over a span of time. For example, FIG. 46, represents insured U.S. actual losses, in nominal U.S. dollars (in billions), for the financial variables of deposits closed and net deposit loss (closed plus recovery) relating to loss amounts of the bank system, and of insured catastrophe and statutory underwriting loss relating to property & casualty loss. The FIG. 47, left side, provides the data array of each said variable's nominal value data.

Next, the data value at a specific date, if said date is post-1972, the nominal value is multiplied by its corresponding inflation-adjusted scalar, whereby said scalars are determined by setting the year 1972 at 1.00, unity value. A Federal CPI number for the currency country comprise source data that can be utilized and processed to achieve the scalar for each year, herein, the U.S. Consumer Price Index (CPI). Proceeding in order, for each year, its CPI inflation is subtracted out from the proceeding year's rolling (decreasing cumulative inflation) total, such a scalar for 1973 is: 1972 scalar−1973 inflation rate, i.e.: 1.00−0.0625=0.9375. The scalar for 1974 is the 1973 scalar minus 1974 inflation, each year proceeding forward.

The domestic U.S. dollar scalars for the years, 1972 through 1996, are presented in FIG. 47, and, right side, the 1972-adjusted U.S. dollar values for the variables are arrayed. The FIG. 49 is graphical representation of 1972-adjusted data values for the four variables.

Within the context of most financial formulae describing the pricing relationship with respect to time is the assumption that the financial variable is independent and has lognormal distribution. The statistical evidence of some financial variables or securities supports this. It is appropriate and often necessary, in the implementation of the financial formulae, to utilize the natural logarithmic values of the variable or security. Hence, the next part of the process transforms the 1972-adjusted data values into logarithmic values, in FIG. 48, left side. As the final part of the transformation, the change ("delta") in the logarithmic data from one time point to the next, in the variables herein utilized, from one year to the next, is computed, and is displayed FIG. 48, right. The processed log and delta data are graphically represented in the FIGS. 50 and 51, respectively. Correlation between these variables is visually apparent.

The data values of each variable or security can be separately processed or processed in tandem with its transformed values, in addition to being processed and graphed within a collection of variables that are evaluated. The FIG. 52 graphs the log values of the 1972-adjusted data for deposits closed, in tandem with its log delta values. The FIG. 53 graphs the log values of the 1972-adjusted data of deposits closed in comparison with deposit losses. The FIG. 54 graphs the log delta 1972-adjusted data for deposits closed and for deposit losses. The FIG. 55 graphs the actual nominal values of net statutory underwriting and catastrophe losses for the Property & Casualty (P&C) industry on a consolidated basis. The FIG. 56 graphically represents the P&C industry's 1972-adjusted dollar amounts of statutory and catastrophe losses. The FIG. 57 charts the log values of the 1972-adjusted data for statutory and catastrophe losses, whereas the FIG. 58 charts the log delta 1972-adjusted data. The FIG. 59 presents the actual nominal underwriting loss and the loss from catastrophes, revealing the contribution of the later to the overall performance of the P&C underwriting. The FIG. 60 graphically represents the log and delta log values for catastrophe losses, and the FIG. 61 charts the log and delta log values for statutory and catastrophe losses. By charting, the trends of the cleaned data variables are visually apparent.

To further provide information on the characteristics of the financial variables or securities, descriptive statistics of the variables are processed and assembled. The FIG. 62 comprises the descriptive statistics for the financial variable, deposits closed, over the modern (post-1972) period, for each of the four data sets, of actual nominal, inflation-adjusted, log of the adjusted, and the change (delta) of the log. The FIG. 63 contains descriptive statistics for the variable, catastrophe loss, over the modern period, for the four sets of processed data. By processing the descriptive statistics, the key statistical values of the variables are rendered, which can be further utilized in financial formulae requiring such values, i.e. for the mean.

For comparison purposes, as would be appropriate for assessing two financial variables which are involved in a swap, the descriptive statistics of each variable, over identical time periods and on identical processed value basis, are rendered side-by-side. Such is provided in FIG. 64, wherein the descriptive statistics of the log adjusted values of deposits closed and catastrophe loss for the period 1979-1995 are represented. The FIG. 65 comprises the log delta values for those two variables over the length of their entire history. By doing so, it becomes apparent that, over the entire history, the change in log values are nearly identical for these two variables, whereas their standard deviation and variance differ.

The distribution of the variables' respective processed values are visually assessed by means providing histograms of the values. For many financial formulae, the assumption of log normal distribution is required to implement them within their appropriate defined construct. Utilizing histograms of the non-log values, the log normal distribution appears as a sharp rise, with a long tail, and for processed log data values, the standard bell shape should be evident. The FIGS. 66, 67 and 68 contain histograms for the financial variables, over defined. time-periods, on actual nominal, log-adjusted, and delta log, processed bases. As is evident, the actual nominal values of deposits closed and catastrophe losses spike and tail roughly as might be expected from log normal variables, and their delta log histograms roughly match the bell distribution, caveat being the limited sample size involved. Such information is vital in assessing the efficacy of valuation and expectation methodologies assuming log normalcy.

As further means for processing data sets of financial variables or values of securities, the data sets are adjusted by a relative growth scalar appropriate for the variable or security. For example, for the deposits closed, insured by the FDIC, an appropriate growth scalar is the rise in the insured deposit base as a percentage of the total deposit base since the inception of the variable, (insured) deposits closed. FIG. 69 contains the data array of the percentage of deposits insured respective total deposits for each year (data point). For each year, the percent is divided by the first point's (the year 1934 in this case) percent, to render the year's scalar. The actual nominal value and the 1972-adjusted value for each year are divided by the scalar for that year, with the log and delta log values then calculated from the growth-scaled values. On this basis, the portion of the rise in deposits closed attributable to increase of the insured deposits relative to the total deposit base is removed, resulting in clean, growth-adjusted data. Descriptive statistics are processed for the growth-adjusted data array, as in the FIG. 70.

As a second example of growth-adjustment data array processing, the nominal values for insured catastrophe losses are scaled by the growth in the insured property base, respective an original point in time. Utilizing the fact that the insured property base increased by 80% in the period 1988 to 1995, the growth over that period commencing in 1988 is attributed, here in linear additive fashion, such that for 1988 the scalar is 1 and for 1995 the scalar is 1.8. The scalar for each year is applied as a denominator to the year's catastrophe losses, FIG. 71.

Histograms for the growth-adjusted data arrays are processed, contained in FIG. 72. The import of growth-adjustment is visually evident in the histograms—the resulting histograms are broader across bins, or more normal with respect to their prior distributions. The broadened, frequency rich probability distribution is desirable with respect to insurance, and reinsurance, especially to constructing robust models for multiple excess of loss layers.

A process to evaluate the incidence and likelihood of default or loss within the insured depository banking industry, comprising two separable and distinct processing methodologies. The first process creates two risk variables for deposit insurance and credit default analysis, the insured [Deposits Closed/Total Deposits] and the insured [Closed Assets/Total Assets]. The data array for each numerator and denominator are compiled, contained in the FIG. 73. Utilizing those data arrays, the quotients (the variables) are processed as arrays, FIG. 74, represented as #/#. The quotients are further processed as natural logarithms, expressed $e^{(\#/\#)}$. Utilizing either of the processed data arrays, the incidence of variable default is established, and are further processed into descriptive statistics, histograms and graphical representation. The FIG. 75 presents the graph of the financial variable, [Deposits Closed/Total Deposits], said variable comprising a martingale probability of default frequency and relative magnitude. FIG. 76, descriptive statistics and histograms of log of the risk variables and their log deltas.

The second process, useful for the evaluation of default likelihood on an industry basis or on an individual institution basis, compiles the data values for the variables, total deposits (TD), interest-bearing deposits (IBD), for total assets (TA), interest-bearing assets (IBA) and interest-bearing liabilities (IBL), wherein total assets equals total liabilities (TL), FIG. 77. Next, a variety of operating ratios (variables) are processed from TD, IBD, TA, IBA and IBL, including the ratios: TD/TA; IBD/IBA; IBD/IBL; TD/IBA; TD/IBL; and IBA/IBL, FIG. 78.

Once processed, these ratios can be utilized in combination to reveal the conditions effecting the safety of operations. For example, the FIG. 79 graphically represents the ratios of TD/TA, IBD/IBA, IBD/IBL and TD/IBA on an banking industry-wide basis since 1934. Evident from the data over time is that the wide safe operating margins, between the ratios TD/IBA and IBD/IBA constricted substantially, indicating an increasingly slim safety margin. The FIG. 80, graphically representing the ratios TD/IBA, TD/IBL and IBA/IBL, shows that the underlying relationship between TD/IBL and IBA/IBL changed beginning in early 1970s, such that whereas earlier the former was greater than the latter, their relation then inverted. This key relationship is the primary cause of increased default probability, and when graphed together with the default risk variables of [Deposits Closed/Total Deposits] and [Closed Assets/Total Assets], it is transparent that the rise in default corresponds thereto, FIG. 81.

The FIG. 82 diagrams the process of cleaning and preparing nominally valued data: taking actual nominal value data in array; adjusting nominal data by inflation scalar, and/or by growth scalar, as array; converting inflation adjusted data to natural log values as array; computing the log of the change (delta) between data points; rendering in tables, the nominal, adjusted, log, and log delta, data arrays; graphing in charts, the nominal, adjusted, log, and log delta, data arrays; computing and assembling statistics and histograms of the four data arrays.

A method and process of a technology for small samples create numerical data and statistical tools benchmarking the character of distribution functions in small sample environments, affording means for evaluation of the nature of financial data with respect to establishing its underlying distribution character.

The method and process of small sample technology is useful, simulating and demonstrating how a uniform random variable with a known distribution function occurs in small sample environments, i.e. in the absence of the large data sets by which the Law of Large Numbers is applicable in shaping frequency.

The method and process of the small sample technology can be used for any set of discrete data, and is useful for data sets which are time-series or serially correlated. Examples of small sample financial data are the annual aggregates of U.S. insured depository default and catastrophic property casualty losses.

The method and process of the small sample technology are especially designed for evaluation of data which may be a standard normal variable. Financial pricing formulas and theories imply, infer or require that the financial data is a standard or log normal variable. It can be applied to other disciplines' data sets.

The method and process of the small sample (typically $N \leq 30$, can be greater) technology comprises steps of:

A) randomly generating sequences of independent uniform random variables as separate data arrays, over the values of zero to one, each sequence separately seeded, each using a different seed clock rate;

B) taking the data arrays in pairs and performing a Box-Muller transformation on the two data arrays of each pair, using the formulas, one for each array, to generate numeric output of standard normal random variables:

Box-Muller: Std. Normal Random Variable
$$V1 = \text{SQRT}(-2 \times \text{LN}(U(Ia))) \times \text{COS}(2 \times PI \times (U(Ib)))$$

Box-Muller: Std. Normal Random Variable
$$V2 = \text{SQRT}(-2 \times \text{LN}(U(Ia))) \times \text{SIN}(2 \times PI \times (U(Ib))),$$

where the Ia and Ib are from each of the two distinct, paired, data arrays;

C) utlizing the numeric output of a transformed data array, by taking small sample of its data to generating descriptive statistics of the small samples, which can then be used to indicate the probable and occurring statistical characteristics of standard normal variables subjected to small sample environments, which further comprises:

a) generating the mean, standard deviation, and sample variance, of the sample;

b) generating a histogram for the sample frequency respective range of bin values;

c) generating descriptive statistics for various sized samples of each data array;

D) utilizing the statistical descriptive characteristics of the small samples generated to evaluate and serve to benchmarking the nature of the distribution underlying financial or other data in small sample sets.

The method and process of the small sample technology further comprises alternate lognormal technology:

A) taking the natural log of the transformed data arrays, this done after the step B) above;

B) utilizing log numeric output to generating statistics and evaluating data distributions.

A method and process of small sample technology which comprises an alternate transform technology, creating a random variable without reference to more than one array:

A) taking the data arrays in singleton and using formula for each array, generating output:

$$\text{Random Variable} = \text{SQRT}(-2 \times \text{LN}(U(Ia))) \times \text{COS}(2 \times PI \times (U(Ib))),$$

where the Ia and 1b are from the same sequence data array;

B) utilizing a series formalism to relate the Ia and the Ib, eg. Ui and Ui+1 respectively. This latter type of generated random variable tests in large numbers as standard normal with respect to mean (of zero), standard deviation (of one) and variance (of one), irrespective.

Figure 85:
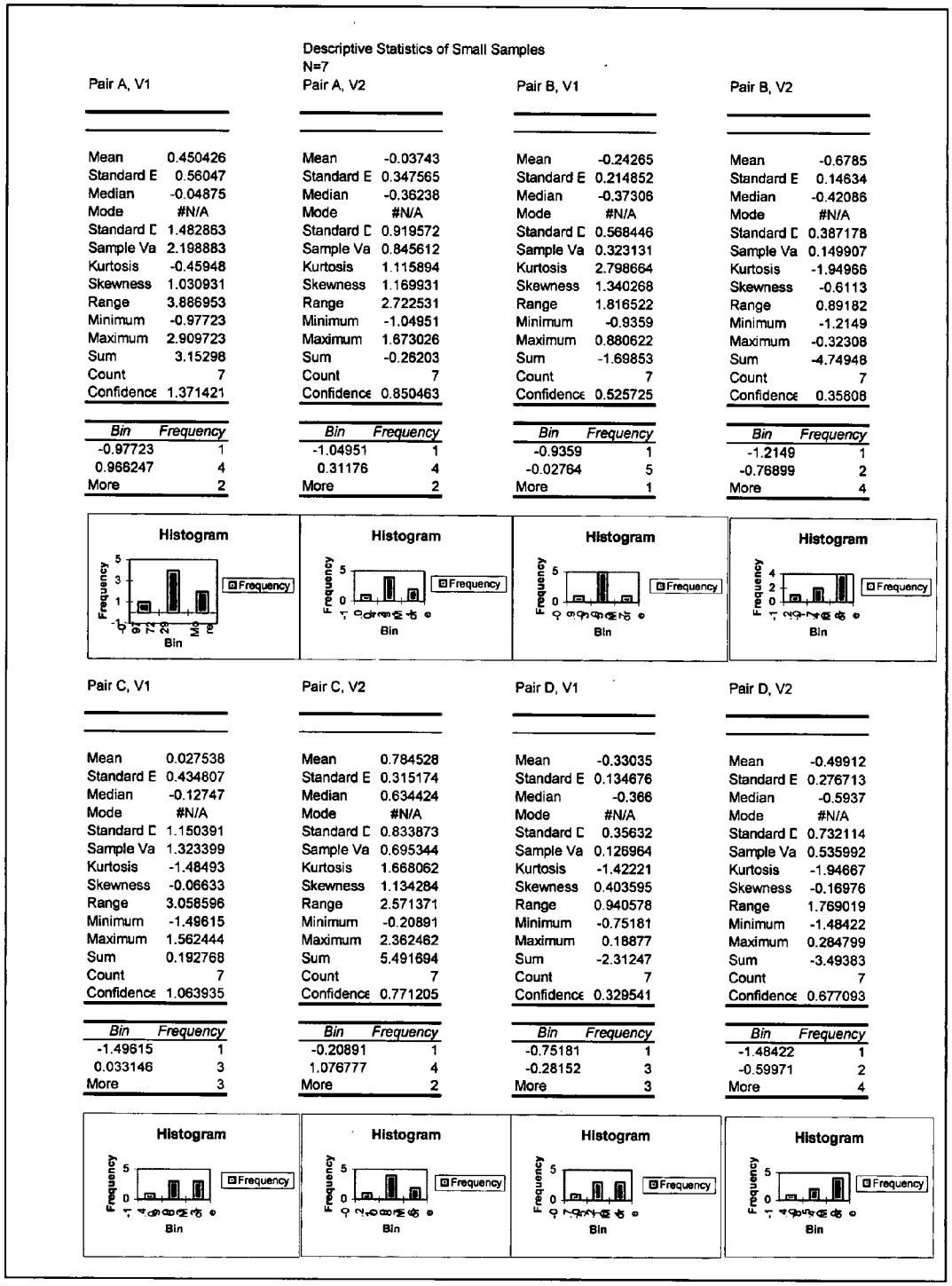
Figure 86:
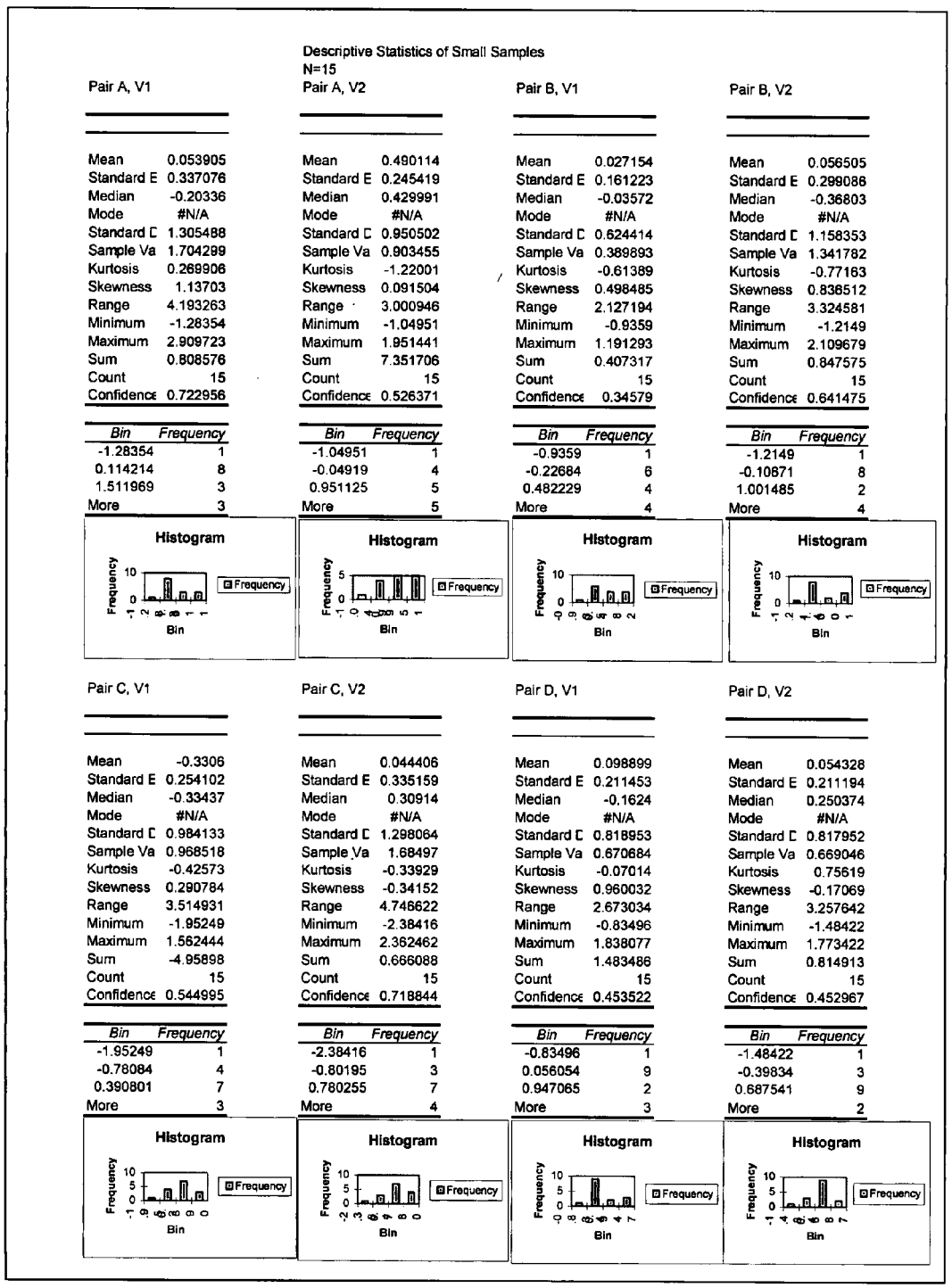
Figure 87:
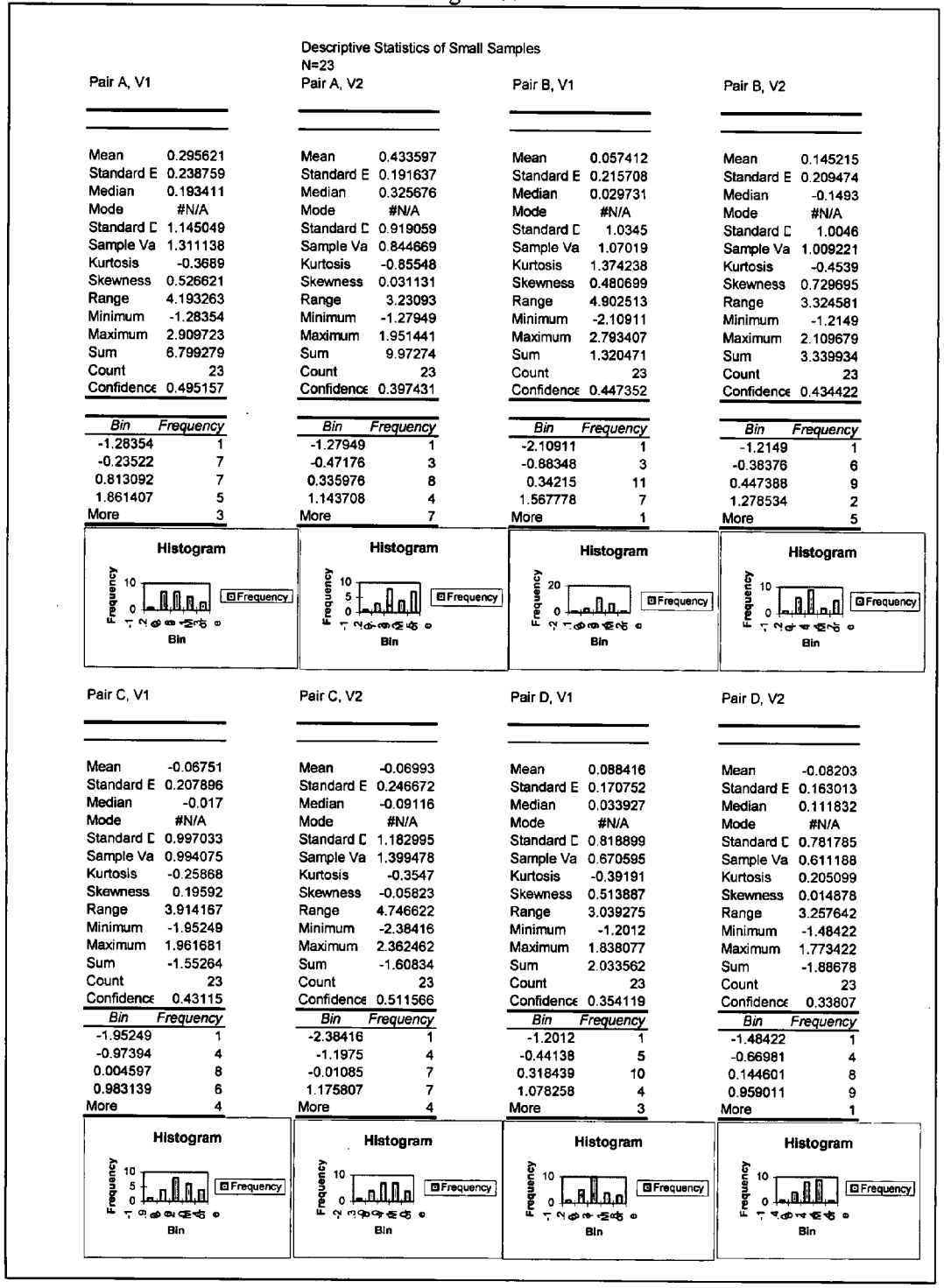

The FIG. 83 contains 10 random generated sequences of independent uniform random variables as separate data arrays. The FIG. 84 contains the 10 data arrays in pairs, pairs A to E, after performing the Box-Muller transformation on the two data arrays of each pair, V1 and V2. FIG. 85 contains descriptive statistics and histograms for each transformed data array, N=7. FIG. 86 contains descriptive statistics and histograms for each transformed data array, N=15. FIG. 87 contains descriptive statistics and histograms for each transformed data array, N=23. FIG. 88 and FIG. 89 contain descriptive statistics for each array, where N=48 and N=62.

FIG. 90, renders ten standard normal random variables per alternate transform, U of FIG. 83.

Theta Modeling Technology with Mathematical Functions and Numerical Techniques respective an Underlying State Variable, Theta, wherein, an investment or derivative security is modeled by using a single underlying state variable, such a theta variable, insured deposits closed. These have a positive nominal value, an actual amount of cash value. This underlying state variable, theta, $\theta$, is held to follow an independent Markov process: $d\theta/\theta = m\ dt + s\ dz$.

This asserts that the future value of $\theta$ depends on the known present values under a continuous pricing constraint. As Wiener process, $dz$ is related to $dt$: $\Delta z = \epsilon\sqrt{\Delta t}$.

Such theta variable depends solely on itself and time to define its expected drift and volatility, which it redefines through the course of its life. Thus, $d\theta/\theta = m\ (\theta,t)\ dt + s(\theta,t)\ dz$.

For methods drawing from standard normal distribution, the log of the change of theta over time and/or the log of theta at exercise should have this distribution. The theta approach is useful where a target variable is not the price of a traded security, but it is useful there, too.

To creating a tradable instrument for a theta variable, assigning the function, f, as the price of a security dependent on $\theta$ and time. For instance, for the insured banking's variable, the "deposits closed" and "deposit loss" are candidates for industry's theta. For the insured catastrophe dollar risk, they are the "catastrophe loss" and "net statutory underwriting loss". Variables are created from divers theta, such $\theta i$, e.g. $\theta b$ and $\theta c$, correlating respective losses.

For instance, for $\theta$(banking: of insured deposits closed or net deposit losses) and $\theta$ (cat: of insured catastrophe or net statutory underwriting losses), let f(b) and f(c) be the respective price of a derivative security with payoff equal to a functional mapping of $\theta b$ and $\theta c$ into the future. Let the processes of f(b) and f(c) be defined via Ito's lemma, where $df/f = \mu dt + \sigma dz$. This stands for any $f$(theta).

On a continuous time basis, the change in the price of security (f) dependent on the banking losses is $df(b) = \mu fb\ dt + \sigma b\ fb\ dz$; (and for $\theta c$: $df(c) = \mu c\ fc\ dt + \sigma c\ fc\ dz$). An instantaneously riskless portfolio can be created from a combination of related f(bi), such that $(\mu 1-r)/\sigma 1 = (\mu 2-r)/\sigma 2 = \lambda$, where r=the present spot, risk-free interest rate at time1 and 2.

Thus, for any f, being the price of a security dependent on only $\theta$ and time, with $df = \mu f\ dt + \sigma f\ dz$, there is the parameter lambda, $\lambda = (\mu-r)/\sigma$, which is dependent on $\theta$ and time, but not on the security f, estimating the market pricing of risk of $\theta$ by stochastics.

The theta variable's $\mu$ is the expected return from f. The expected drift, mu, equals $\mu f$. Sigma, $\sigma f$, is the volatility of $f(\theta)$, and either positively $(df/d\theta>0)$ or negatively correlates to $\theta$. If negatively correlated, volatility=$-\sigma$, and $df=mu\ dt + (-\sigma)f(-dz)$. Variance is $[(\sigma^2)(f^2)]$ and dz is over an independent interval, $dt=(T-t)$. Using Ito's lemma, the parameter, mu, relating $\mu$ and the pricing function, is set as $\mu*f = df/dt + m\theta df/d\theta + \frac{1}{2}s^2\theta^2 d^2f/d\theta^2$.

The parameter Sigma is set, $\sigma*f = s\theta df/d\theta$. This results in a differential structure $df/dt + \theta df/d\theta(m-\lambda s) + \frac{1}{2}s^2\theta^2 d^2f/d\theta^2 = r*f$.

This equation can be solved by setting the drift of $\theta$ equal to $(m-\lambda s)$, and discounting expected payoffs at r, the present spot risk-free (usu. U.S. Treasury) interest rate.

Thus, under risk-neutral valuation, the drift of $\theta$ is reduced from m, to $(m-\lambda s)$.

To constructing a valuation lattice, such in discrete time, introducing the notions of delta, $\delta = e^{\hat{}}(\sigma*\text{sqrt}(\Delta t))$, and of mu=$[2*e^{\hat{}}(r*\Delta t)]/[\delta + \delta^{\hat{}}-1]$.

Hence, $\sigma = \ln(\delta)/(\text{sqrt } \Delta t)$. Next, setting values for $\Delta t$, sigma, r(t) and $\delta$ (where, $\delta=S$, if modeling an equity security), calculating nodes of $\theta$ at $\theta(tk) = [mu^{\hat{}}k]*[\delta^{\hat{}}w(k(w))]*[\theta o]$.

Substituting theta ($\theta$) for a security (S), S isomorphic to $\theta$, affording an underlying random walk of w(k(w)), such that if w=(-1, -1, 1 . . . ), $\theta(t(3)) = [mu^{\hat{}}3]*[\delta^{\hat{}}(-1)]*[\theta o]$.

In lognormal world, this relates: $\ln \theta(tn) = [n*\ln\ mu] + [w(n(w))*\ln \delta] + [\ln \theta o]$. This results in the equalities: in $\delta = \sigma*(\text{sqrt } \Delta t)$ and $dt = T/n$. Substituting and letting k=n, such that tn=T, forms: $\ln \theta(tk) = [n*\ln\ mu] + [w(n(w))*(\sigma*\text{sqrt } \Delta t)]/[\text{sqrt } n] + [\ln \theta o]$.

More simply, the expected value of $\theta$, $E(\ln \theta) = \ln\ mu + \ln \theta o$.

The variance of $\theta$, $\text{Var}(\ln \theta) = (\ln \delta)^{\hat{}}2$.

The volatility of 0, $\text{Vol}(\ln \theta) = (\ln \delta)/\text{sqrt } \Delta t$.

For a pathing tree, the node value mechanic, $\theta(tn) = [mu^{\hat{}}n]*[\delta^{\hat{}}w(n(w))]*[\theta o]$, using logarithmic transform, node mechanic, ln $\theta(tn) = [n*\ln\ mu] + [w(n(w))*(\ln \delta)] + [\ln \theta o]$.

By the Central Limit Theorem, the term, $w(n(w))/(\text{sqrt } n)$ exhibits strong convergence to the standard normal distribution, N(0,1). The term [n*ln mu] shows weak convergence to $[(r-\frac{1}{2}\sigma^{\hat{}}2)*T]$, hence its robust implementation is limited to the rigors of discrete methods.

The term [ln $\theta$(T)] is distributed as $[(r-\frac{1}{2}\sigma^{\hat{}}2)*T] + [N*\sigma*(\text{sqrt } dt)] + [\ln \theta o]$.

Non-log, [$\theta$(T)] is distributed as: $[\theta o*e^{\hat{}}((r-\frac{1}{2}*\sigma^{\hat{}}2)*T) + (N*\sigma*(\text{sqrt } \Delta t)]$.

Valuation of a derivative security (S) based upon the state variable theta, example, the European call option, with realizable cashflow only at T, value today of P, with the functional mapping, $f(\theta o) = \max\ [\theta(T)-K, 0]$, where K is strike price and $\theta$ is held substitutable by S. By weak convergence, today's value, P($\theta$), based on $\theta$ at T, derived over normal distribution:

$P(\theta) = [\theta o * N\{(rT + \ln(\theta o/K))/(\sigma*(\text{sqrt } dt)) + (\frac{1}{2}\sigma*(\text{sqrt } dt))\}] -$ $[Ke^{\hat{}}(-rT) * N\{(rT + \ln(\theta o/K))/(\theta*(\text{sqrt } dt)) - (\frac{1}{2}\sigma*(\text{sqrt } dt))\}]$.

$P = e^{\hat{}}(-rT)*E(rn)[\theta(T)-K]$, where $E(rn)$=expected value under risk-neutral conditions.

For any function, f, valuing a derivative security based on theta that pays off f(T) at time T, the expected risk-neutral value is $f = e^{\hat{}}(-rT)*E(rn)(f(T))$. This requires setting the growth rate of the underlying theta variable in relation to $[m-\lambda*\sigma]$, rather than as m alone.

Thus, risk-neutral valuation for today's value, P($\theta$), $P(\theta) = f(\theta)$, of a derivative security paying off f(T) at time T, is equivalent to the risk-free discount over period (0,T) of its expected risk-neutral future pay-out. This narrow evaluation is valid for f only over the continuous segment (0,T), with determinable values of F(0) and F(T). Lattices which subdivide this segment, are weakened, if their $\Delta t$-parameters, i.e. $\Delta t = (T-t)$ with $0 < t < T$, are modeled using analytic values from (0,T) data sets. Any methodology which relies on convergence to a normal distribution for its valuation, for instance, or a sampling therefrom, is strictly consistent only for European-style derivatives, that is, having exercise only at T, but not continuously throughout the segment (0,T). Also, it assumes the security can gain or lose value during (0,T), with the value of the security always non-negative. The payoffs of the $\theta b$ and $\theta c$ securities can be European, if these stem from the single terminal condition of theta at T:

the selected theta variables are annual aggregates, they begin each year at θ=0 and end the year at T, θ≧0, European (0,T) events. For rigorous risk-neutral valuation, strict conformity can only be assigned under a European-style (0,T)segment, variable and theta-based security. Such a theta can substitute for a continuously traded security after adjusting for the conditions that θ at T=Σθi, each θi occurring and aggregating discretely over (0,T). For continuous trading, full data along the annual path of such theta over (0,T) are required to be available.

A valuation function, V, for a security or derivative dependent only on theta and time:

$$V(t,0)=V(t)=Vo*e\^\{(r-\frac{1}{2}\sigma\^2)t+(N*\sigma*(\text{sqrt }t)\}], \text{ where}$$
$$V(0,T) \text{ is identity of } \theta(0,T).$$

To constructing a swap, e.g. between the insured deposit losses and catastrophe losses, modeled on theta(b) and theta(c) respectively, each having valuation function, f(b) and f(c) respectively. The value of the swap to the payer of the deposit losses, f(b), assuming the swap of all year-end aggregate losses:

$$V=e\^(-rT)*\{E(rn)[f(c)(T)-f(b)(T)]\}, \text{ where } E(rn)$$
$$=\text{risk-neutral Expectation}.$$

Though a swap is composed of two sides, its value, V, is a single function. Thus, V is a single derivative instrument modeled by the expectation of the two functions, each respective of its own single theta variable. Consequently, this function, V, models a security dependent on unrelated underlying variables, theta(i). Each theta(i) follows a stochastic process of form: dθ/θ=mi*dt+si*dzi, with mi and si the expected growth and volatility rates, the dzi being Weiner processes, then substituting V for f, the total loss swap, V, has the form:

$$dV/V=\mu dt+\Sigma[si*dzi], \text{ with } \mu \text{ being the expected}$$
$$\text{return of the swap}.$$

Component risk of the return to the theta(i), Σ[si*dzi] are adjusted if theta(i) are correlated.

Brownian motion defines the change in the value of a variable as related to the variable's initial value and characteristic deviation, as well as to distinct random perturbations resonating variance over independent intervals. It is a discrete process that approaches continuous form when the intervals are small and uncorrelated. Pinned simulation fixes an initial and terminal value for the variable, then developing the value path in between.

An expression of theta with respect to time and to Brownian motion, the life of theta over (0,T) and projected Brownian motion in simulation, can be related in derivational form:

$$\theta(t,B)=\theta o*e\^[(r-\frac{1}{2}\sigma\^2)t+\sigma*B].$$

This above equation values without preference to risk, obtaining risk-neutral results.

For geometric Brownian motion, the theta variable must be lognormal in functionality (i.e. its natural log values must show distribution in line with a standard normal population). To implementing this when modeling theta of such distribution, as respective of time only:

$$\theta(t)=\theta o*e\^[(r-\frac{1}{2}\sigma\^2)t+\sigma*\text{sqrt}(t)].$$

The weak convergence by Δθ(t), requires only that the natural log of the change in theta shows a normalized distribution and characteristic variance (not necessarily σ^2=1).

Allowing the notation, $\theta(t,B)=\theta o*e\^[(r-\frac{1}{2}\sigma\^2)t+\sigma*B]$, the change in dθ, measured at the terminal values (0,T), with t=T-0, can be derived as: dθ=θ(B)dB +[θ(t)+½θ(BB)]dt;
its partial derivative input parameters:

$$\theta(B)=d/dB \text{ of } \theta(t,B)=\sigma*\theta;$$

$$\theta(BB)=\sigma\^2*\theta; \text{ and } \theta(t)=[r-\frac{1}{2}\sigma\^2]*\theta.$$

This computes as dθ=σ*θ*dB+[(r-½σ^2)θ+(½σ^2)θ]dt, and can be reduced to:

$$d\theta=\sigma*\theta*dB+r*\theta*dt.$$

For normal theta variables, respective only to time and theta:

$$\theta(t)=\theta o*e\^[(r-\frac{1}{2}\sigma\^2)t+(N*\sigma*(\text{sqrt }t)]; \text{ and}$$

$$V(0,T) \text{ as the identity of } \theta(0,T), V(t,0)=V(t)=Vo*e\^$$
$$[(r-\frac{1}{2}\sigma\^2)t+(N*\sigma*(\text{sqrt }t)].$$

This requires only that the natural log of the change in theta, hence, in V, has a characteristic, normal distribution. N represents a sampling off the standard normal distribution, e.g. N=ε=φ.

Monte Carlo simulation is a discrete methodology that is based on the Law of Large Numbers (e.g. in large numbers of sampling sequences). The life of the security is subdivided into n intervals, each of length Δt. Using s≡volatility, and m≡risk-neutral growth rate, of θ:

$$\Delta\theta=m*\theta*\Delta t+s*\theta*\epsilon(\sqrt{\Delta t}), \text{ where each simulation run}$$
$$\text{has } n \text{ drawings, one per } \Delta t.$$

For a multiple state θ: Δθi=mi*θi Δt+si*θi*εi(√Δt), with √Δt: (1≦i≦n). If the θi are correlated, implement correlation between the θi, ρik, and also between the εi and ρik.

The FIG. 91 diagrams the mathematical programming functions for theta variable. The FIG. 92 diagrams the mathematical programming functions for security based on theta.

For further embodiment of theta, and as respective reinsurance and actuarial sciences, see inventor's published work, "Forecasting Expectations of Insured Depository Default and Catastrophic Losses". The publication further elaborates the purposes and mechanics of theta.

Regarding the use of a put-option model for deposit guarantees, i.e. insurance against deposit losses, a deposit insurance guarantee is not isomorphic to an European put option, as any recovery of underwritten (collateralizing) assets, occurs later than the deposit loss occurs. Asset recovery or loss development does not occur simultaneously to default or catastrophe.

An OAS/martingale lattice, featuring the development of recovery or loss over time, implemented in diagram schematic, FIG. 93, an Option Adjusted Spread style lattice. Having an initial node, at t=0, at which node having value at given t, expressed as e(0)=1. From initial node, binary pathing, to the upper node at time t=1, processing 1−M(0) h(1), wherein M is martingale for the given h, and wherein h is distinct time interval, value at upper node of e(1)=1, a state wherein no default or loss occurs; to the lower node at time t=1, processing M(0)h(1), value at lower node of e(1)=E(L), a state where default or loss occurs, wherein E(L) is the risk-neutral expectation of L after asset recovery or loss development.

From the upper node at time t=1, binary pathing: to an upper node at time t=2, processing 1−M(1)h(2), value at upper node of e(2)=1, wherein no default or loss occurs; to a lower node at time t=2, processing M(1)h(2), value at lower node of e(2)=E(L), a state where default or loss occurs. If lower node occurs, follow path relation of lower node at t=1.

From the lower node at time t=1, binary pathing: to an upper node at time t=2, processing 1−R(1)h(2), wherein R is conditional probability of recovery or development for given h, a value of e(2)=E(L')−Expenses, a state wherein recovery or development occurs; to a lower node at time t=2, processing R(1)h(2), value at lower node of e(2)=L, wherein L is the actualized settled value, a state wherein asset recovery or loss development is realized.

The importance of new and useful valuation technologies, such as the above lattice, for the field of insurance, whether for depository banking, catastrophe insurance or other line, as well as new sources of reinsurance industry capital, and new transactions to insure public interests, are made manifest in inventor's published work, "Forecasting Expectations . . . ".

A financial swap transaction, comprising a reciprocal netting transaction, functioning as reciprocal treaty reinsurance between depository banks and Property & Casualty insurers, wherein such swap transaction the banks reinsure insurers against catastrophe losses, paying for such losses as specified under said reciprocal treaty, and wherein the insurers reinsure banks against depository default, paying for such loss amounts as specified under said treaty. Such swap transaction is organized between the FDIC (representing depository banks) and the NAIC (representing P&C insurers), wherein some public funds of the Bank Insurance Fund (BIF), or of the BIF+SAIF (Savings Association Insurance Fund), fund as surplus capital.

Such surplus capital pays the applicable cat loss to insurance industry holders of a cat loss security. Said security pays its holders, such as NAIC members and P&C cat insurers. In turn, said holders pay, through their treaty organizer institution, NAIC, applicable deposit loss to the surplus capital fund managed by the FDIC and the NAIC. Such payment by cat holders, the deposit guarantee, is activated when the FDIC closes an FDIC insured depository bank. The swap enables reciprocal netting at the FDIC/NAIC administered capital. The FIG. 94.

A calculator, portable and pocket-sized, having means for performing computations and for solving equations, including coded resident functions of the financial engineer. The calculator affords every financial professional, whether a financial analyst, actuary, risk or credit manager, in the derivative, bond, stock, mortgage or insurance industry, the requisite hardware environment, housing functional numeric processes, coded applications and reference resource items tailored to the industry requirements of the financial engineer.

Such calculator, is satisfying for mathematical, engineering, statistical disciplines, having an equation solver (by iteration) and a simultaneous equation solver. The calculator is useful starting with the teaching of algebra math to school students, and thus the calculator has a temporary disable feature on memory and/or graphics, for testing sessions. A separate hardware, complementing calculator is a central storage device, to which calculator or multiple calculators connect, to either load from device or store to device.

The calculator, having a resident, on-board memory, and providing an LCD screen and wherein having graphical display and rendering via screen or by output port. Memory includes short coded demonstrations of the calculator's functions and coded mathematical algorithms, demonstrating mathematical formulations, wherein graphing even as artwork. Such short coded demos in on-board or loaded by input port, engage interest in functions.

In addition to said above coded functions, the calculator features a reference compendium, an abbreviated dictionary and encyclopedia of mathematical, scientific and engineering terms, theorems, equations and thinkers, displaying such items on the screen.

General innovative functional aspects of the calculator, the FIGS. 95 through 99. Comprehensive coded financial engineering equations, reference resource items and sources, resident numerical processing and programmed calculating functions, FIG. 100.

The invention claimed is:

1. A method for valuing financial securities, respective endogenous variables of a financial security, said variables comprising Cash receipts (C), Yield (Y) and Time (T), comprising steps of:

utilizing a universal pricing function, said pricing function comprising:

P=f {C, Y, T} where C, Y, and T are variables endogenous to the security

P=Market Price; de facto, empirical or expected market price

C=Cash Receipts; coupon, dividend, premium payments, principal/par

Y=Yield; a single term relating security's return, relative to P, C, T

T=Time; a fixed, expected or continuous measure of said security's life;

determining values of said endogenous variables, respective said security's price, by:

determining a singular yield value for said security or for a basket of securities, utilizing Formula, Yield M, or Yield Md, said Formulae comprising:

$$\text{Yield } M = \frac{\sum (\text{Maturity} \times \text{Portfolio Coefficient} \times \text{Yield–To–Maturity}), \text{ for all issues}}{\sum (\text{Maturity} \times \text{Portfolio Coefficient}), \text{ for all issues}}$$

$$\text{Yield } Md = \frac{\sum (\text{Duration} \times \text{Portfolio Coefficient} \times \text{Yield–To–Maturity}), \text{ for all issues}}{\sum (\text{Duration} \times \text{Portfolio Coefficient}), \text{ for all issues}}$$

where

Issue=Security; All Issues=Securities comprising a basket of securities

Yield M or Yield Md=Governing Yield=Y

Maturity=Time=Maturity in Years, Expected Life, Term of Policy

Portfolio Coefficient=Present Value, per issue/Present Value, Σ issues

Present Value=Cost to Presently Purchase

YTM=Yield-To-Maturity, a means providing yield respective time, where for Single Issue: Portfolio Coefficient is one, Yield M=YTM for Portfolio: said formula creating a single Yield M value of all issues;

solving said security's price using said values of said endogenous variables, or solving third endogenous variable utilizing said security's price and two of three endogenous variables.

2. The method of claim 1, which further comprises the step of coding said Formulae of Yield M or Yield Md, as:

Yield $M=YM=(\text{sum}\{(\text{Maturity}*\text{Portfolio Coefficient}*YTM)_1, (M*PC*YTM)_2, \ldots\})/(\text{sum}\{(\text{Maturity}*\text{Portfolio Coefficient})_1, (M*PC)_2, \ldots\})$;

Yield $Md=YMD=(\text{sum}\{(\text{Duration}*PC*YTM)_1, (D*PC*YTM)_2, \ldots\})/(\text{sum}\{(\text{Duration}*\text{Portfolio Coefficient})_1, (D*PC)_2, \ldots\})$.

3. A method for determining the mathematical valuation and sensitivity functions of a financial security, wherein determining said security's Yield-to-Maturity (YTM), Duration (K) and Convexity (V) values utilizing a precise non-summation form discounting cash receipts, said non-summation form being a continuous differentiable function not comprising summing discounted cash receipts, utilizing said security's endogenous variables of Cash receipts (C), Yield (Y) and Time (T):

determining relation of price to Yield-to-Maturity, utilizing a Formula of:

Price to Yield-to-Maturity, a non-summation form discounting cash receipts:

$$\text{Price} = \frac{C}{Y}\left(1 - (1+Y/2)^{-2T}\right) + (1+Y/2)^{-2T}$$

where C=Coupon Y=YTM T=Maturity (in years), determining relation of Change in Price for Change in Yield, Duration, a precise first derivative deriving by exact differentiation of said non-summation form discounting cash receipts, utilizing Formula of:

Duration, modified annualized, wherein semi-annual C payments:

$$K = \frac{-C}{Y^2}\left(1-(1+Y/2)^{-2T}\right) + \frac{C}{Y}(T+TY/2)^{-2T-1} - (T+TY/2)^{-2T-1}$$

where C=Coupon Y=YTM T=Maturity in Years δY=ΔYield M δP=ΔPrice

Duration, modified annualized, wherein n annual C payments:

$$K \text{ generalized} = \frac{-C}{Y^2}\left(1-(1+Y/n)^{-nT}\right) + \frac{C}{Y}(T+TY/n)^{-nT-1} - (T+TY/n)^{-nT-1}$$

wherein n=# cash receipts per annum, wherein determining semi-annual form as:

$$K = \frac{-C}{Y^2} + \frac{C}{Y^2}(1+Y/2)^{-2T} - (1-C/Y)(T+TY/2)^{-2T-1};$$

determining relation of Change in the Change in Yield, Convexity, a precise second derivative deriving by exact differentiation of said non-summation form discounting cash receipts, utilizing Formula of:

$$\text{Convexity } V = \frac{2C}{Y^3} - \frac{\frac{2C}{Y^3}}{(1+Y/2)^{2T}} - \frac{\frac{CT}{Y^2}}{(1+Y/2)^{2T+1}} - \frac{\frac{C}{Y^2}}{(T+TY/2)^{2T+1}} + \frac{(1+C/Y)(T^2+T/2)}{(T+TY/2)^{2T+2}}$$

wherein calculating V where Y=YTM, Yield M, or, Yield M−YTM basis.

4. The method of claim 3, which further comprises the step of coding said Formula of YTM, as algorithm:

semi-annual $P=PR=((C/Y)*(1-(1+(Y/2))^{\wedge}(-2*T))+(1+(Y/2))^{\wedge}(-2*T)$ where C, Y and P are decimal values, T=Maturity in years, generalized $P=PRBOND=((C/Y)*(1-(1+(Y/N))^{\wedge}(-N*T))+(1+(Y/N))^{\wedge}(-N*T)$ where N=n=cash receipts per annum, wherein semi-annual=2.

5. The method of claim 3, which further comprises the step of coding said Formula of Duration (K), as algorithm:

$K$ semi-annual$=DPDY=((-C/(Y^{\wedge}2))*(1-((1+(0.5*Y))^{\wedge}(-2*T)))+((C/Y)*((T+(0.5*Y*T))^{\wedge}((-2*T)-1)))-((T+(0.5*Y*T))^{\wedge}((-2*T)-1))$ where C and Y are decimal values, T=Maturity in years $K$ generalized$=BONK=((-C/(Y^{\wedge}2))*(1-((1+(Y/N))^{\wedge}(-N*T))))+(((C/Y)-1)*T*((1+(Y/N))^{\wedge}((-N*T)-1)))$ where C and Y are decimal values; N=n=#C periods per annum; T=Maturity in years generalized, alternate formulation $K$ generalized$=BINK=(-C/(Y^{\wedge}2))+((C/(Y^{\wedge}2))*((1+(Y/N))^{\wedge}(-N*T)))$ alternate form $-((1-(C/Y))*((T+((T*Y)/N))^{\wedge}((-N*T)-1)))$.

6. The method of claim 3, which further comprises the step of coding said Formula of Convexity (V), as algorithm:

generalized $V=BONV=(((2*C)/(Y^{\wedge}3))*(1-(1+(Y/N))^{\wedge}(-N*T)))-((C/Y^{\wedge}2)*(2*T)*((1+(Y/N))^{\wedge}((-N*T)-1)))-(((C/Y)-1)*(((N*T)+1)*(T/N))*((1+(Y/N))^{\wedge}((-N*T)-2)))$ where C and Y are decimal values; N=n=#C periods per annum; T=Maturity in years spread-based, semi-annual $V=VEXA=(((2*C)/(Y^{\wedge}3))-(((2*C)/(Y^{\wedge}3))*((1+(Y/2))^{\wedge}(-2*T)))-((C*T)/(Y^{\wedge}2))*((1+(Y/2))^{\wedge}((-2*T)-1))-((C/(Y^{\wedge}2))*((T+(T*(Y/2)))^{\wedge}((-2*T)-1)))+((1+(C/Y))*((T^{\wedge}2)+(T/2))*((T+(T*(Y/2)))^{\wedge}((-2*T)-2))))/10000$ where Y=spread=YieldM—YTM, expressed in decimal, wherein if Y=0.14%=0.14 where Y=Yield M, expressed in decimal, wherein if Y=Yield M=6.06%=0.0606 spread-based, generalized $V=VEX=(((2*C)/(Y^{\wedge}3))-(((2*C)/(Y^{\wedge}3))*((1+(Y/N))^{\wedge}(-N*T)))-((C*T)/(Y^{\wedge}2))*((1+(Y/N))^{\wedge}((-N*T)-1))-((C/(Y^{\wedge}2))*((T+(T*(Y/N)))^{\wedge}((-N*T)-1)))+((1+(C/Y))*((T^{\wedge}2)+(T/N))*((T+(T*(Y/N)))^{\wedge}((-N*T)-2))))/10000$ where Y=Yield M, expressed in decimal, wherein if Y=Yield M=6.06%=0.0606.

7. A process for computing financial data using endogenous variables of a financial security, wherein said financial security comprising a bond, equity or insurance policy, comprising:

identifying data values for the security's endogenous variables, of C, Y, and T, wherein said variable C comprises cash receipts, and wherein said variable Y comprises yield, and wherein said variable T comprises time-to-maturity, expected life, or a fixed term;

determining governing yield, for a single security issue, wherein applying processing function Yield M (or Md), determining yield-to-maturity per summation form or per non-summation form, wherein:

function of yield-to-maturity, a summation form of discounted cash receipts:

$$\text{Price} = \frac{C}{2}\sum_{T=1}^{2T}(1+Y/2)^{-T}+(1+Y/2)^{-2T}$$

where C=Coupon Y=YTM T=Maturity (in years), wherein as coded computational processing algorithm:

Price=P=(C/2)*(sum{(((1+(Y/2))^(-T))+((1+(Y/2)^(-2*T)))₁,(((1+(Y/2)^(-T))+((1+(Y/2)^(-2*T)))₂, ... })

where semi-annual coupon payments (2 per annum);

Price=P=(C/N)*(sum{(((1+(Y/N))^(-T))+((1+(Y/N)^(-N*T)))₁,(((1+(Y/N)^(-T))+((1+(Y/N)^(-N*T)))₂, ... })

where N-annual coupon payments (N per annum);

function of yield-to-maturity, a non-summation form of discounted cash receipts:

$$\text{Price} = \frac{C}{Y}(1-(1+Y/2)^{-2T})+(1+Y/2)^{-2T}$$

where C=Coupon Y=YTM T=Maturity (in years), wherein as coded computational processing algorithm:

semi-annual P=PR=((C/Y)*(1−(1+(Y/2))^(-2*T))+(1+(Y/2))^(-2*T)

where C, Y and P are decimal values, T=Maturity in years, generalized P=PRBOND=((C/Y)*(1−(1+(Y/N))^(-N*T))+(1+(Y/N))^(-N*T)

where N=n=cash receipts per annum, semi-annual=2;

function of governing yield, a singular universal form for securities:

$$\text{Yield } M = \frac{\sum(\text{Maturity}\times\text{Portfolio Coefficient}\times\text{Yield-To-Maturity}),\ \text{for all issues}}{\sum(\text{Maturity}\times\text{Portfolio Coefficient}),\ \text{for all issues}}$$

wherein Yield M as coded computational processing algorithm:

Yield M=YM=(sum{(Maturity*Portfolio Coefficient*YTM)₁, (M*PC*YTM)₂, ... })/(sum{(Maturity*Portfolio Coefficient)₁, (M*PC)₂, ... });

$$\text{Yield } Md = \frac{\sum(\text{Duration}\times\text{Portfolio Coefficient}\times\text{Yield-To-Maturity}),\ \text{for all issues}}{\sum(\text{Duration}\times\text{Portfolio Coefficient}),\ \text{for all issues}}$$

wherein Yield Md as coded computational processing algorithm:

Yield Md=YMD=(sum{(Duration*PC*YTM)₁, (D*PC*YTM)₂, ... })/(sum{(Duration*Portfolio Coefficient)₁, (D*PC)₂, ... })

where

Issue=Security; All Issues=Securities comprising a basket of securities

Yield M=Governing Yield=Y

Maturity=Time=Maturity in Years, Expected Life, Term of Policy

Portfolio Coefficient=Present Value, per issue/Present Value, Σissues

Present Value=Cost to Presently Purchase

YTM=Yield-To-Maturity, a means providing yield respective time, determining YTM by summation or non-summation form, for Single Issue: Portfolio Coefficient is one, Yield M=YTM for Portfolio: the Yield M functions create a single Yield M value of all issues;

determining arbitrage spreads between Yield M and spot, and Yield M and YTM, wherein said arbitrage spread comprising a differential between Yield M and spot, or YTM;

determining measures of the security's pricing sensitivities, duration and convexity, as Taylor series first and second order terms, or as first and second derivatives, respectively, wherein:

function of change in price for change in yield, duration, a first order term of a Taylor series approximation to deriving the first derivative of summed discounted cash receipts, wherein said Taylor series being a standard numerical method providing a derivative approximation:

Duration, modified annualized:

$$(\text{Duration})\ \text{Durmodan} = \frac{\frac{C}{Y^2}\left[1-\frac{1}{(1+Y)^{2T}}\right]+\frac{2T(100-C/Y)}{(1+Y)^{2T+1}}}{2P}$$

where $D = \Delta P/\Delta YTM$ $Y = YTM$ $T = \text{Mat. in Years}$ $C = \text{Coupon}$ $P = \text{Price }(par = 100)$, wherein as coded computational processing algorithms:

semi-annual Durmodan=DURMOD=((((C/2)/((Y/2)^2))*(1−(1/((1+(Y/2))^(2*T))))+((2*T)*(100−((C/2)/(Y/2))))/((1+(Y/2))^((2*T)+1))))/(2*P)

where P=Price (of 100)

generalized Durmodan=DURMD=((((C/N)/((Y/N)^2))*(1−(1/((1+(Y/N))^(N*T))))+(((N*T)*(100−((C/N)/(Y/N))))/((1+(Y/N))^((N*T)+1))))/(2*P)

where N=n=# C periods per annum; semi-annual=2; T=Maturity in years;

function of change in the change in yield, convexity, a second order term of a Taylor series approximation to deriving the first derivative of summed discounted cash receipts, wherein said Taylor series being a standard numerical method providing a derivative approximation:

(Convexity) Convex =

$$\frac{\frac{2C}{Y^3}\left[1-\frac{1}{(1+Y)^{2T}}\right]+\frac{2C(2T)}{Y^2(1+Y)^{2T+2}}+\frac{2T(2T+1)(100-C/Y)}{(1+Y)^{2T+2}}}{4P}$$

wherein as coded computational processing algorithms:

semi-annual Convex=CON=(((C/((Y/2)^3))*(1−(1/((1+(Y/2))^(2*T)))))−((C*(2*T))/(((Y/2)^2)*((1+(Y/2))^((2*T)+1))))+(((2*T)*((2*T)+1)*(100−(C/Y)))/((1+(Y/2))^((2*T)+2))))/(4*P)

generalized Convex=CONDP=(((C/((Y/N)^3))*(1−(1/((1+(Y/N))^(N*T)))))−((C*(N*T))/(((Y/N)^2)*((1+(Y/N))^((N*T)+1))))+(((N*T)*((N*T)+1)*(100−(C/Y)))/((1+(Y/N))^((N*T)+2))))/(4*P)

where N=n=# C periods per annum; semi-annual=2; T=Maturity in years;

and wherein:

function of change in price for change in yield, duration, a precise first derivative deriving by exact differentiation of said non-summation form function discounting cash receipts, utilizing endogenous variables C, Y, T only:

Duration, modified annualized, semi-annual C:

$$K = \frac{-C}{Y^2}(1-(1+Y/2)^{-2T}) + \frac{C}{Y}(T+TY/2)^{-2T-1} - (T+TY/2)^{-2T-1}$$

where C=Coupon Y=YTM T=Maturity in Years δY=ΔYield M δP=ΔPrice

Duration, modified annualized, wherein n annual C payments:

$K$ generalized =

$$\frac{-C}{Y^2}(1-(1+Y/n)^{-nT}) + \frac{C}{Y}(T+TY/n)^{-nT-1} - (T+TY/n)^{-nT-1}$$

where n=# cash receipts per annum, wherein semi-annual form is determined as:

$$K = \frac{-C}{Y^2} + \frac{C}{Y^2}(1+Y/2)^{-2T} - (1-C/Y)(T+TY/2)^{-2T-1}$$

wherein as coded computational processing algorithms:

K semi-annual=DPDY=((−C/(Y^2))*(1−((1+(0.5*Y))^(−2*T))))+((C/Y)*((T+(0.5*Y*T))^((−2*T)−1)))−((T+(0.5*Y*T))^((−2*T)−1))

where C and Y are decimal values, T=Maturity in years

K generalized=BONK=((−C/(Y^2))*(1−((1+(Y/N))^(−N*T))))+(((C/Y)−1)*T*((1+(Y/N))^((−N*T)−1)))

where C and Y are decimal values; N=n=#C periods per annum; T=Maturity in years generalized, alternate formulation K generalized=BINK=(−C/(Y^2))+((C/(Y^2))*((1+(Y/N))^(−N*T)))alternate form−((1−(C/Y))*((T+((T*Y)/N))^((−N*T)−1)));

function of change in the change in yield, convexity, a precise second derivative deriving by exact differentiation of said non-summation form function discounting cash receipts, utilizing endogenous variables C, Y, T only:

$$\text{Convexity } V = \frac{2C}{Y^3} - \frac{\frac{2C}{Y^3}}{(1+Y/2)^{2T}} - \frac{\frac{CT}{Y^2}}{(1+Y/2)^{2T+1}} - \frac{\frac{C}{Y^2}}{(T+TY/2)^{2T+1}} + \frac{(1+C/Y)(T^2+T/2)}{(T+TY/2)^{2T+2}}$$

wherein V can be calculated where Y=YTM, Yield M, or, Yield M−YTM basis, wherein as coded computational processing algorithms:

generalized

V=BONV=(((2*C)/(Y^3))*(1−(1+(Y/N))^(−N*T)))−((C/Y^2)*(2*T)*((1+(Y/N))^((−N*T)−1)))−(((C/Y)−1)*(((N*T)+1)*(T/N))*((1+(Y/N))^((−N*T)−2)))

where C and Y are decimal values; N=n=#C periods per annum; T=Maturity in years spread-based, semi-annual V=VEXA=(((2*C)/(Y^3))−(((2*C)/(Y^3))*((1+(Y/2))^(−2*T)))−((C*T)/(Y^2))*((1+(Y/2))^((−2*T)−1)))−((C/(Y^2))*(T+(T*(Y/2)))^((−2*T)−1)))+((1+(C/Y))*((T^2)+(T/2))*((T+(T*(Y/2)))^((−2*T)−2))))/10000 where Y=spread=YieldM—YTM, expressed in decimal, wherein if Y=0.14%=0.14 where Y=Yield M, expressed in decimal, wherein if Y=Yield M=6.06%=0.0606 spread-based, generalized

V=VEX=(((2*C)/(Y^3))−(((2*C)/(Y^3))*((1+(Y/N))^(−N*T)))−((C*T)/(Y^2))*((1+(Y/N))^((−N*T)−1)))−((C/(Y^2))*(T+(T*(Y/N)))^((−N*T)−1)))+((1+(C/Y))*((T^2)+(T/N))*((T+(T*(Y/N)))^((−N*T)−2))))/10000 where Y=Yield M, expressed in decimal, wherein if Y=Yield M=6.06%=0.0606.

8. A process for estimating change in price of a security, or of an aggregated portfolio, respective change in yield, instantaneous or as occurring over a discrete time, comprising:

utilizing data values of said security's Yield M or Md, Duration K, and Convexity V, wherein said Yield M or Md, Duration K and Convexity V computing by operating mathematical processing codes in computer systems and computational devices, wherein:

$$\text{Yield } M = \frac{\sum(\text{Maturity} \times \text{Portfolio Coefficient} \times \text{Yield-To-Maturity}), \text{ for all issues}}{\sum(\text{Maturity} \times \text{Portfolio Coefficient}), \text{ for all issues}}$$

wherein as coded computational processing algorithm:

Yield $M$=YM=(sum{(Maturity*Portfolio Coefficient*YTM)$_1$, $(M*PC*YTM)_2$, ... })/(sum{(Maturity*Portfolio Coefficient)$_1$, $(M*PC)_2$, ... })

$$\text{Yield } Md = \frac{\sum (\text{Duration} \times \text{Portfolio Coefficient} \times \text{Yield-To-Maturity}), \text{ for all issues}}{\sum (\text{Duration} \times \text{Portfolio Coefficient}), \text{ for all issues}}$$

wherein as coded computational processing algorithm:

Yield $Md$=$YMD$=(sum{(Duration*$PC$*$YTM$)$_1$, ($D$*$PC$*$YTM$)$_2$, ... })/(sum{(Duration*Portfolio Coefficient)$_1$, ($D$*$PC$)$_2$, ... })

where
  Issue=Security; All Issues=Securities comprising a basket of securities
  Yield M=Governing Yield=Y
  Maturity=Time=Maturity in Years, Expected Life, Term of Policy
  Portfolio Coefficient=Present Value, per issue/Present Value, Σ issues
  Present Value=Cost to Presently Purchase
  YTM=Yield-To-Maturity, a means providing yield respective time,
    determining YTM by summation or non-summation form,
  for Single Issue: Portfolio Coefficient is one, Yield M=YTM
  for Portfolio: the Yield M functions create a single Yield M value of all issues;
Duration, modified annualized, semi-annual C:

$$K = \frac{-C}{Y^2}(1-(1+Y/2)^{-2T}) + \frac{C}{Y}(T+TY/2)^{-2T-1} - (T+TY/2)^{-2T-1}$$

where C=Coupon Y=YTM T=Maturity in Years δY=ΔYield M δP=ΔPrice
  Duration, modified annualized, wherein n annual C payments:

$K$ generalized =

$$\frac{-C}{Y^2}(1-(1+Y/n)^{-nT}) + \frac{C}{Y}(T+TY/n)^{-nT-1} - (T+TY/n)^{-nT-1}$$

wherein n=# cash receipts per annum, whereas semi-annual form is written as:

$$K = \frac{-C}{Y^2} + \frac{C}{Y^2}(1+Y/2)^{-2T} - (1-C/Y)(T+TY/2)^{-2T-1}$$

wherein as coded computational processing algorithms:

$K$ semi-annual=$DPDY$=((-$C$/($Y$^2))*(1-((1+(0.5*$Y$))^(-2*$T$))))+(($C$/$Y$)*(($T$+(0.5*$Y$*$T$))^((-2*$T$)-1)))-(($T$+(0.5*$Y$*$T$))^((-2*$T$)-1))

where C and Y are decimal values, T=Maturity in years $K$ generalized=$BONK$=((-$C$/($Y$^2))*(1-((1+($Y$/$N$))^(-$N$*$T$))))+((($C$/$Y$)-1)*$T$*((1+($Y$/$N$))^((-$N$*$T$)-1)))

where C and Y are decimal values; N=n=#C periods per annum; T=Maturity in years generalized, alternate formulation $K$ generalized=$BINK$=(-$C$/($Y$^2))+(($C$/($Y$^2))*((1+($Y$/$N$))^(-$N$*$T$)))alternate form=((1-($C$/$Y$))*(($T$+(($T$*$Y$)/$N$))^((-$N$*$T$)-1)));

$$\text{Convexity } V = \frac{2C}{Y^3} - \frac{\frac{2C}{Y^3}}{(1+Y/2)^{2T}} - \frac{\frac{CT}{Y^2}}{(1+Y/2)^{2T+1}} - \frac{\frac{C}{Y^2}}{(T+TY/2)^{2T+1}} + \frac{(1+C/Y)(T^2+T/2)}{(T+TY/2)^{2T+2}}$$

wherein V can be calculated where Y=YTM, Yield M, or, Yield M−YTM basis,
wherein as coded computational processing algorithms:
generalized $V$=$BONV$=(((2*$C$)/($Y$^3))*(1-(1+($Y$/$N$))^(-$N$*$T$)))-(($C$/$Y$^2)*(2*$T$)*((1+($Y$/$N$))^((-$N$*$T$)-1)))-((($C$/$Y$)-1)*((($N$*$T$)+1)*($T$/$N$))*((1+($Y$/$N$))^((-$N$*$T$)-2)))

where C and Y are decimal values; N=n=#C periods per annum; T=Maturity in years
spread-based, semi-annual $V$=$VEXA$=(((2*$C$)/($Y$^3))-(((2*$C$)/($Y$^3))*((1+($Y$/2))^(-2*$T$)))-(($C$*$T$)/($Y$^2))*((1+($Y$/2))^((-2*$T$)-1))-(($C$/($Y$^2))*(($T$+($T$*($Y$/2)))^((-2*$T$)-1)))+((1+($C$/$Y$))*(($T$^2)+($T$/2))*(($T$+($T$*($Y$/2)))^((-2*$T$)-2))))/10000 where Y=spread=YieldM−YTM, expressed in decimal, wherein if Y=0.14%=0.14
where Y=Yield M, expressed in decimal, wherein if Y=Yield M=6.06%=0.0606
spread-based, generalized $V$=$VEX$=(((2*$C$)/($Y$^3))-(((2*$C$)/($Y$^3))*((1+($Y$/$N$))^(-$N$*$T$)))-(($C$*$T$)/($Y$^2))*((1+($Y$/$N$))^((-$N$*$T$)-1))-(($C$/($Y$^2))*(($T$+($T$*($Y$/$N$)))^((-$N$*$T$)-1)))+((1+($C$/$Y$))*(($T$^2)+($T$/$N$))*(($T$+($T$*($Y$/$N$)))^((-$N$*$T$)-2))))/10000 where Y=Yield M, expressed in decimal, wherein if Y=Yield M=6.06%=0.0606;
identifying change in said Yield M data value at instant or as occurring over time, wherein measuring, entering or updating input values of variables determining Yield M value;
calculating change in price of the security given said change in said Yield M by implementing factorization, wherein utilizing K for duration, Δ Price, due to Duration (K):

A: ΔPrice, due to Duration ($K$)=$K$×Δ$Y$;

calculating change in price of the security given said change in said Yield M by implementing factorization, wherein utilizing V for convexity, Δ Price, due to Convexity (V):

B: ΔPrice, due to Convexity ($V$)=½×$V$×(Δ$Y$)$^2$;

summing values determined by A+B, wherein comprising Δ Price, due to K and V:

Δ Price=($K$×Δ$Y$)+(½$V$×(Δ$Y$)$^2$);

determining arbitrage spread of computed Δ Price versus actual notched Δ Price, wherein calculating a differential between said computed and said actual notched Δ Price;

sending said determined and calculated Yield M or MD, K and V values, and said computed and actual Δ Price, and arbitrage spread to output, monitor, storage or further process.

9. The process of claim 8, which further comprises applying a universal factorization:

$$\Delta Price = (-|Duration| \times \delta Y) + (\tfrac{1}{2} \times Convexity \times (\delta Y)^2);$$

wherein $\delta Y \cong \Delta Y$, and wherein $\Delta Y = \Delta$Yield M or $\Delta$Yield-to-Maturity, wherein ΔYield-to-Maturity=YTM as non-summation, or as summation, form:

function of yield-to-maturity, a non-summation form of discounted cash receipts:

$$Price = \frac{C}{Y}(1-(1+Y/2)^{2T}) + (1+Y/2)^{-2T}$$

where $C$ = Coupon  $Y$ = YTM  $T$ = Maturity (in years), wherein as coded computational processing algorithm:

semi-annual $P=PR=((C/Y)*(1-(1+(Y/2))^\wedge(-2*T))+(1+(Y/2))^\wedge(-2*T)$ where C, Y and P are decimal values, T=Maturity in years, generalized $P=PRBOND=((C/Y)*(1-(1+(Y/N))^\wedge(-N*T))+(1+(Y/N))^\wedge(-N*T)$ where N=n=cash receipts per annum, wherein semi-annual=2;

function of yield-to-maturity, a summation form of discounted cash receipts:

$$Price = \frac{C}{2}\sum_{T=1}^{2T}(1+Y/2)^{-T} + (1+Y/2)^{-2T}$$

where C=Coupon Y=YTM T=Maturity (in years), wherein as coded computational processing algorithm:

$Price=P=(C/2)*(sum\{((1+(Y/2))^\wedge(-T))+((1+(Y/2)^\wedge(-2*T)))_1,(((1+(Y/2)^\wedge(-T))+((1+(Y/2)^\wedge(2*T)))_2, \ldots \})$ where semi-annual coupon payments (2 per annum);

$Price=P=(C/N)*(sum\{((1+(Y/N))^\wedge(-T))+((1+(Y/N)^\wedge(-N*T)))_1,(((1+(Y/N)^\wedge(-T))+((1+(Y/N)^\wedge(-N*T)))_2, \ldots \})$ where N-annual coupon payments (N per annum);

and wherein Duration=K, or as = a first order Taylor series approximation of first derivative of summation form YTM, wherein said first order approximation comprising:

$$(Duration) \; Durmodan = \frac{\frac{C}{Y^2}\left[1-\frac{1}{(1+Y)^{2T}}\right]+\frac{2T(100-C/Y)}{(1+Y)^{2T+1}}}{2P}$$

where $D = \Delta P / \Delta YTM$ $Y = YTM$ $T$ = Mat. in Years

-continued $C$ = Coupon $P$ = Price ($par$ = 100), wherein as coded computational processing algorithms:

semi-annual $Durmodan=DURMOD=(((C/2)/((Y/2)^\wedge 2))*(1-(1/((1+(Y/2))^\wedge(2*T))))+((2*T)*(100-((C/2)/(Y/2)))/((1+(Y/2))^\wedge((2*T)+1))))/(2*P)$ where P=Price (of 100)

generalized $Durmodan=DURMD=(((C/N)/((Y/N)^\wedge 2))*(1-(1/((1+(Y/N))^\wedge(N*T))))+((N*T)*(100-((C/N)/(Y/N)))/((1+(Y/N))^\wedge((N*T)+1))))/(2*P)$ where N=n=# C periods per annum, where semi-annual=2; T=Maturity in years;

and wherein Convexity=V, or as = a second order Taylor series term, comprising a second derivative approximation of summation form YTM, wherein said second order term:

$$(Convexity) \; Convex = \frac{\frac{2C}{Y^3}\left[1-\frac{1}{(1+Y)^{2T}}\right]+\frac{2C(2T)}{Y^2(1+Y)^{2T+2}}+\frac{2T(2T+1)(100-C/Y)}{(1+Y)^{2T+2}}}{4P}$$

wherein as coded algorithm:

semi-annual $Convex=CON=(((C/((Y/2)^\wedge 3))*(1-(1/((1+(Y/2))^\wedge(2*T))))-((C*(2*T)/(((Y/2)^\wedge 2)*(1+(Y/2))^\wedge((2*T)+1))))+(((2*T)*(2*T)+1)*(100-(C/Y))/((1+(Y/2))^\wedge((2*T)+2))))/(4*P)$ generalized $Convex=CONDP=(((C/((Y/N)^\wedge 3))*(1-(1/((1+(Y/N))^\wedge(N*T))))-((C*(N*T)/(((Y/N)^\wedge 2)*(1+(Y/N))^\wedge((N*T)+1))))+(((N*T)*(N*T)+1)*(100-(C/Y))/((1+(Y/N))^\wedge((N*T)+2))))/(4*P)$ where N=n=# C periods per annum, where semi-annual=2; T=Maturity in years.

10. The process of claim 8, which further comprises adding a derivative respecting time, and further comprises adding any accrued interest, wherein using dirty (full) price in A and B:

$\Delta P=A+B+C+D$ wherein,

ΔP=change in bid price, for given changes in yield and time,

A=−abs(Duration)×Price(dirty)×ΔY

B=½×Convexity×Price(dirty)×(ΔY)²

C=Theta×Price(dirty)×Δt

D=−(Δ Accrued Interest, for given Δt), and wherein,

Y (YTM), by Formula Yield M, or Yield Md, or YTM by non-summation or by summation form function, Duration by Formula K, or by first term Taylor series approximation, Convexity by Formula V, or by second term Taylor series approximation, Theta (θ), such a theta: θ=2 ln(1+r/2), wherein r=ytm or Yield M, Price (dirty) equals bid price plus accumulated interest, Δt is elapsed time between two points whereby estimations are made, ΔP rounded to nearest pricing gradient, ΔP occurring Δt, determining arbitrage spread of computed Δ Price versus actual notched Δ Price.

11. A process for valuing a financial portfolio, containing more than one divisible issue, wherein an issue is a security and a portfolio comprises all issues comprising said portfolio, by singular portfolio (P) data values of endogenous variables $C^P$, $Y^P$, $T^P$, comprising:

identifying data values for each issue's endogenous variables of C, Y, T, wherein:
  C=Cash Receipts, periodic coupon, dividend or premium payments
  Y=Yield, a single term relating security's return, relative to P, C, T
  T=Time=Maturity in Years, Expected Life, Term of Policy;

generating portfolio coefficients for each issue in portfolio, by:

Portfolio Coefficient, per each Issue=Present Value$^I$/Present Value$^P$;

Present Value$^I$=(AI+(Bid Price×Face Value)), per Issue (I);

Present Value$^P$=Σ(AI+(Bid Price×Face Value), for all Issues;

generating aggregate portfolio (P) data relating portfolio's value, by:

Present Value$^P$=Σ(AI+(Bid Price×Face Value)), for all Issues;

Accrued Interest$^P$=ΣAccrued Interest, AI, for all Issues;

Face Value$^P$=ΣFace Value, for all Issues;

Implied Price$^P$=(Present Value$^P$−AI$^P$)/Σ Face Value for all Issues;

generating aggregate portfolio (P) data relating portfolio's variables:

$C^P$=Cash Flow$^P$=ΣC×Portfolio Coefficient, for all Issues;

$T^P$=Time$^P$=ΣMaturity×Portfolio Coefficient, for all Issues;

$Y^P$=Yield$^P$=ΣYield×Portfolio Coefficient, for all Issues;

if for a portfolio of U.S. Treasury issues, $C^P$, $Y^P$, $T^P$ comprising:

$C^P$=Coupon$^P$=ΣCoupon×Portfolio Coefficient, for all Issues;

$T^P$=Maturity$^P$=ΣMaturity×Portfolio Coefficient, for all Issues;

$Y^P$=Yield$^P$=ΣYield×Portfolio Coefficient, for all Issues;

computing portfolio's duration and convexity:

Duration$^P$=ΣDuration×Portfolio Coefficient, for all Issues;

Convexity$^P$=ΣConvexity×Portfolio Coefficient, for all Issues.

or utilizing portfolio values, $C^P$, $Y^P$, $T^P$, computing Duration and Convexity.

12. The process of claim 11, which further comprises establishing a governing yield value for said portfolio, wherein said value also representing a yield value relative a spot or forward curve, said value calculating by Formula, Yield M, or Formula, Yield Md:

$$\text{Yield } M = \frac{\sum(\text{Maturity} \times \text{Portfolio Coefficient} \times \text{Yield-To-Maturity}), \text{ for all issues}}{\sum(\text{Maturity} \times \text{Portfolio Coefficient}), \text{ for all issues}}$$

wherein as coded algorithm:

Yield $M$=$YM$=(sum{(Maturity*Portfolio Coefficient*$YTM$)$_1$, ($M*PC*YTM$)$_2$, ... })/(sum{(Maturity*Portfolio Coefficient)$_1$, ($M*PC$)$_2$, ... });

$$\text{Yield } Md = \frac{\sum(\text{Duration} \times \text{Portfolio Coefficient} \times \text{Yield-To-Maturity}), \text{ for all issues}}{\sum(\text{Duration} \times \text{Portfolio Coefficient}), \text{ for all issues}}$$

wherein as coded algorithm:

Yield $Md$=$YMD$=(sum{(Duration*$PC*YTM$)$_1$, ($D*PC*YTM$)$_2$, ... })/(sum{(Duration*Portfolio Coefficient)$_1$, ($D*PC$)$_2$, ... })

where
  Issue=Security; All Issues=Securities comprising a portfolio of securities
  Yield M=Governing Yield=Y
  Maturity=Time=Maturity in Years, Expected Life, Term of Policy
  Portfolio Coefficient=Present Value, per issue/Present Value, Σissues
  Present Value=Cost to Presently Purchase
  YTM=Yield-To-Maturity, a means providing yield respective time.

13. An apparatus, generating and computing financial data, an analytic valuation engine, comprising:
  means to input values from a data-feed, stored memory or by hand-entry, for a security, or for securities in a portfolio, with respect to endogenous variables C, Y and T, wherein C comprising interest coupons, dividend payments or insurance premiums, and wherein Y comprising a single term relating said security's return respective price, C and T, and wherein T comprising maturity in years, expected life, or term of a policy;
  means for calculating governing yield, Yield M, for security or for portfolio, wherein applying coded calculation algorithm calculating Yield M, said Yield M comprising:
    function of governing yield, a singular universal form for securities $$\text{Yield } M = \frac{\sum(\text{Maturity} \times \text{Portfolio Coefficient} \times \text{Yield-To-Maturity}), \text{ for all issues}}{\sum(\text{Maturity} \times \text{Portfolio Coefficient}), \text{ for all issues}}$$

where Issue=Security; All Issues=Securities comprising a portfolio of securities
wherein Yield M as coded algorithm:

Yield $M$=$YM$=(sum{(Maturity*Portfolio Coefficient*$YTM$)$_1$, ($M*PC*YTM$)$_2$, ... })/(sum{(Maturity*Portfolio Coefficient)$_1$, ($M*PC$)$_2$, ... });

means for sending said calculated value to a user monitor, storage or to a display screen;

means for computing said security's market yield values using coded algorithms:

function of yield-to-maturity, a summation form of discounted cash receipts:

$$Price = \frac{C}{2}\sum_{T=1}^{2T}(1+Y/2)^{-T} + (1+Y/2)^{-2T}$$

where C=Coupon Y=YTM T=Maturity (in years), wherein as coded computational processing algorithm:

Price=P=(C/2)*(sum{(((1+(Y/2))^(-T))+((1+(Y/2)^(-2*T)))₁,(((1+(Y/2)^(-T))+((1+(Y/2)^(-2*T)))₂, ... } where semi-annual coupon payments (2 per annum);

Price=P=(C/N)*(sum{(((1+(Y/N))^(-T))+((1+(Y/N)^(-N*T)))₁,(((1+(Y/N)^(-T))+((1+(Y/N)^(-N*T)))₂, ... })

where N-annual coupon payments (N per annum); or function of yield-to-maturity, a non-summation form of discounted cash receipts:

$$Price = \frac{C}{Y}(1-(1+Y/2)^{-2T}) + (1+Y/2)^{-2T}$$

where C=Coupon Y=YTM T=Maturity (in years), wherein as coded computational processing algorithm:

semi-annual P=PR=((C/Y)*(1-(1+(Y/2))^(-2*T))+(1+(Y/2))^(-2*T)

where C, Y and P are decimal values, T=Maturity in years, generalized P=PRBOND=((C/Y)*(1-(1+(Y/N))^(-N*T))+(1+(Y/N))^(-N*T)

where N=n=cash receipts per annum, semi-annual=2;

means for sending governing yield value and market yield values to processing, wherein computing duration, convexity and theta of said security, wherein comprising utilizing applicable coded computational algorithms:

function of duration, modified annualized, semi-annual C:

$$K = \frac{-C}{Y^2}(1-(1+Y/2)^{-2T}) + \frac{C}{Y}(T+TY/2)^{-2T-1} - (T+TY/2)^{-2T-1}$$

where C=Coupon Y=YTM T=Maturity in Years δY=ΔYieldM δP=ΔPrice function of duration, modified annualized, wherein n annual C payments:

$$K \text{ generalized} = \frac{-C}{Y^2}(1-(1+Y/n)^{-nT}) + \frac{C}{Y}(T+TY/n)^{-nT-1} - (T+TY/n)^{-nT-1}$$

wherein n=# cash receipts per annum, whereas semi-annual form can also be written:

$$K = \frac{-C}{Y^2} + \frac{C}{Y^2}(1+Y/2)^{-2T} - (1-C/Y)(T+TY/2)^{-2T-1}$$

wherein as coded computational processing algorithms:

K semi-annual=DPDY=((-C/(Y^2))*(1-(1+(0.5*Y))^(-2*T)))+((C/Y)*((T+(0.5*Y*T))^((-2*T)-1)))-((T+(0.5*Y*T))^((-2*T)-1))

where C and Y are decimal values, T=Maturity in years

K generalized=BONK=((-C/(Y^2))*(1-((1+(Y/N))^(-N*T))))+(((C/Y)-1)*T*((1+(Y/N))^((N*T)-1)))

where C and Y are decimal values; N=n=#C periods per annum; T=Maturity in years generalized, alternate formulation:

K generalized=BINK=(-C/(Y^2))+((C/(Y^2))*((1+(Y/N))^(-N*T)))alternate form-((1-(C/Y))*((T+((T*Y)/N))^((-N*T)-1)));

function of convexity, semi-annual C:

$$\text{Convexity } V = \frac{2C}{Y^3} - \frac{\frac{2C}{Y^3}}{(1+Y/2)^{2T}} - \frac{\frac{CT}{Y^2}}{(1+Y/2)^{2T+1}} - \frac{\frac{C}{Y^2}}{(T+TY/2)^{2T+1}} + \frac{(1+C/Y)(T^2+T/2)}{(T+TY/2)^{2T+2}}$$

wherein V can be calculated where Y=YTM, Yield M, or, Yield M–YTM basis, wherein as coded computational processing algorithms:

generalized

V=BONV=(((2*C)/(Y^3))*(1-(1+(Y/N))^(-N*T)))-((C/(Y^2))*(2*T)*((1+(Y/N))^((-N*T)-1)))-(((C/Y)-1)*(((N*T)+1)*(T/N))*((1+(Y/N))^((-N*T)-2)))

where C and Y are decimal values; N=n=#C periods per annum; T=Maturity in years spread-based, semi-annual V=VEXA=(((2*C)/(Y^3))-(((2*C)/(Y^3))*((1+(Y/2))^(-2*T)))-((C*T)/(Y^2))*((1+(Y/2))^((-2*T)-1))-((C/(Y^2))*((T+(T*(Y/2)))^((-2*T)-1)))+((1+(C/Y))*((T^2)+(T/2))*((T+(T*(Y/2)))^((-2*T)-2))))/10000 where Y=spread=YieldM—YTM, expressed in decimal, wherein if Y=0.14%=0.14 where Y=Yield M, expressed in decimal, wherein if Y=Yield M=6.06%=0.0606 spread-based, generalized

V=VEX=(((2*C)/(Y^3))-(((2*C)/(Y^3))*((1+(Y/N))^(-N*T)))-((C*T)/(Y^2))*((1+(Y/N))^((-N*T)-1))-((C/(Y^2))*((T+(T*(Y/N)))^((-N*T)-1)))+((1+(C/Y))*((T^2)+(T/N))*((T+(T*(Y/N)))^((-N*T)-2))))/10000 where Y=Yield M, expressed in decimal, wherein if Y=Yield M=6.06%=0.0606;

wherein comprising, if using market yield summation form, utilizing coded algorithms:

function of duration, modified annualized, semi-annual C:

$$\text{(Duration) Durmodan} = \frac{\frac{C}{Y^2}\left[1 - \frac{1}{(1+Y)^{2T}}\right] + \frac{2T(100 - C/Y)}{(1+Y)^{2T+1}}}{2P}$$

where $D = \Delta P / \Delta YTM$ $Y = YTM$ $T = $ Mat. in Years $C = $ Coupon $P = $ Price ($par = 100$), wherein as coded computational processing algorithms:

semi-annual Durmodan=$DURMOD$=(((($C/2$)/(($Y/2$)^2))*(1-(1/((1+($Y/2$))^($2*T$))))+(($2*T$)*(100-(($C/2$)/($Y/2$))))/((1+($Y/2$))^(($2*T$)+1))))/($2*P$)

where P=Price (of 100)

generalized Durmodan=$DURMD$=(((($C/N$)/(($Y/N$)^2))*(1-(1/((1+($Y/N$))^($N*T$))))+((($N*T$)*(100-(($C/N$)/($Y/N$))))/((1+($Y/N$))^(($N*T$)+1))))/($2*P$)

where N=n=# C periods per annum; semi-annual=2; T=Maturity in years;
function of convexity, semi-annual C:

$$\text{(Convexity) Convex} = \frac{\frac{2C}{Y^3}\left[1 - \frac{1}{(1+Y)^{2T}}\right] + \frac{2C(2T)}{Y^2(1+Y)^{2T+2}} + \frac{2T(2T+1)(100 - C/Y)}{(1+Y)^{2T+2}}}{4P}$$

wherein as coded computational processing algorithms:

semi-annual Convex=$CON$=((($C$/(($Y/2$)^3))*(1-(1/((1+($Y/2$))^($2*T$)))))-(($C*(2*T)$)/((($Y/2$)^2)*((1+($Y/2$))^(($2*T$)+1))))+((($2*T$)*(($2*T$)+1)*(100-($C/Y$)))/((1+($Y/2$))^(($2*T$)+2))))/($4*P$)

generalized Convex=$CONDP$=((($C$/(($Y/N$)^3))*(1-(1/((1+($Y/N$))^($N*T$)))))-(($C*(N*T)$)/((($Y/N$)^2)*((1+($Y/N$))^(($N*T$)+1))))+((($N*T$)*(($N*T$)+1)*(100-($C/Y$)))/((1+($Y/N$))^(($N*T$)+2))))/($4*P$)

where N=n=# C periods per annum; semi-annual=2; T=Maturity in years;
function of theta, utilizing coded algorithm applicable if YTM or if Yield M:

generalized Theta ($\theta$), wherein theta: $\theta = 2\ln(1+r/2)$, wherein r=YTM or Yield M;

means for sending said yield, and derivatives, data set to data storage or display output;

means for computing factorization for change in price over time, comprising algorithm:

$\Delta P = A + B + C + D$ wherein,
  $\Delta P$=change in bid price, for given changes in yield and time,
  A=-abs(Duration)×Price(dirty)×$\Delta Y$
  B=½×Convexity×Price(dirty)×$(\Delta Y)^2$
  C=Theta×Price(dirty)×$\Delta t$
  D=-($\Delta$ Accrued Interest, for given $\Delta t$),
and wherein,
  Y (YTM), by Formula Yield M, or Yield Md, or YTM by non-summation or by summation form function,
  Duration by Formula K, or by first term Taylor series approximation,
  Convexity by Formula V, or by second term Taylor series approximation,
  Theta ($\theta$), wherein theta: $\theta = 2\ln(1+r/2)$, wherein r=YTM,
  Price (dirty) equals bid price plus accumulated interest,
  $\Delta t$ is elapsed time between two points whereby estimations are made,
  $\Delta P$ rounded to nearest pricing gradient, $\Delta P$ occurring $\Delta t$;

means for sending said computed factorization values to data storage or display output;

means for sending said governing yield values to data storage or display output;

means for sending said duration and convexity values to data storage or display output.

* * * * *